US012812193B1

(12) United States Patent
Mercola et al.

(10) Patent No.: US 12,812,193 B1
(45) Date of Patent: Nov. 24, 2026

(54) SYSTEM AND METHOD FOR AI-DRIVEN MULTI-SOURCE INTELLIGENCE PLATFORM WITH EVIDENCE-GRAPH PROVENANCE AND PERSONALIZED CONTENT GENERATION

(71) Applicants: Joseph Mercola, Ormond Beach, FL (US); Christopher William Johnson, Ormond Beach, FL (US)

(72) Inventors: Joseph Mercola, Ormond Beach, FL (US); Christopher William Johnson, Ormond Beach, FL (US)

(73) Assignee: Domain Technologies, LLC, Cape Coral, FL (US)

( * ) Notice: Subject to any disclaimer, the term of this patent is extended or adjusted under 35 U.S.C. 154(b) by 0 days.

(21) Appl. No.: 19/677,177

(22) Filed: May 14, 2026

(51) Int. Cl.
*H04N 21/2543* (2011.01)
*G06N 5/045* (2023.01)

(52) U.S. Cl.
CPC ......... *H04N 21/2543* (2013.01); *G06N 5/045* (2013.01)

(58) Field of Classification Search
CPC ........................... H04N 21/2543; G06N 5/045
See application file for complete search history.

(56) References Cited

U.S. PATENT DOCUMENTS 5,867,131 A * 2/1999 Camp, Jr. ................ H01Q 1/24 343/702
2006/0253350 A1* 11/2006 Falkenhain ........... H04M 15/82 705/34
2011/0179434 A1* 7/2011 Jorg ................... G06Q 20/1235 725/32
2011/0320300 A1* 12/2011 Broms ................... G06Q 30/08 705/26.1
2012/0079514 A1* 3/2012 Riedl ................. H04N 21/4334 725/5
2017/0244987 A1* 8/2017 Christie ............. H04N 21/2662
2020/0175590 A1* 6/2020 Huo .......................... H04L 9/50
2021/0044972 A1* 2/2021 Murray ................. G06F 21/602

* cited by examiner

*Primary Examiner* — Michael B. Pierorazio
(74) *Attorney, Agent, or Firm* — Beagle Patents, LLC; Jeffrey K. Seto

(57) ABSTRACT

An AI-driven intelligence platform ingests primary-source data and expert discourse from heterogeneous open sources through modular arm pipelines with triple activation triggers, indexes the data in a structured evidence graph with immutable provenance chains, and synthesizes it into personalized daily intelligence briefings with inline citations and claim confidence classifications. The platform enforces sponsor separation architecturally through schema-validated campaign briefs with non-fields, isolated editorial and sponsor pipelines, and feature firewalls. A truth-constrained reinforcement learning loop optimizes ranking weights from verified subscriber preference feedback under hard evidence-quality constraints. A public discourse intelligence engine identifies credentialed experts, detects pre-news signals, maps consensus and dissent, and triangulates expert commentary against primary sources. An accountability engine verifies content consumption through multi-signal behavioral analytics and charges subscribers only for unread days. Tamper-evident provenance anchoring uses HSM-signed Merkle roots committed to external timestamping mechanisms. An evaluation gate system blocks deployment unless integrity test suites pass.

20 Claims, 25 Drawing Sheets

OUTCOME ATTRIBUTION ENGINE AND ENTERPRISE BILLING SYSTEM (COMBINED FLOW AND BLOCK DIAGRAM)

SYSTEM AND METHOD FOR AI-DRIVEN MULTI-SOURCE INTELLIGENCE PLATFORM WITH EVIDENCE-GRAPH PROVENANCE AND PERSONALIZED CONTENT GENERATION

FIELD OF THE INVENTION

The present invention relates generally to artificial intelligence ("AI") systems for content assessment, and, more particularly, to an integrated platform synthesizes primary-source data into personalized intelligence briefings.

BACKGROUND OF THE INVENTION

The digital information landscape presents a number of interrelated problems that existing systems have failed to solve simultaneously. One such problem is the subscriber's problem. Conventional news and information products deliver substantially identical content to every recipient regardless of individual interests, domain expertise, or professional needs. A cardiologist and a kindergarten teacher receive the same front page, the same story prioritization, and the same editorial judgment about what matters. The most valuable real-time intelligence—expert commentary from domain authorities, breaking insights from practitioners, emerging consensus and dissent among researchers—remains scattered across open social platforms, research databases, regulatory filings, and government data sources. No individual possesses the time or tools to find, filter, cross-reference, and synthesize these signals on a daily basis. The result is either information overload from generic outlets or information underload in the specific domains that matter to a given subscriber.

Another problem is the advertiser's problem. The global digital advertising industry, which exceeds approximately $600 billion annually, operates on a fundamentally interruptive and inefficient model. Dominant platforms insert commercial messages adjacent to content that roughly matches a demographic profile, hoping someone notices. Average click-through rates hover in the low single digits, and conversion rates of those clicks are lower still. For approximately every 1,000 impressions, an advertiser may acquire approximately 2 customers. The remaining approximately 998 impressions represent waste. Critically, existing platform metrics—impressions, views, clicks—measure proximity to attention rather than confirmed engagement. No existing platform simultaneously delivers audiences who explicitly declared interest in a domain, verified content consumption tied to financial accountability, and persistent daily presence in a trusted information environment.

Yet another problem is the publisher's problem. Traditional publishers operate models that are simultaneously expensive, structurally slow, and subject to editorial conflicts arising from advertiser dependency. Large human editorial staffs gather, write, edit, and distribute content against broad demographic targets. Revenue depends on subscriptions and advertising, with advertising dependency creating inherent conflicts of interest that undermine editorial credibility.

Yet another problem is the enterprise decision-maker's problem. Every business enterprise on Earth—from global corporations to individual entrepreneurs—makes strategic, operational, and capital allocation decisions on information that is incomplete, stale, biased, or some combination of all three. The global enterprise intelligence industry, comprising market research firms, financial data providers, management consultancies, and competitive intelligence services, generates hundreds of billions of dollars in annual revenue by selling partial views of reality. Market research firms such as Nielsen and NIQ rely on sampling methodologies that infer population behavior from small panels. Financial data terminals such as Bloomberg aggregate structured filings and market data but lack behavioral context. Analyst-driven research firms such as Gartner produce expert opinion reports that are structurally slow, subjectively filtered, and disconnected from real-time market signals. Data integration platforms such as Palantir provide analytical infrastructure but require the enterprise to supply its own data and its own interpretive framework.

Each incumbent owns a vertical slice of the enterprise intelligence landscape. No existing system provides a horizontal intelligence method capable of ingesting the full spectrum of public behavioral signals, expert discourse, regulatory developments, financial data, and market indicators, synthesizing that evidence across domains with full provenance traceability, and delivering decision-grade intelligence with confidence classifications and cryptographic audit trails. The result is that the majority of business decisions—including decisions involving billions of dollars in capital allocation—are made on fundamentally incomplete information. This information deficit is a primary contributor to business failure rates, failed product launches, misallocated capital expenditure, and missed market opportunities at every scale of enterprise.

There remains a need for a horizontal intelligence infrastructure that synthesizes multisource public evidence into decision-grade enterprise intelligence with the same provenance, auditability, and evidence quality guarantees applied to consumer intelligence- and that aligns its economic model with enterprise outcomes rather than charging for access regardless of intelligence quality.

Yet another problem exists at the intersection of the subscriber's problem and the publisher's problem. Conventional content publishers that serve domain-specific subscriber communities-including health newsletters, financial advisories, technology briefings, legal updates, and other vertical information products-face a structural constraint in which editorial production capacity limits both personalization depth and content freshness. A health information publisher serving subscribers with diverse interests spanning dozens of distinct health conditions and wellness domains cannot produce original, research-backed content for every subscriber interest every day using human editorial teams alone. The result is broadcast-model publishing in which every subscriber receives identical content regardless of individual interest, with editorial teams producing long-form articles that queue for weeks or months awaiting publication scheduling, product tie-ins, or editorial capacity. This broadcast model wastes editorial production investment, delivers irrelevant content to the majority of subscribers on any given day, and creates a structural ceiling on engagement, retention, and subscriber lifetime value.

Existing approaches to content personalization in vertical publishing have addressed this problem inadequately. Manual editorial personalization through segmented editions requires multiplicative editorial labor and does not scale beyond a small number of segments. Algorithmic recommendation of existing content from an archive provides some personalization but does not generate fresh content and is limited by the archive's coverage of subscriber interests. AI-assisted content generation without systematic primary-source ingestion produces content that is not grounded in current research, cannot provide verifiable citations, and risks generating inaccurate or fabricated claims. No existing system combines automated primary-source research harvesting across a configurable plurality of content verticals, AI-driven content synthesis constrained to retrieved evidence with mandatory citation, nested content architecture enabling multiple rendering depths from a single generation, subscriber-level topic and depth personalization, and human editorial quality review within a scalable daily workflow.

Existing technology approaches have addressed portions of these problems in isolation but have failed to provide an integrated solution. RSS feed readers such as the discontinued Google Reader allowed subscribers to select sources and receive updates in a unified reader but required source-level rather than topic-level selection, provided no synthesis across sources, no intelligence layer, no personalization of depth, no quality verification, and scaled uncontrollably in volume. Algorithmic news aggregators such as Google News and Apple News provide some personalization but rely on publisher-supplied content rather than primary sources, lack evidence traceability, conflate editorial and advertising interests, and provide no verified engagement measurement. Social media platforms provide access to expert discourse but offer no systematic curation, verification, synthesis, or citation infrastructure. Recommendation systems employing collaborative filtering or reinforcement learning optimize for engagement metrics without constraints ensuring evidence quality, source diversity, or resistance to coordinated manipulation.

In the enterprise intelligence domain, existing approaches suffer from parallel deficiencies. Market research firms employing sampling methodologies extrapolate population-level behavior from small representative panels, producing intelligence that is structurally lagged, statistically bounded, and disconnected from real-time behavioral signals. Financial data terminal providers aggregate structured filings, market feeds, and transaction data but do not synthesize across non-financial evidence domains, do not incorporate real-time public discourse signals, and do not provide evidence-graph provenance or confidence classifications on analytical outputs. Analyst-driven research firms produce expert opinion reports through human editorial processes that are slow relative to market dynamics, limited in domain coverage by analyst headcount, and subject to the same structural biases and conflicts of interest that affect traditional publishing. Data integration platforms provide analytical infrastructure and visualization but require the enterprise client to supply proprietary data, build interpretive frameworks, and employ specialized technical staff to derive intelligence—the platform provides tools rather than intelligence. No existing enterprise intelligence system ingests the full spectrum of publicly available behavioral, expert, regulatory, financial, and market signals, synthesizes that evidence through a structured evidence graph with immutable provenance chains, delivers intelligence with per-claim confidence classifications and cryptographic audit trails, or aligns its revenue model with the quality of intelligence delivered rather than with access alone.

There remains a need, for example, for an integrated intelligence platform that serves both consumer and enterprise decision-making through a unified domain-agnostic architecture. This need requires the unified domain-agnostic architecture to focus on delivering breadth, depth, and daily reliability to individual subscribers while simultaneously delivering decision-grade enterprise intelligence to business entities of all scales. Furthermore, the need requires making its sourcing and editorial decision process fully transparent and auditable through a single evidence graph with immutable provenance, at a cost structure that does not require compromising editorial independence to fund operations, and with an economic model that aligns platform revenue with the quality of outcomes its intelligence enables.

The present disclosure provides a solution for the problems and needs identified above, as well as other problems.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

In accordance with some aspects of the present disclosure, artificial intelligence systems are generally directed to content ingestion, synthesis, personalization, and distribution. More particularly, the systems relate to an integrated platform that ingests primary-source data and expert discourse from heterogeneous open sources. The integrated platform synthesizes the ingested data into personalized intelligence briefings with full citation traceability through a structured evidence graph, and delivers the briefings through an engagement-conditioned accountability billing model that verifies content consumption through passive multi-signal behavioral analytics. The integrated platform further protects editorial integrity through architecturally enforced sponsor separation auditable via tamper-evident cryptographic provenance anchoring, and continuously improves editorial ranking through truth-constrained reinforcement learning from verified subscriber preference feedback.

In accordance with other aspects of the present disclosure, an AI-driven intelligence platform system includes six integrated architectural layers operating in concert to solve the subscriber, advertiser, and publisher problems simultaneously. The system ingests primary-source data from heterogeneous sources through modular arm pipelines, indexes the ingested data into a structured evidence graph with immutable provenance chains, and synthesizes the evidence into hyper-personalized daily intelligence briefings with inline citations and confidence classifications for every material claim. The system further distributes the briefings through a multi-channel notification architecture resilient to single-platform suppression, and verifies content consumption through passive multi-signal behavioral analytics tied to an engagement-conditioned sliding-scale billing model. The system continuously improves editorial ranking through a truth-constrained reinforcement learning feedback loop that aggregates verified subscriber preference signals under hard constraints preventing the optimization from degrading evidence quality, suppressing dissent, or enabling sponsor influence.

In accordance with other aspects of the present disclosure, a system provides an enterprise intelligence layer operating on the same architectural foundation as the consumer intelligence layer. Specifically, an intelligence platform system is a domain-agnostic intelligence synthesis engine in which the consumer intelligence product and the enterprise intelligence product are parallel output pathways from a unified data ingestion layer, evidence graph, and AI assembly layer. The enterprise intelligence layer synthesizes multisource public evidence into decision-grade intelligence delivered to enterprise clients through one or more of four configurable delivery formats. One format is in the form of periodic decision briefings that include synthesized intelligence reports tailored to the enterprise client's industry domains and strategic context. Another format is in the form of real-time alert intelligence triggered by detected signal clusters including regulatory shifts, competitive movements, and behavioral pattern changes. Yet another format is in the form of query-driven intelligence synthesis providing on-demand answers from the evidence graph with full provenance in response to enterprise client inquiries. Yet another format is in the form of continuous intelligence dashboards providing a persistent real-time view of consensus and dissent mapping, trend trajectories, competitive positioning, and behavioral signal patterns across the enterprise client's configured domains.

In accordance with other aspects of the present disclosure, an enterprise intelligence layer is protected by an enterprise client isolation architecture enforced at the same architectural level as the sponsor separation architecture of the consumer layer. Enterprise client intelligence profiles, configured domains, queries, alert triggers, and received intelligence are isolated through code-level firewalls and auditable through the same tamper-evident cryptographic provenance anchoring system. No enterprise client may access, infer, or influence the intelligence delivered to any other enterprise client.

In accordance with other aspects of the present disclosure, a consumer intelligence layer and the enterprise intelligence layer are connected through a market behavioral intelligence layer in which the public behavior of the consumer subscriber base-including public discourse on open social platforms, community engagement, content sharing, and other publicly observable behavioral signals—is processed by the public discourse intelligence engine into market-grade behavioral intelligence that is unavailable through sampling, polling, or structured data aggregation alone. The consumer subscriber base generates the behavioral signal at population scale. The enterprise intelligence layer synthesizes that signal into decision-grade intelligence. This architectural relationship creates a compounding data advantage in which growth in the consumer subscriber base continuously improves the quality, granularity, and predictive value of enterprise intelligence, constituting a structural competitive barrier that no enterprise-only intelligence provider can replicate without first building a comparable consumer intelligence ecosystem.

In accordance with other aspects of the present disclosure, an enterprise intelligence layer supports a plurality of engagement and compensation models configured per enterprise client. In a first embodiment, the platform charges access-based fees structured across one or more pricing dimensions including domain scope, delivery format capabilities, authorized user count, and historical evidence graph depth. In a second embodiment, the platform employs a performance-based value capture model in which platform revenue is aligned with enterprise client outcomes rather than with access alone. The system comprises an outcome attribution engine that tracks enterprise decisions informed by platform intelligence and attributes measurable outcomes—including successful market entries, capital allocation returns, and prevented capital waste from decisions avoided or modified based on platform intelligence—to specific intelligence outputs. Enterprise client engagements under the performance-based model may be structured as joint venture arrangements in which the platform's compensation is contingent upon the enterprise client's success, with the platform bearing the risk of intelligence quality failure. This performance-based model constitutes a structural risk reversal in which the enterprise client incurs no cost for intelligence that fails to produce measurable value. In a third embodiment, the platform employs a hybrid model combining access-based fees with performance-based compensation. The specific compensation structure may vary per enterprise client engagement without departing from the scope of the invention.

In accordance with other aspects of the present disclosure, an intelligence platform system operates as a centralized multi-tenant platform. The system is not licensed for independent deployment by consumer subscribers or enterprise clients. All intelligence synthesis, evidence graph maintenance, provenance anchoring, and output delivery occur within the centralized platform infrastructure. Consumer subscribers and enterprise clients access intelligence through the platform. This centralized architecture preserves the network effects arising from unified evidence graph growth, consumer behavioral signal aggregation, and cross-domain intelligence synthesis that would be destroyed by fragmented deployment.

The system further provides a personalized content generation engine operating as a specialized implementation of the consumer intelligence layer. The personalized content generation engine combines automated primary-source research harvesting, AI-driven evidence-constrained content synthesis, nested content architecture, and subscriber-level topic and depth personalization to deliver daily personalized content across a configurable plurality of content verticals at a cost structure that eliminates the scaling constraints of human editorial production.

In accordance with other aspects of the present disclosure, a personalized content generation engine includes an automated research harvesting system that executes a configurable plurality of precision search queries against one or more primary-source research databases on a recurring schedule, each query associated with a specific content vertical and designed to retrieve current primary-source research relevant to that vertical. The harvesting system employs date-windowed filtering to ensure that each retrieval cycle captures only newly indexed research, a multi-stage fallback chain to ensure content availability for every active vertical on every delivery cycle, and a persistent deduplication mechanism to ensure that no primary-source document is ever presented to a subscriber more than once.

In accordance with other aspects of the present disclosure, a personalized content generation engine includes a nested content synthesis module that generates a single content unit per content vertical per delivery cycle, each content unit structured in a layered architecture such that the first layer constitutes a complete and satisfying standalone rendering at a minimum depth, the first and second layers together constitute a complete and satisfying standalone rendering at a medium depth, and all layers together constitute a complete and satisfying standalone rendering at maximum depth. The layers are not summaries or abridgments of one another. Each shorter rendering is a verbatim subset of the longer rendering beginning from the first word. A single content generation operation produces all rendering depths, and a single stored content unit serves all rendering depths through conditional rendering logic applied at delivery time based on subscriber preference.

In accordance with other aspects of the present disclosure, a personalized content generation engine includes an editorial constraint architecture in which the AI synthesis process operates under a structured set of mandatory constraints. The constraints include regulatory language boundaries prohibiting disease treatment claims and restricting output to structure and function language, editorial pillar alignment ensuring consistency with the publisher's established editorial positions. Scientifically supported, tone and vocabulary constraints prevent generic AI writing patterns. The constraints further include enforcing accessible technical communication, mandatory primary-source citation in every content unit, and absolute separation between editorial content and product promotion. These constraints are enforced at generation time through the system prompt architecture rather than through after-the-fact editorial review alone, though human editorial review remains a quality gate in the production workflow.

In accordance with other aspects of the present disclosure, subscribers select one or more content verticals from the configurable plurality of available verticals and select a preferred rendering depth. The distribution system delivers a personalized content package comprising one content unit per selected vertical, each rendered at the subscriber's preferred depth, through the subscriber's selected notification channel. The number of available content verticals is not fixed and may be expanded without architectural modification as new verticals are defined with associated research harvesting queries.

In accordance with other aspects of the present disclosure, a system enforces sponsor separation architecturally rather than through editorial policy alone. Sponsor identifiers are forbidden as ranking features at the code level. Sponsor-module content is generated in an isolated pipeline with separate retrieval, separate prompts, a separate renderer, and separate logging. Campaign brief objects submitted by sponsors use schema-enforced non-fields that reject any input referencing editorial ranking, inclusion, suppression, or tone at validation time. Every briefing stores an immutable provenance bundle, and the system automatically generates Integrity Reports proving sponsor-blind editorial behavior for any time window.

In accordance with other aspects of the present disclosure, tamper-evidence is achieved through merklization of evidence bundles and Integrity Reports, periodic Audit Anchors comprising Merkle root hashes signed with hardware security module protected keys, and publication of anchors to append-only internal ledgers and external timestamping mechanisms. Threshold signatures enforce separation of duties for high-impact integrity operations. Signing Key IDs recorded in anchored artifacts enable verification across key rotation events.

In accordance with other aspects of the present disclosure, a system introduces a truth-constrained, reinforcement learning ranking optimization loop in which verified subscribers provide binary preference feedback on editorially selected stories. This includes A/B-tested ranking variants drawn from a top candidate tier. Aggregated preference data adjusts system-wide content ranking factor weights through reinforcement learning subject to hard constraints derived from evidence quality metrics, domain guardrails, rights compliance, sponsor separation, and diversity floors. Preference signals are filtered through a Rater Trust Score computed from verified-read confidence, longitudinal behavior consistency, anomaly detection, and sybil resistance before entering the learning dataset.

In accordance with other aspects of the present disclosure, a system introduces an accountability engine in which content access is conditionally free based on verified reading. Proportional charges accrue for non-consumption days within a monthly cap tied to the subscriber's selected tier, creating a verified engagement metric structurally superior to existing advertising measurement standards.

In accordance with other aspects of the present disclosure, a computer-implemented system is directed to engagement-conditioned content billing. The computer-implemented system includes a content delivery module configured to deliver personalized content to a subscriber through a first-party reader application; a reading verification system configured to determine whether the subscriber consumed the delivered content on each day of a billing period by analyzing a plurality of passive behavioral signals collected from the first-party reader application, wherein no single passive behavioral signal is trusted in isolation; a sliding scale billing calculator configured to compute a charge for the billing period, wherein the charge for each day on which the reading verification system determines the subscriber consumed the delivered content is zero, and the charge for each day on which the reading verification system determines the subscriber did not consume the delivered content is computed as a fraction of a monthly maximum charge divided by the number of active days in the billing period; a payment tokenization interface configured to process billing through a payment token issued by an external payment processor, wherein the system stores the payment token and does not store primary account numbers or card verification values; and a hold-vacation module configured to pause content delivery and exclude paused days from the active-day denominator used by the sliding scale billing calculator.

In accordance with other aspects of the present disclosure, a computer-implemented method is directed to engagement-conditioned content billing. The computer-implemented method includes delivering personalized content to a subscriber through a first-party reader application; analyzing a plurality of passive behavioral signals from the first-party reader application to determine, for each day of a billing period, whether the subscriber consumed the delivered content, wherein no single signal is determinative; computing a charge for the billing period wherein each verified-read day is charged zero and each unread active day is charged proportionally against a monthly maximum; processing the charge through a payment token issued by an external payment processor without storing primary account numbers; and excluding from the active-day denominator any days during which the subscriber activated a hold mode pausing delivery and billing.

In accordance with other aspects of the present disclosure, a non-transitory computer-readable medium stores instructions that, when executed by a processor, cause the processor to: receive a plurality of passive behavioral signals from a first-party reader application in which personalized content is displayed to a subscriber; determine for each day of a billing period whether the subscriber consumed the content by combining the plurality of signals with anomaly detection, no single signal being determinative; compute a billing charge wherein verified-read days are charged zero and unread active days are charged proportionally against a monthly maximum; process the charge via a stored payment token without retaining primary account numbers; and exclude hold-mode days from the active-day denominator.

In accordance with other aspects of the present disclosure, a computer-implemented system is directed to evidence-based content synthesis with auditable provenance. The computer-implemented system includes a data ingestion layer comprising a plurality of arm modules, each arm module configured to ingest source data from an external source and normalize the source data to a unified internal schema comprising content type, entities, timestamps, authorship, and rights metadata; an evidence graph having a plurality of interconnected nodes including document nodes representing canonical content items, claim nodes representing atomic statements linked to supporting document nodes, entity nodes representing persons, organizations, products, or topics linked across document nodes, and event nodes representing time-bounded clusters of related developments; a provenance chain providing a traceable path from any claim node in a subscriber-facing briefing backward through the evidence graph to original source document nodes; an AI assembly layer configured to generate briefings only from evidence retrieved from the evidence graph and to attach inline citations to every material claim, each material claim classified as directly supported by a cited source, synthesized across multiple identified sources, or inference with stated uncertainty; and an evidence bundle stored with each generated briefing comprising source documents, retrieval queries, timestamps, model version identifiers, and claim confidence classifications.

In accordance with other aspects of the present disclosure, a computer-implemented system is directed to engagement-conditioned content billing. The computer-implemented system includes a content delivery module configured to deliver personalized content to a subscriber through a first-party reader application; a reading verification system configured to determine whether the subscriber consumed delivered content on each day of a billing period by analyzing a plurality of passive behavioral signals collected from the first-party reader application, wherein no single passive behavioral signal is trusted in isolation; a sliding scale billing calculator configured to compute a charge for the billing period, wherein the charge for each day on which the reading verification system determines the subscriber consumed the delivered content is zero, and the charge for each day on which the reading verification system determines the subscriber did not consume the delivered content is computed as a fraction of a monthly maximum charge divided by a number of active days in the billing period; a payment tokenization interface configured to process billing through a payment token issued by an external payment processor, wherein the payment token is stored but the primary account numbers or card verification values are not stored; and a hold-vacation module configured to pause content delivery and exclude paused days from an active-day denominator used by the sliding scale billing calculator.

In accordance with other aspects of the present disclosure, a computer-implemented method is directed to engagement-conditioned content billing. The computer-implemented method includes delivering personalized content to a subscriber through a first-party reader application; analyzing a plurality of passive behavioral signals from the first-party reader application to determine, for each day of a billing period, whether the subscriber consumed delivered content, wherein no single signal is determinative; computing a charge for the billing period wherein each verified-read day is charged zero and each unread active day is charged proportionally against a monthly maximum; processing the charge through a payment token issued by an external payment processor without storing primary account numbers; and excluding from an active-day denominator any days during which the subscriber activated a hold mode pausing delivery and billing.

In accordance with other aspects of the present disclosure, a non-transitory computer-readable medium stores instructions that, when executed by a processor, cause the processor to: receive a plurality of passive behavioral signals from a first-party reader application in which personalized content is displayed to a subscriber; determine for each day of a billing period whether the subscriber consumed the content by combining the plurality of passive behavioral signals with anomaly detection, no single signal being determinative; compute a billing charge wherein verified-read days are charged zero and unread active days are charged proportionally against a monthly maximum; process the charge via a stored payment token without retaining primary account numbers; and exclude hold-mode days from an active-day denominator.

In accordance with other aspects of the present disclosure, a computer-implemented system is directed to evidence-based content synthesis with auditable provenance. The computer-implemented system includes a data ingestion layer comprising a plurality of arm modules, each arm module configured to ingest source data from an external source and normalize the source data to a unified internal schema comprising content type, entities, timestamps, authorship, and rights metadata; an evidence graph having a plurality of interconnected nodes including document nodes representing canonical content items, claim nodes representing atomic statements linked to supporting document nodes, entity nodes representing persons, organizations, products, or topics linked across document nodes, and event nodes representing time-bounded clusters of related developments; a provenance chain providing a traceable path from any claim node in a subscriber-facing briefing backward through the evidence graph to original source document nodes; an AI assembly layer configured to generate briefings only from evidence retrieved from the evidence graph and to attach inline citations to every material claim, each material claim classified as directly supported by a cited source, synthesized across multiple identified sources, or inference with stated uncertainty; and an evidence bundle stored with each generated briefing comprising source documents, retrieval queries, timestamps, model version identifiers, and claim confidence classifications.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments and are therefore not to be considered as limitations on the scope of the various embodiments or claims.

DETAILED DESCRIPTION

Figure 1:
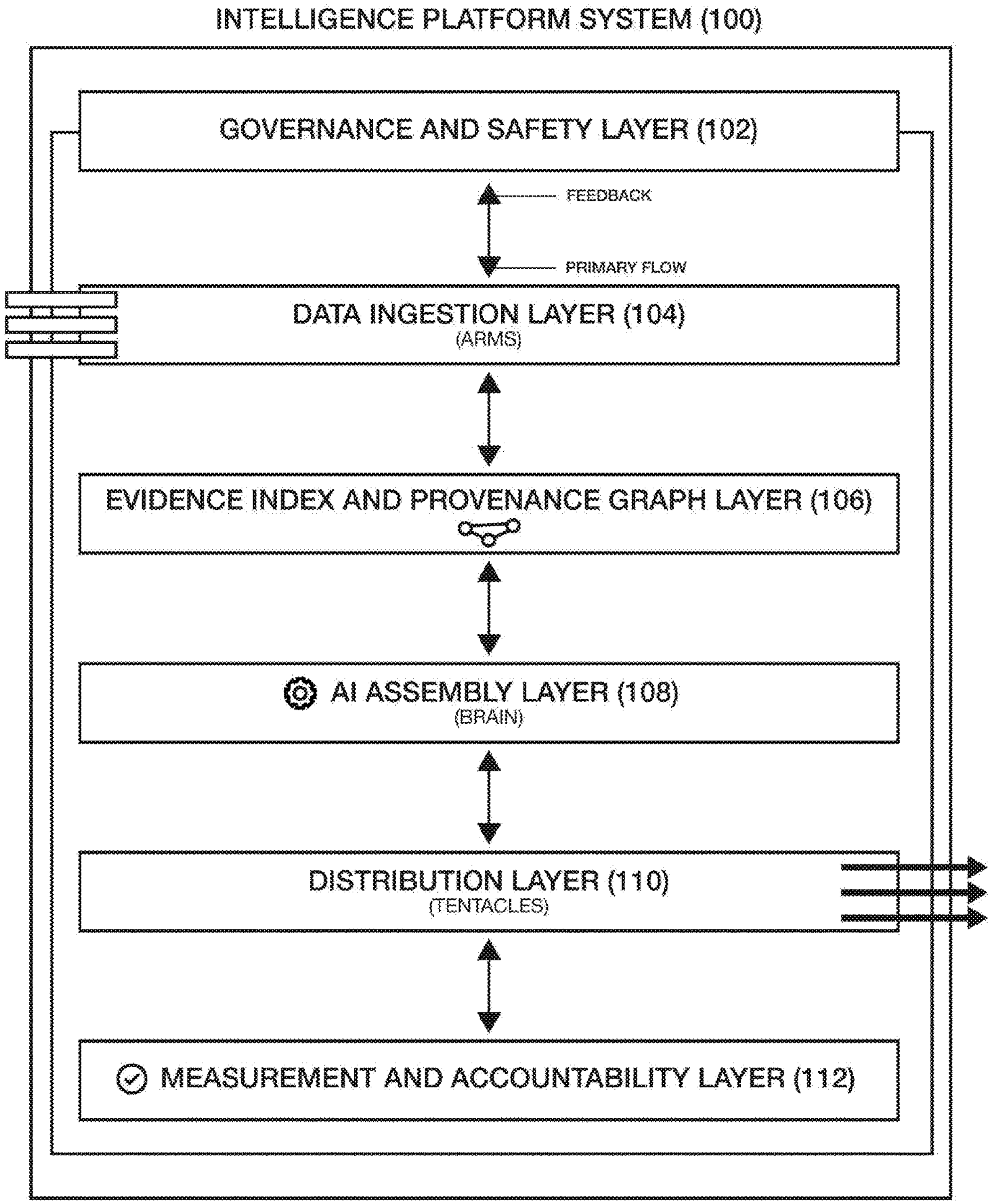
FIG. 1 is a system-level block diagram of an AI-driven intelligence platform system, according to some aspects of the present disclosure.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Words of approximation, such as "about," "almost," "substantially," "approximately," and the like, can be used herein to mean "at," "near," "nearly at," "within plus or minus 10% of," "within acceptable manufacturing tolerances of," or any logical combination thereof. "Preferentially" means at a rate or extent at least 1.5× greater than in an alternative context, condition, or comparative state. "Substantially" means within 80% to one 120% of the stated value or condition. The terms "vertical" or "horizontal" are intended to additionally include "within 3% to 5% of" a vertical or horizontal orientation, respectively. "Greater," "higher," "increased," or "enhanced" are comparative terms referring to comparison between two states at identical conditions unless otherwise explicitly specified. Words of direction, such as "top," "bottom," "left," "right," "above," and "below" are intended to relate to the equivalent direction as depicted in a reference illustration; as understood contextually from the object or element being referenced, such as from a commonly used position for the object or element; or as otherwise described herein. The term "configured to" means designed, programmed, or arranged to perform the stated function using any suitable hardware, software, or combination thereof.

Referring to FIG. 1, an AI-driven intelligence platform system 100 includes a governance and safety layer 102, a data ingestion layer 104, an evidence index and provenance graph layer 106, an AI assembly layer 108, a distribution layer 110, and a measurement and accountability layer 112, with data flow paths connecting each layer and explicit interfaces between modules. The AI-driven intelligence platform system 100 has six integrated architectural layers connected by explicit data flow interfaces. The governance and safety layer 102 establishes the policy framework within which all other layers operate, defining disclosure policies, domain guardrails, source policies, review routing rules, corrections policies, rights and terms policies, learning governance policies, security and access control policies, key management policies, payment compliance policies, and incident response policies. The governance and safety layer 102 is not an afterthought applied to the system but is architecturally integrated as the foundational layer upon which all operational layers depend.

The data ingestion layer 104, referred to herein as the arms, has a plurality of modular ingestion pipelines that ingest source data from heterogeneous external sources and normalize the ingested data to a unified internal schema. The evidence index and provenance graph layer 106 receives normalized data from the data ingestion layer 104 and stores it in a structured evidence index supporting retrieval, deduplication, entity extraction, and full audit through a provenance graph linking claims to sources, entities, and time. The AI assembly layer 108, referred to herein as the brain, retrieves candidates from the evidence index, ranks and selects stories using a multi-factor ranking algorithm, synthesizes selected stories into personalized briefings with inline citations, and optimizes ranking weights through a truth-constrained reinforcement learning feedback loop. The distribution layer 110, referred to herein as the tentacles, delivers assembled briefings through a multi-channel notification architecture to subscriber-selected channels. The measurement and accountability layer 112 verifies content consumption, collects preference feedback, detects fraud, computes engagement-conditioned billing, processes appeals, and reports verified engagement metrics to sponsors.

Each of the six layers of the intelligence platform system 100 operates with explicit interfaces to adjacent layers and is designed to evolve independently without requiring modification to other layers. This separation of concerns enables modular development, testing, and deployment across the entire system.

Figure 2:
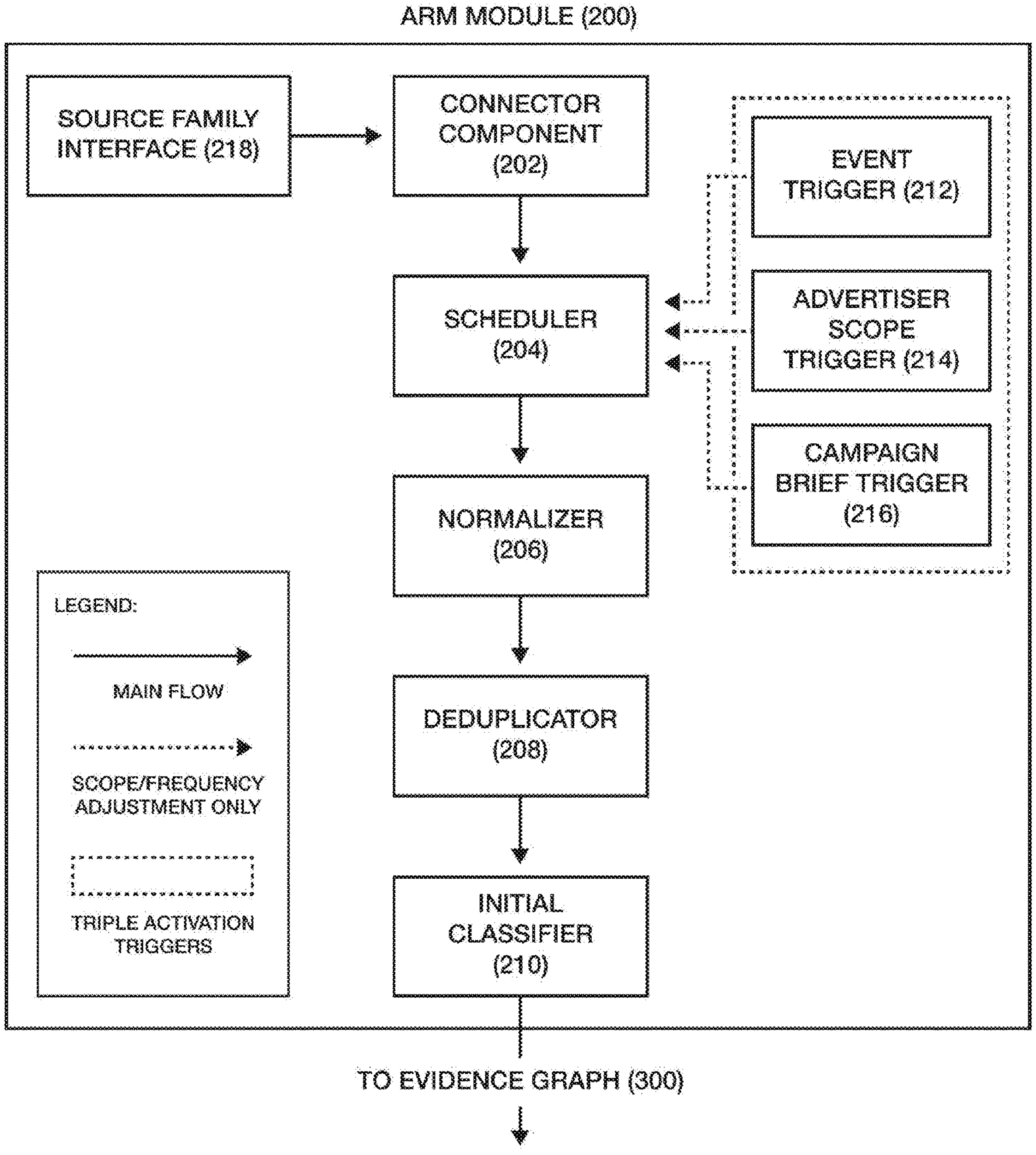
FIG. 2 is a detailed block diagram of a data ingestion layer, according to some aspects of the present disclosure.

Referring to FIG. 2, a data ingestion layer includes an arm module 200 with a connector component 202, a scheduler 204, a normalizer 206, a deduplicator 208, and an initial classifier 210, together with an event trigger 212, an advertiser scope trigger 214, a campaign brief trigger 216, and a source family interface 218 connecting to heterogeneous data sources. Each arm module 200 is a modular ingestion pipeline connected to a specific source or source family and independently deployable and independently failsafe. Each arm module 200 has a connector component 202 configured to handle authentication, rate limiting, retries, pagination, and terms-compliant retrieval from a target source. The connector component 202 optionally interfaces with any suitable source type including but not limited to research databases, regulatory filing systems, social media platform APIs, news aggregation APIs, government data APIs, video and audio platform APIs, RSS feeds, preprint servers, financial data APIs, or any combination thereof.

Each arm module 200 further has a scheduler 204 that is configured to manage fetch timing according to one or more scheduling modes including real-time, hourly, daily, or event-driven modes depending on the source cost profile and urgency characteristics. The scheduler 204 receives activation signals from three distinct trigger types. An event trigger 212 temporarily increases fetch frequency for relevant arms when a high-impact item is detected, such as a safety alert, a regulatory filing, a major preprint, or a sudden cluster of expert discussion. An advertiser scope trigger 214 maintains relevant arms at production ingestion rates when an advertiser sponsors a corresponding content vertical. A campaign brief trigger 216 expands monitored domain breadth and increases ingestion intensity across sources aligned to a sponsor's funded environment and audience segments as specified in a structured campaign brief object.

Critically, and as a hard architectural constraint enforced throughout the intelligence platform system 100, the event trigger 212, the advertiser scope trigger 214, and the campaign brief trigger 216 optionally change what data is collected and how intensively it is collected, but may never change what is said in editorial output or how editorial content is ranked. Editorial selection and ranking are driven only by evidence quality and subscriber relevance signals, and this separation is auditable through provenance bundles and Integrity Reports generated by the system.

Each arm module 200 further has a normalizer 206 configured to map source-specific formats to a unified internal schema comprising content type, entities, timestamps, authorship, licensing metadata, and rights metadata. A deduplicator 208 merges duplicate items while preserving original identifiers and assigns canonical document identifiers. An initial classifier 210 performs lightweight topic tagging, language detection, and noise filtering before items are passed to the evidence index and provenance graph layer 106.

The arm modules 200 connect to external sources through a source family interface 218. Source families optionally include, without limitation, a public discourse intelligence engine ingesting expert commentary from open social platforms, a research and biomedical source family ingesting data from publication databases such as PubMed, clinical trial registries such as ClinicalTrials.gov, drug safety databases such as OpenFDA, and preprint servers. The source families further optionally include a financial and corporate source family ingesting data from regulatory filing systems such as SEC EDGAR and financial data providers, a news and analysis source family ingesting data from news aggregation APIs and expert newsletters, and a government and regulatory source family ingesting data from weather, legislative, and multi-agency government APIs. The source families further optionally include an audio and video source family ingesting metadata and content identifiers from video and podcast platforms, and a semi-open expert platform source family ingesting data from expert publishing platforms and community discussion forums.

Figure 3:
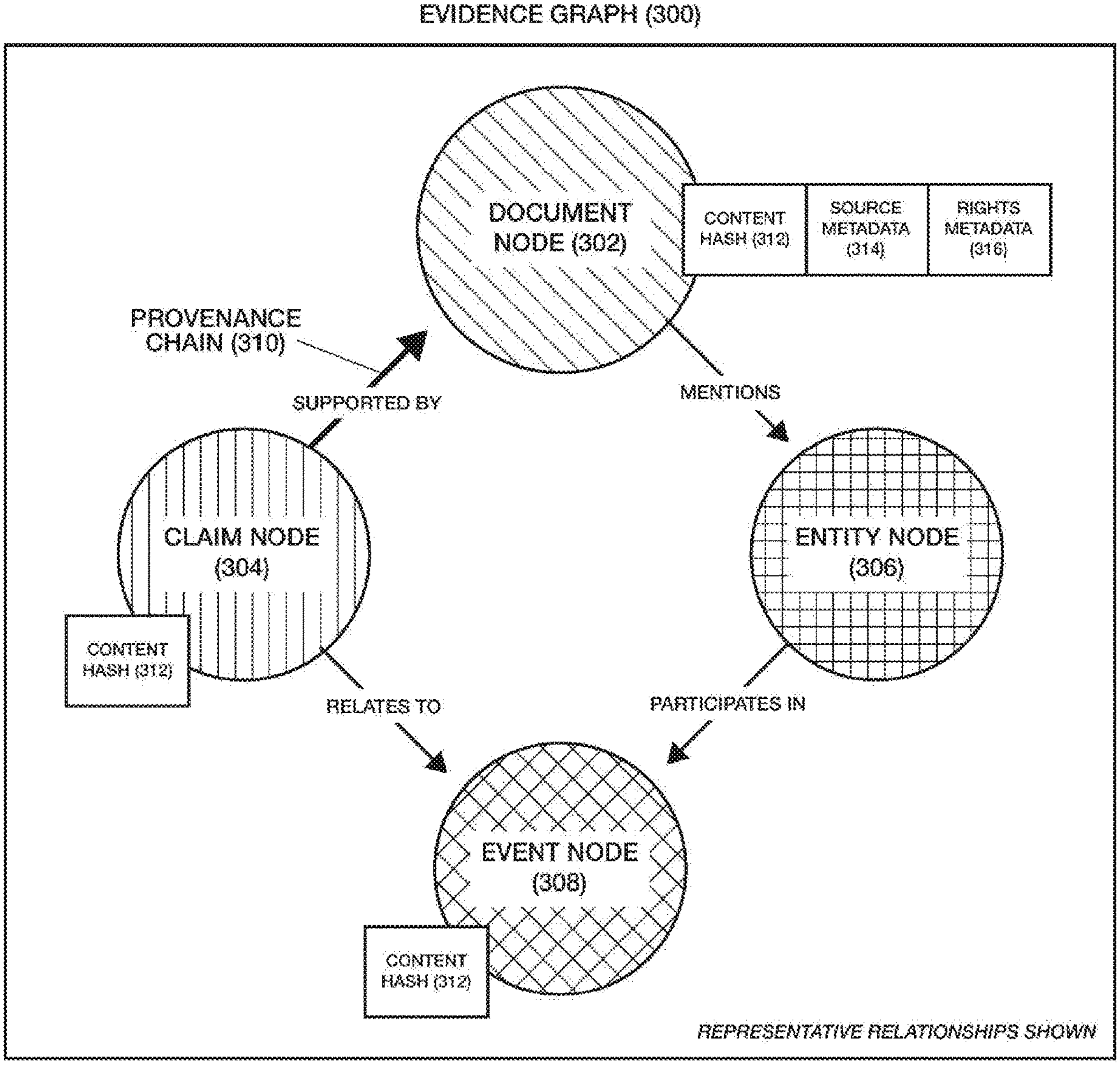
FIG. 3 is a graph diagram of an evidence graph, according to some aspects of the present disclosure.

Referring to FIG. 3, an evidence graph 300 includes a document node 302, a claim node 304, an entity node 306, and an event node 308 interconnected by a provenance chain 310, with each node storing a content hash 312, source metadata 314, and rights metadata 316. The evidence index and provenance graph layer 106 stores all ingested items in the evidence graph 300 supporting retrieval, deduplication, and full audit. The evidence graph 300 has four primary node types interconnected by typed relationships. The document node 302 represents a canonical content item with source metadata 314, rights metadata 316, timestamps, and extracted entities. The claim node 304 represents an atomic statement proposed during synthesis, linked to one or more supporting document nodes 302. The entity node 306 represents a person, organization, product, or topic, linked across document nodes 302 to enable cross-referencing and triangulation. The event node 308 represents a time-bounded cluster of related developments forming a developing story.

Each document node 302, claim node 304, and event node 308 stores a content hash 312 computed over the node's content. The content hash 312 enables integrity verification and forms the leaf nodes of Merkle trees used for tamper-evident anchoring as described in reference to FIG. 4 below.

The provenance chain 310 is the traceable path from any claim node 304 in a briefing backward through the evidence graph 300 to its original source document nodes 302, preserving the complete chain from raw ingested data to subscriber-facing content.

The rights metadata 316 stored with each document node 302 includes per-document licensing and terms information including but not limited to source URL and identifier, source type, access class categorized as public domain or government, permissive license, permissioned, paywalled or restricted, or unknown, usage constraints including quote length limits, caching restrictions, redistribution restrictions, and excerpt permissions, attribution requirements, and take-down contact and process state. The rights metadata 316 is enforced at generation time to constrain quoting, caching, and distribution of content derived from each source, as further described below in reference to FIG. 13. The source metadata 314 stored with each document node 302 includes the originating source identifier, retrieval timestamp, connector identifier, retrieval query used to obtain the document, and any source-specific quality or authority indicators used for ranking.

Figure 4:
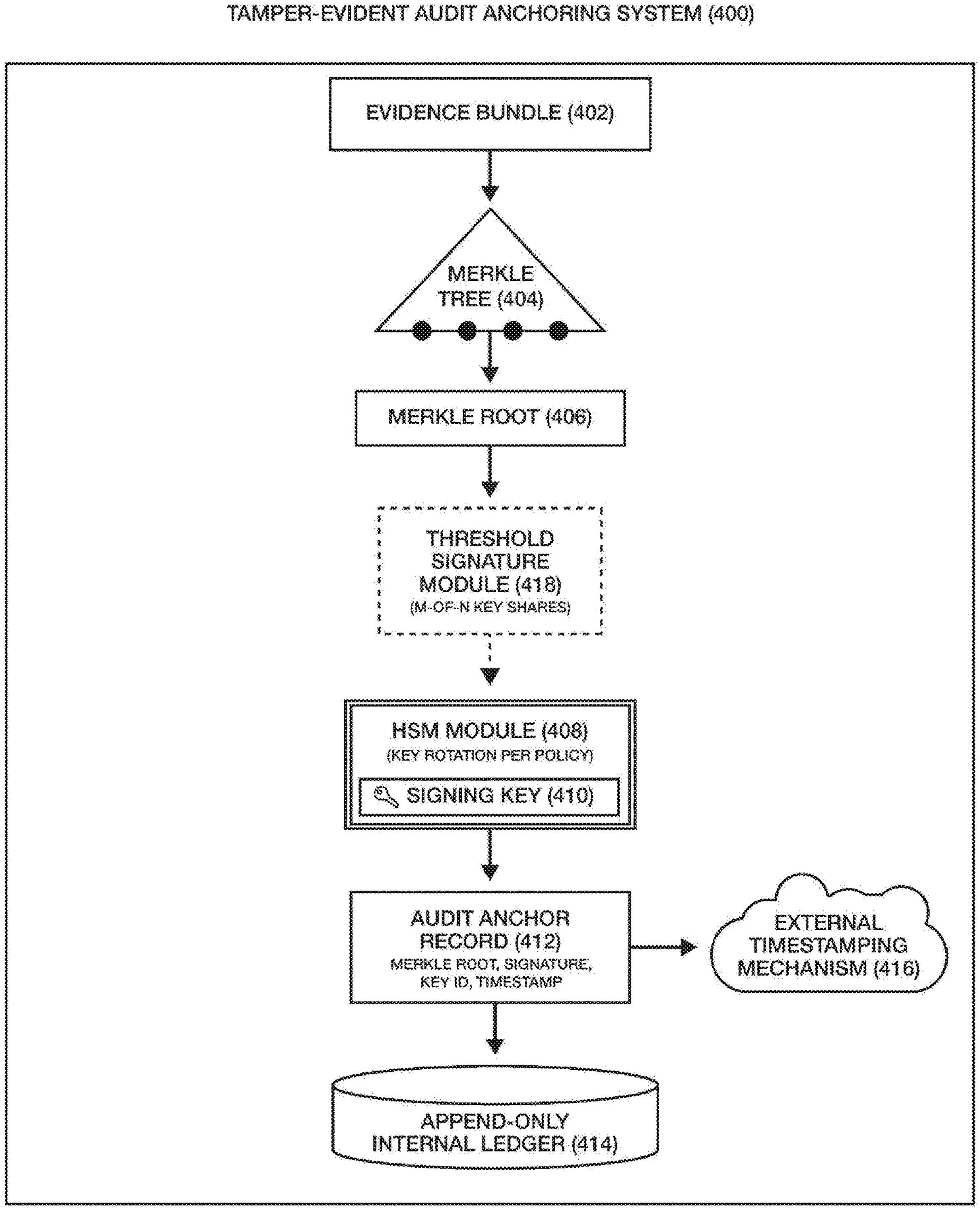
FIG. 4 is a flow diagram of a tamper-evident audit anchoring system, according to some aspects of the present disclosure.

Referring to FIG. 4, a tamper-evident audit anchoring system 400 has an evidence bundle 402 being processed into a Merkle tree 404 to produce a Merkle root 406, the Merkle root being signed by an HSM module 408 using a signing key 410, the signed output stored as an audit anchor record 412 in an append-only internal ledger 414 and committed to an external timestamping mechanism 416, with an optional threshold signature module 418 for separation of duties. The tamper-evident audit anchoring system 400 provides mathematically verifiable proof that editorial outputs, provenance bundles, Integrity Reports, correction logs, and billing outcomes have not been retroactively altered. Without anchoring, claims that records were rewritten are unfalsifiable. With anchoring, such claims become falsifiable.

The tamper-evident audit anchoring system 400 operates as follows. Each briefing and associated metadata produces an evidence bundle 402 includes the source documents retrieved, retrieval queries, timestamps, model version identifiers, claim confidence classifications, and generation parameters. The evidence bundle 402 is processed into the Merkle tree 404 by computing content hashes of each component of the evidence bundle 402 and recursively hashing pairs of hashes until a single Merkle root 406 is produced. The Merkle root 406 is a compact cryptographic commitment to the entire contents of the evidence bundle 402 such that any modification to any component would produce a detectably different Merkle root.

The Merkle root 406 is signed by the HSM module 408 using the signing key 410 that is generated and stored within the HSM module 408 such that the private key material cannot be extracted. Each signing operation references a Signing Key ID that identifies the specific key version used, enabling verification across key rotation events. The signed Merkle root, together with the Merkle root value, signature bytes, Signing Key ID, and anchor timestamp, is stored as the audit anchor record 412 in the append-only internal ledger 414. The audit anchor record 412 is additionally committed to at least one external timestamping mechanism 416 to make retroactive alteration detectably impossible even under internal compromise. Only hashes and signatures are committed externally, and no sensitive content is revealed through external commitment.

For high-impact domains and sponsored verticals, the tamper-evident audit anchoring system 400 uses the threshold signature module 418 requiring M-of-N independent key shares or approvers to produce a valid signature. The threshold signature module 418 enforces separation of duties and reduces insider risk on integrity-critical attestations. The specific values of M and N are configurable and may be set according to security policy requirements, with values of M being at least two and N being at least three in a preferred embodiment.

Keys managed by the HSM module 408 rotate on a defined cadence established by key management policy. Upon rotation, old public verification material including public keys and key attestations is retained so that auditors can verify audit anchor records 412 created under previous key versions. In the event of suspected key compromise, the system executes a key compromise runbook comprising freezing integrity signing, rotating keys immediately, revoking compromised Signing Key IDs, anchoring a key rotation event record, re-verifying anchor continuity across the affected time window, generating an incident bundle, and resuming signing only after verification and authorization.

The tamper-evident audit anchoring system 400 transforms the immutability of provenance records from a database convention into a verifiable mathematical property. Database immutability alone prevents accidental edits but does not prevent undetectable intentional edits by a privileged insider. The HSM-backed signed Audit Anchors published to external mechanisms prevent undetectable intentional edits by making any such modification provably detectable.

Figure 5:
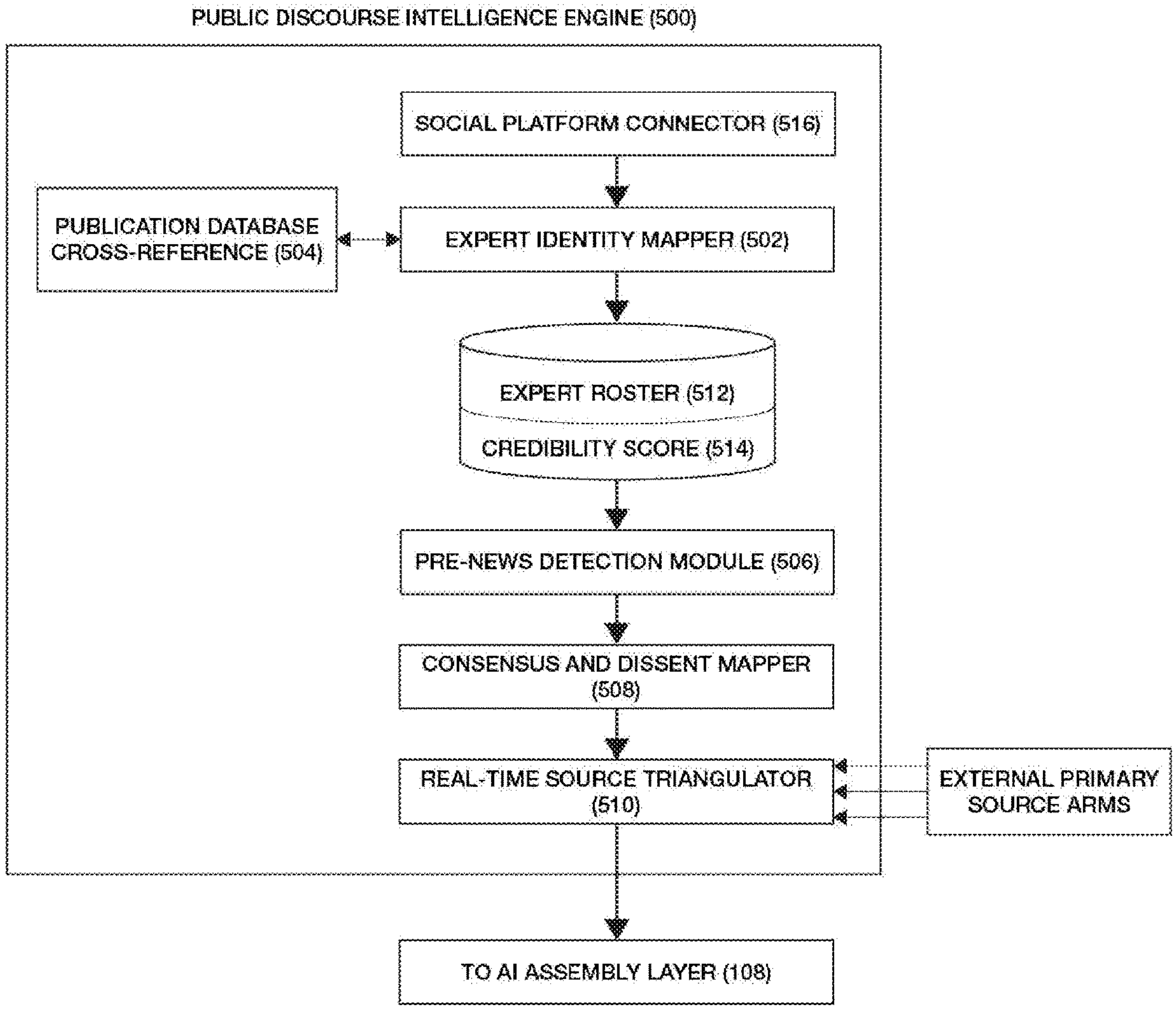
FIG. 5 is a pipeline diagram of a public discourse intelligence engine, according to some aspects of the present disclosure.

Referring to FIG. 5, a public discourse intelligence engine 500 has an expert identity mapper 502 cross-referencing against a publication database cross-reference 504, a pre-news detection module 506, a consensus and dissent mapper 508, a real-time source triangulator 510, an expert roster 512 storing credibility scores 514, and a social platform connector 516 providing input from open social platforms. The public discourse intelligence engine 500 is the intelligence platform system's 100 most distinctive data processing capability. The public discourse intelligence engine 500 ingests, analyzes, and ranks expert commentary from one or more open social platforms through the social platform connector 516. The social platform connector 516 is architecturally platform-agnostic and optionally connects to any open social platform where domain experts post publicly, including but not limited to microblogging platforms, decentralized social networks, discussion forums, expert publishing platforms, or any combination thereof. If any platform changes API terms or availability, the public discourse intelligence engine 500 continues to operate through alternative connectors.

The public discourse intelligence engine 500 comprises five functional modules that collectively transform scattered expert discourse into verified intelligence. The expert identity mapper 502 continuously identifies authoritative voices per content vertical by analyzing posting patterns, peer engagement quality, and institutional affiliations. The expert identity mapper 502 cross-references identified experts against the publication database cross-reference 504, which interfaces with one or more verified publication databases such as PubMed, ORCID, or institutional affiliation databases, to verify domain credentials. The publication database cross-reference 504 further performs longitudinal posting consistency analysis and peer network validation to compute a confidence-in-identity-match score for each identified expert. The expert identity mapper 502 produces and maintains an expert roster 512 that includes approximately 50 to approximately 200 credentialed experts per content vertical, each expert associated with a credibility score 514 derived from the multi-signal identity verification process.

The pre-news detection module 506 monitors ingested expert discourse for emerging clusters of discussion preceding mainstream media coverage. When a statistically significant cluster of expert commentary on a topic is detected before any mainstream outlet has published a corresponding story, the pre-news detection module 506 flags the topic for elevated ranking in subscriber briefings, enabling delivery of intelligence to subscribers hours or days before traditional outlets cover the same developments.

The consensus and dissent mapper 508 performs real-time analysis of expert convergence and divergence on topics within each content vertical. The analysis is weighted by the credibility scores 514 from the expert roster 512, such that the opinions of more thoroughly verified experts contribute more strongly to the consensus and dissent mapping. The consensus and dissent mapper 508 produces structured representations of the current state of expert agreement and disagreement on each active topic, which are made available to the AI assembly layer 108 for incorporation into briefings.

The real-time source triangulator 510 automatically cross-references expert social commentary against primary data from other arm modules 200 in the data ingestion layer 104. When experts discuss a particular development—for example, a new pharmaceutical compound—the real-time source triangulator 510 simultaneously retrieves clinical trial data from a clinical trial registry arm, adverse event data from a drug safety database arm, published research from a biomedical publication arm, and company filings from a financial regulatory arm, producing a triangulated evidence set that combines expert interpretation with primary source data.

The public discourse intelligence engine 500 further performs a watchdog function by surfacing credentialed expert dissent that may be underreported by traditional media outlets. When practitioners or researchers with verified credentials report findings or observations that contradict published results or prevailing narratives, the public discourse intelligence engine 500 identifies and elevates these perspectives based on the evidence quality and the source credibility established through the expert identity mapper 502 and the publication database cross-reference 504.

Figure 6:
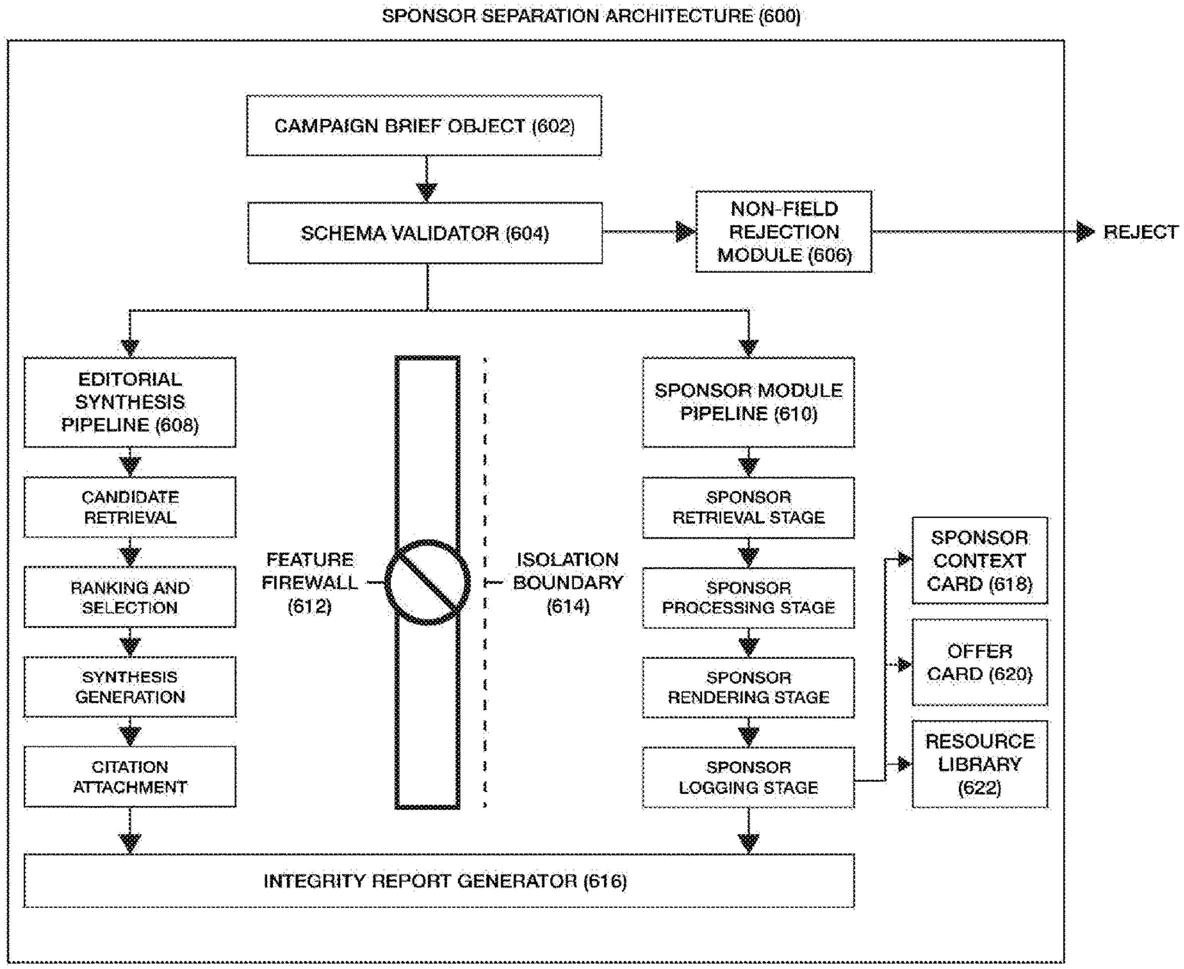
FIG. 6 is an architecture diagram of a sponsor separation architecture, according to some aspects of the present disclosure.

Referring to FIG. 6, a sponsor separation architecture 600 includes a campaign brief object 602 passing through a schema validator 604 incorporating a non-field rejection module 606, with two isolated pipelines: an editorial synthesis pipeline 608 and a sponsor module pipeline 610 separated by a feature firewall 612 and an isolation boundary 614, with an integrity report generator 616 monitoring both pipelines and producing outputs including a sponsor context card 618, an offer card 620, and a resource library 622. The sponsor separation architecture 600 enforces the architectural constraint that sponsors may fund scope and distribution but may not change what the intelligence platform system 100 says about the world. The sponsor separation architecture 600 receives input from sponsors in the form of a campaign brief object 602, which is a structured, immutable, versioned record. The campaign brief object 602 has core fields including a sponsor identifier and brand identifier, funded verticals, audience segment intent expressed as declared segments rather than inferred personal data, conversion goal type, scope expansion targets identifying adjacent domains the sponsor funds the system to monitor more intensively, geography and language and time window specifications, compliance constraints, and sponsor module parameters specifying allowed module types, allowed claims whitelists, prohibited claims blacklists, required disclosures, and call-to-action formats.

The campaign brief object 602 is processed by a schema validator 604 before any further processing occurs. The schema validator 604 incorporates a non-field rejection module 606 that detects and rejects any input referencing editorial ranking, editorial inclusion, suppression, or tone, any instruction to promote, downrank, avoid, or highlight specific non-sponsor entities, or any other input that would cross the sponsor-editorial boundary. The non-field rejection module 606 operates at schema validation time, rejecting impermissible inputs before any human judgment is required. The schema itself enforces the sponsor-editorial boundary as a structural property of the data model.

Following validation, the sponsor separation architecture 600 processes briefing generation through two isolated pipelines separated by the feature firewall 612 and the isolation boundary 614. The editorial synthesis pipeline 608 performs all editorial functions: candidate retrieval, ranking, selection, synthesis, and citation attachment. The editorial synthesis pipeline 608 has no access to sponsor identifiers as ranking features, enforced at the code level by the feature firewall 612. The sponsor module pipeline 610 generates labeled sponsor content units using separate retrieval queries, separate prompts, a separate renderer, and separate logging. The isolation boundary 614 ensures that no data flows from the sponsor module pipeline 610 to the editorial synthesis pipeline 608 that could influence editorial selection or ranking.

The sponsor module pipeline 610 produces sponsor modules in three distinct labeled formats: the sponsor context card 618 providing factual product or service context with permitted claims only, the offer card 620 providing labeled calls to action that never appear inside editorial paragraphs, and the resource library 622 providing sponsor-funded links separated from editorial content. Sponsor modules are permitted only when contextually relevant to the content vertical. Negative or contradictory evidence about a sponsor is never suppressed.

The integrity report generator 616 continuously monitors both the editorial synthesis pipeline 608 and the sponsor module pipeline 610 and automatically generates Integrity Reports proving sponsor-blind editorial behavior for any specified time window. Each Integrity Report includes identity and scope fields, editorial synthesis proof including retrieval queries and evidence bundle hashes, sponsor isolation proof including separate retrieval documentation and evidence that sponsor identifiers were excluded from ranking features, learning and experimentation proof confirming that sponsor-module interactions were excluded from training data, firewall attestations, corrections and disputes documentation, and signature and anchor verification fields enabling cryptographic verification through the tamper-evident audit anchoring system 400.

Figure 7:
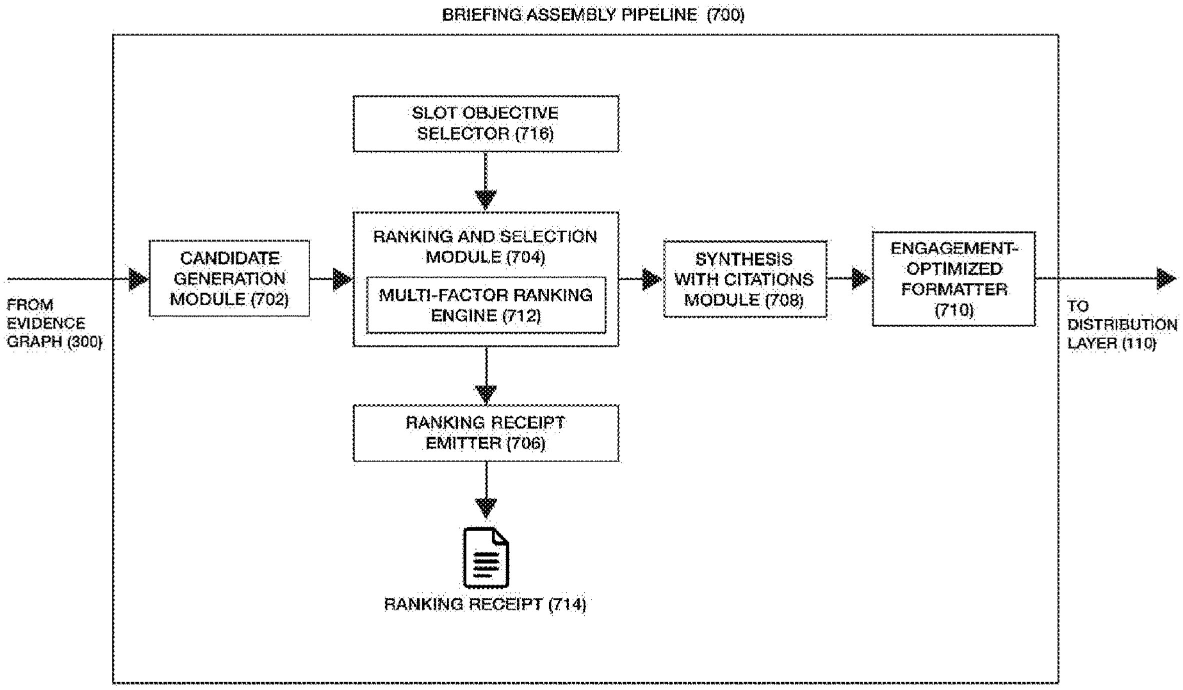
FIG. 7 is a flow diagram of a briefing assembly pipeline, according to some aspects of the present disclosure.

Referring to FIG. 7, a briefing assembly pipeline 700 includes a candidate generation module 702 feeding a ranking and selection module 704 that emits output through a ranking receipt emitter 706, followed by a synthesis with citations module 708 and an engagement-optimized formatter 710, with the ranking and selection module 704 incorporating a multi-factor ranking engine 712, producing a ranking receipt 714, and receiving input from a slot objective selector 716. The AI assembly layer 108 operates through the briefing assembly pipeline 700 that orchestrates the transformation of evidence into personalized subscriber briefings. The briefing assembly pipeline 700 treats the underlying language model as a constrained writer—the model may only generate content using retrieved evidence from the evidence graph 300 and must attach citations to every material claim.

The briefing assembly pipeline 700 begins with the candidate generation module 702 that, for each content vertical and time window, retrieves candidate items from the evidence index. The candidate generation module 702 applies freshness windows with exceptions for slow-moving, high-importance items, deduplicates candidates, and clusters related candidates into event groups.

Retrieved candidates flow to the ranking and selection module 704 incorporating a multi-factor ranking engine 712. The multi-factor ranking engine 712 scores each candidate across multiple factors including but not limited to source authority, corroboration across independent sources, novelty relative to prior consensus, velocity of expert discourse, and subscriber relevance. The relative weights assigned to these factors are continuously optimized through a truth-constrained RLHF ranking optimization system 900 described below in reference to FIG. 9. The ranking and selection module 704 receives input from the slot objective selector 716 that specifies the objective for each story position within the briefing—for example, a Lead slot optimized for significance, a Surprise slot optimized for novelty, and an Expert Brief slot optimized for credible discourse.

For each selected story slot, the ranking and selection module 704 emits output through the ranking receipt emitter 706 that produces the ranking receipt 714. The ranking receipt 714 captures: a hash of the candidate set considered, the chosen item identifier, the slot objective identifier, a hash of the weight vector used together with Learning Policy Registry identifiers, constraint check results for citation coverage, domain guardrails, rights compliance, diversity floors, and obligation rules as pass or fail attestations, and reason codes explaining the selection. The ranking receipt 714 is stored in the provenance bundle and supports audits and debugging without exposing exploitable thresholds or full feature weights.

Following selection, the synthesis with citations module 708 generates the narrative content for each selected story. The synthesis with citations module 708 generates multiple output sizes from the same evidence set, ranging from approximately 100-word briefs to approximately 500-word deep dives, without changing the underlying facts or evidence basis. The synthesis with citations module 708 labels known information versus uncertain information, presents competing interpretations where evidence is in conflict, and attaches inline citations with a source list and direct links to source documents.

Material claims in each generated briefing are classified into one of three confidence categories: directly supported by a cited source, synthesized across multiple sources with the sources identified, or inference with stated uncertainty. This claim classification enables subscribers to assess the evidentiary basis for each statement in their briefing.

The engagement-optimized formatter 710 formats each story to maximize comprehension and engagement. The engagement-optimized formatter 710 leads every story with the most surprising or consequential element, creating an information gap that motivates reading. Format is varied daily to prevent pattern fatigue. Each briefing concludes with a monitoring preview of a developing story for the following day, clearly labeled as informational and always presenting available information rather than withholding it.

Figure 8:
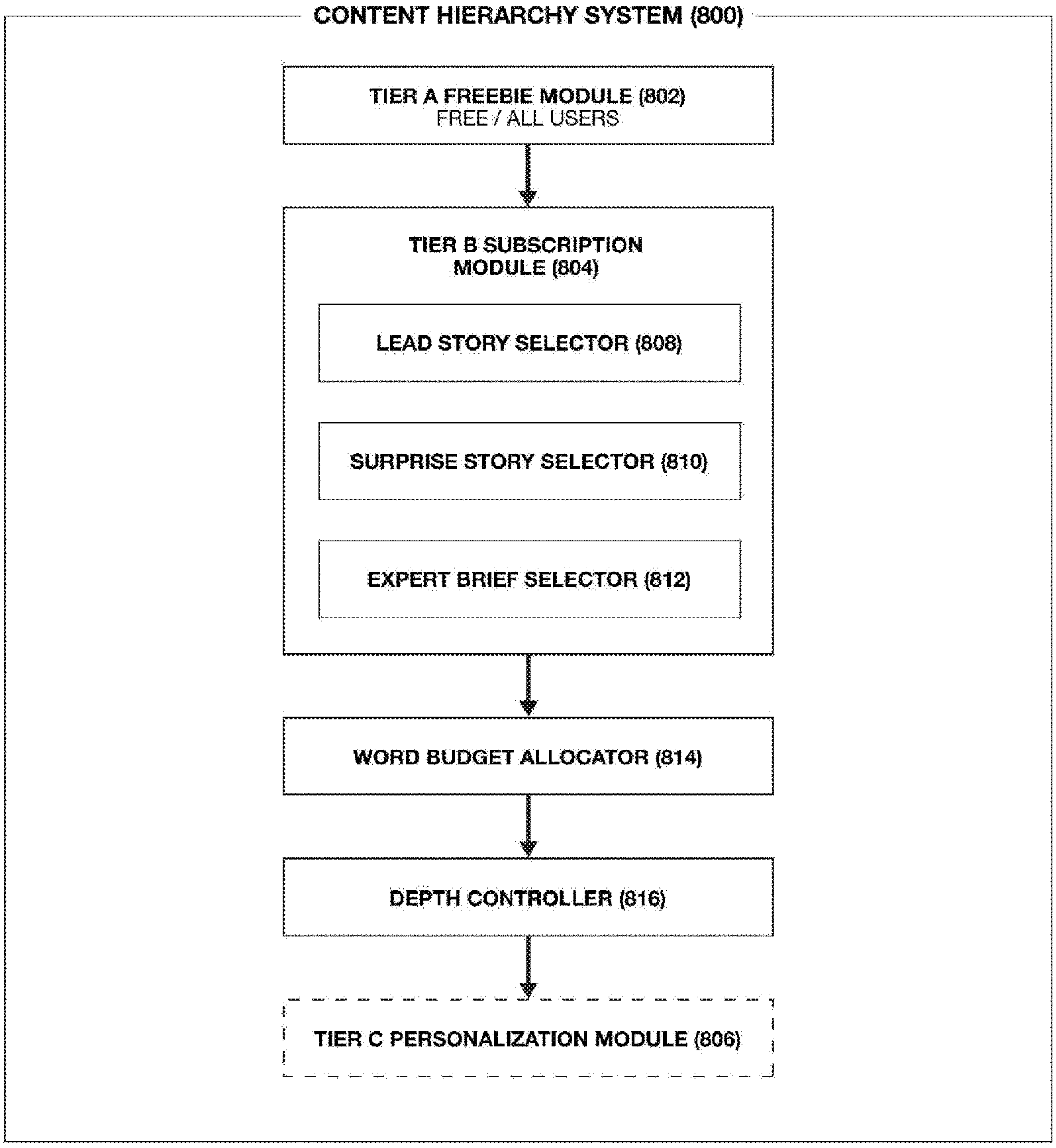
FIG. 8 is a hierarchical diagram of a content hierarchy system, according to some aspects of the present disclosure.

Referring now to FIG. 8, a content hierarchy system 800 includes a tier A freebie module 802, a tier B subscription module 804, and a tier C personalization module 806, with the tier B module incorporating a lead story selector 808, a surprise story selector 810, an expert brief selector 812, a word budget allocator 814, and a depth controller 816. The content hierarchy system 800 organizes briefing output into a three-tier hierarchy that serves distinct functions and audiences. The tier A freebie module 802 generates one to approximately three stories every person should know today—major developments that transcend any single content vertical, such as a major judicial ruling, a global event, or a significant breaking development. Each freebie story comprises approximately 100 words maximum plus a link to the primary source. The tier A freebie module 802 distributes to all users regardless of subscription status—subscribers, free users, social media followers, and website visitors—with no paywall, no accountability charge, and no credit card requirement.

The tier B subscription module 804 generates the personalized intelligence briefing for each subscriber within their selected content verticals and word budget. The tier B subscription module 804 includes a lead story selector 808 that selects the single most important development across the subscriber's selected verticals, a surprise story selector 810 that selects the most unexpected, counterintuitive, or consequential finding across the subscriber's verticals, and an expert brief selector 812 that curates a snapshot of what top credentialed voices are saying on open social platforms, sourced from the public discourse intelligence engine 500.

The tier B subscription module 804 further includes a word budget allocator 814 and a depth controller 816 that together manage the subscriber's daily content allocation. The word budget allocator 814 distributes the subscriber's daily word budget across stories in any combination the subscriber selects. A word budget of 1,500 words may be consumed as three 500-word deep dives, fifteen 100-word briefs, or any combination. The depth controller 816 instructs the synthesis with citations module 708 to generate content at the requested depth from the same evidence set at no additional computational or billing cost.

The tier C personalization module 806 represents a future progressive personalization capability in which, within selected verticals, the system learns which subtopics generate the longest reading times and adjusts story selection accordingly. The tier C personalization module 806 is described for enablement purposes and represents a separate, later optimization distinct from the system-wide RLHF loop of the truth-constrained RLHF ranking optimization system 900.

Figure 9:
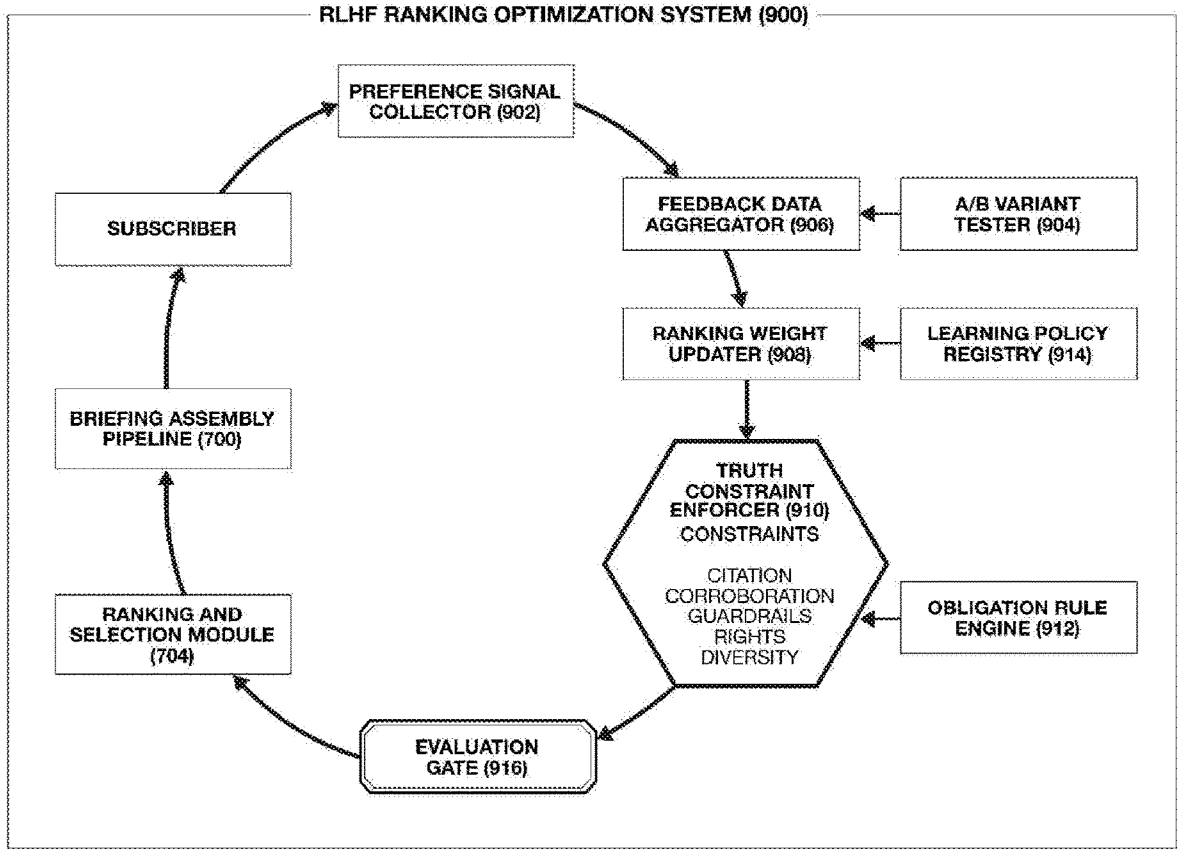
FIG. 9 is a loop diagram of a Reinforcement Learning from Human Feedback ("RLHF") ranking optimization system, according to some aspects of the present disclosure.

Referring to FIG. 9, an RLHF ranking optimization system 900 includes a preference signal collector 902, an A/B variant tester 904, a feedback data aggregator 906, a ranking weight updater 908, a truth constraint enforcer 910, an obligation rule engine 912, a learning policy registry 914, and an evaluation gate 916 governing weight update deployment. The truth-constrained RLHF ranking optimization system 900 continuously improves the editorial judgment of the intelligence platform system 100 through empirical feedback from verified subscribers, under hard constraints that prevent the optimization from degrading evidence quality, suppressing dissent, or enabling sponsor influence.

The preference signal collector 902 collects feedback from each story in the subscription briefing. Explicit feedback comprises a simple binary input-a positive rating or a negative rating-presented with minimal friction. One interaction, zero navigational overhead. Implicit feedback comprises passive engagement signals including dwell time, scroll depth, and scroll velocity captured alongside explicit ratings. The preference signal collector 902 informs subscribers that their ratings improve briefing quality over time and contribute to the community's intelligence.

The A/B variant tester 904 operates on a random subset of approximately 10 to approximately 20 percent of subscribers on any given day. For this subset, the A/B variant tester 904 identifies the two highest-ranked candidate stories for a briefing slot and randomly assigns which candidate each subscriber receives. Both variants are drawn from the top tier of candidates—the quality floor remains high for both groups. The A/B variant tester 904 tests whether different ranking factor weightings produce stories that verified readers prefer, testing Rank 1 versus Rank 2 rather than Rank 1 versus a substantially lower-ranked alternative.

The feedback data aggregator 906 collects and structures all preference data per rating event, including which story was served and which alternative existed, the ranking factor weights that selected the story, and the subscriber's vertical and tier and engagement profile in anonymized form, the explicit rating, passive engagement signals. The feedback data aggregator 906 further determines whether the story was an A/B test variant and which variant was assigned, and the subscriber's Rater Trust Score as computed by a preference integrity system 1000 described below in reference to FIG. 10.

The ranking weight updater 908 processes aggregated preference data to adjust the ranking factor weights used by the multi-factor ranking engine 712 in the ranking and selection module 704. The ranking weight updater 908 optimizes weights at the vertical level rather than at the individual subscriber level—it answers the question of what makes a story genuinely valuable across all verified readers in a particular content vertical. Individual personalization at the subscriber level is a separate capability of the tier C personalization module 806 and operates independently.

Weight updates produced by the ranking weight updater 908 must pass through the truth constraint enforcer 910 before deployment. The truth constraint enforcer 910 enforces hard constraints that weight updates cannot violate. These hard constraints include: citation coverage floors requiring that a minimum percentage of material claims have supporting source links, corroboration requirements for high-impact claims, domain guardrails prohibiting diagnosis, treatment, or individualized advice claims in health, finance, and legal verticals, rights compliance constraints, sponsor separation constraints confirmed through the feature firewall 612 and the isolation boundary 614, and diversity floors ensuring minimum credible dissent exposure, subtopic coverage within verticals, and source diversity.

The obligation rule engine 912 enforces a separate class of hard constraints: if an item crosses a defined evidence-significance threshold—such as a safety alert, a major regulatory action, or a market-moving filing—it must remain eligible for selection regardless of predicted preference. The Surprise slot maintains a novelty floor that cannot be trained away into comfort content. Dissent is not downranked solely because it is unpopular; dissent is evaluated on evidence quality and source credibility.

All optimization artifacts are versioned in the learning policy registry 914, which maintains records of ranking weight vectors, reward definitions, slot objectives, and constraint policies. Each briefing references the specific Learning Policy Registry identifiers used for its generation, making learning evolution provable over time and preventing silent editorial drift through untracked weight changes. Weight updates are treated as deployable artifacts subject to an evaluation gate 916, which blocks deployment unless all applicable test suites pass, as further described below in reference to FIG. 14.

Sponsor-module interactions are explicitly excluded from the preference learning dataset. The sponsor module pipeline 610 generates content and collects interaction data in complete isolation from the editorial synthesis pipeline 608. Sponsor-module clicks, conversions, and dwell time are never included in the feedback data aggregated by the feedback data aggregator 906. This ensures that sponsors cannot purchase influence through behavioral optimization—the learning loop is driven by editorial content only.

The RLHF ranking optimization system 900 creates a compounding advantage for the intelligence platform system 100. More subscribers generate more preference signals. More signals produce better ranking weights. Better weights produce better briefings. Better briefings produce higher engagement and more subscribers. The truth constraints ensure this positive feedback loop accelerates toward better editorial judgment rather than toward populist comfort or advertiser-friendly content.

Figure 10:
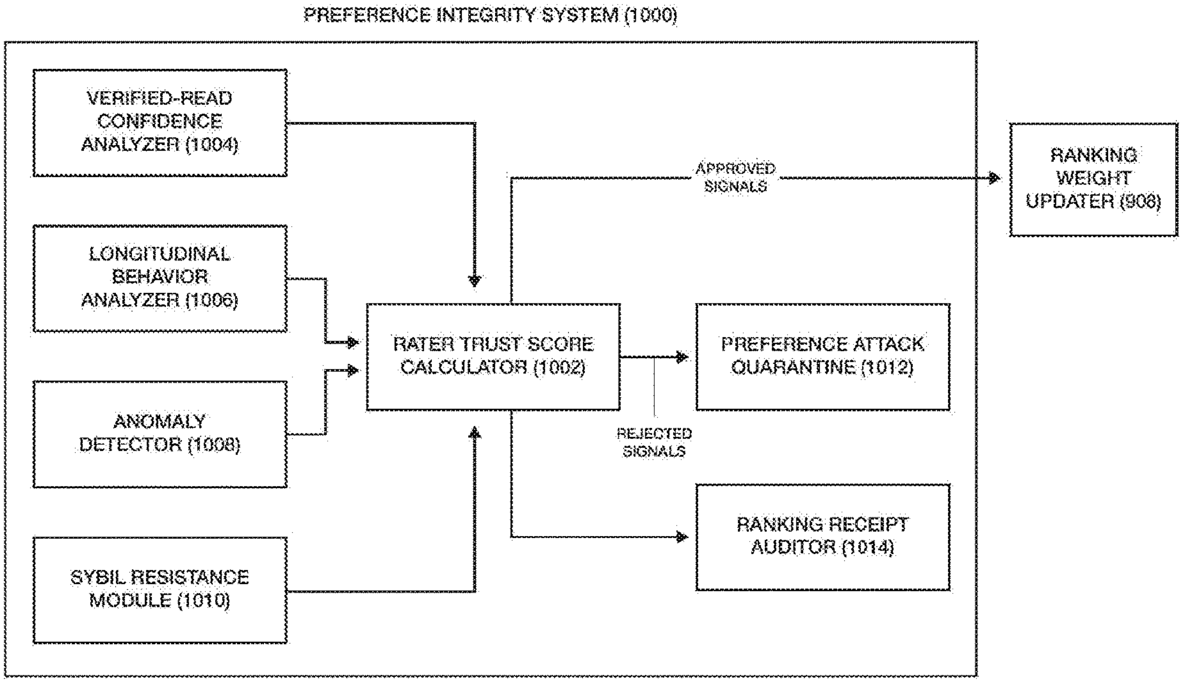
FIG. 10 is a block diagram of a preference integrity system, according to some aspects of the present disclosure.

Referring to FIG. 10, a preference integrity system 1000 includes a rater trust score calculator 1002 receiving inputs from a verified-read confidence analyzer 1004, a longitudinal behavior analyzer 1006, an anomaly detector 1008, and a sybil resistance module 1010, with outputs feeding a preference attack quarantine 1012 and a ranking receipt auditor 1014. The preference integrity system 1000 defends the RLHF ranking optimization system 900 against coordinated or automated manipulation of preference signals. Because preference feedback drives ranking weight updates, the preference signal pathway represents an attack surface that adversaries may attempt to exploit through rating brigades, sybil preference farms, sponsor-adjacent astroturfing, ideological preference skew campaigns, or passive-signal gaming.

The preference integrity system 1000 includes a rater trust score calculator 1002 that computes a credibility weight for each subscriber's preference signals. The rater trust score calculator 1002 receives inputs from four analysis modules. The verified-read confidence analyzer 1004 assesses whether the subscriber likely read the story before rating it, using signals from the reading verification system 1102 described below in reference to FIG. 11. The longitudinal behavior analyzer 1006 evaluates the subscriber's rating behavior over time, assessing variance, coherence, and absence of mechanical patterns. The anomaly detector 1008 identifies bursts, coordinated timing, device-farm signatures, and other indicators of non-organic rating behavior. The sybil resistance module 1010 evaluates account uniqueness signals consistent with the broader fraud detection stack.

Low-trust or anomalous ratings identified by the rater trust score calculator 1002 are excluded from weight updates and directed to a preference attack quarantine 1012 for logging and potential escalation. The preference attack quarantine 1012 records attack logs, quarantine windows, and trust score distributions for internal and auditor review. Preference integrity outcomes are logged and included in anchored audit artifacts through the tamper-evident audit anchoring system 400.

The ranking receipt auditor 1014 enables auditing of story-selection decision artifacts by analyzing ranking receipts 714 to verify that ranking decisions are consistent with declared constraint policies and weight vectors, without exposing exploitable thresholds or full ranking feature weights to external parties.

Figure 11:
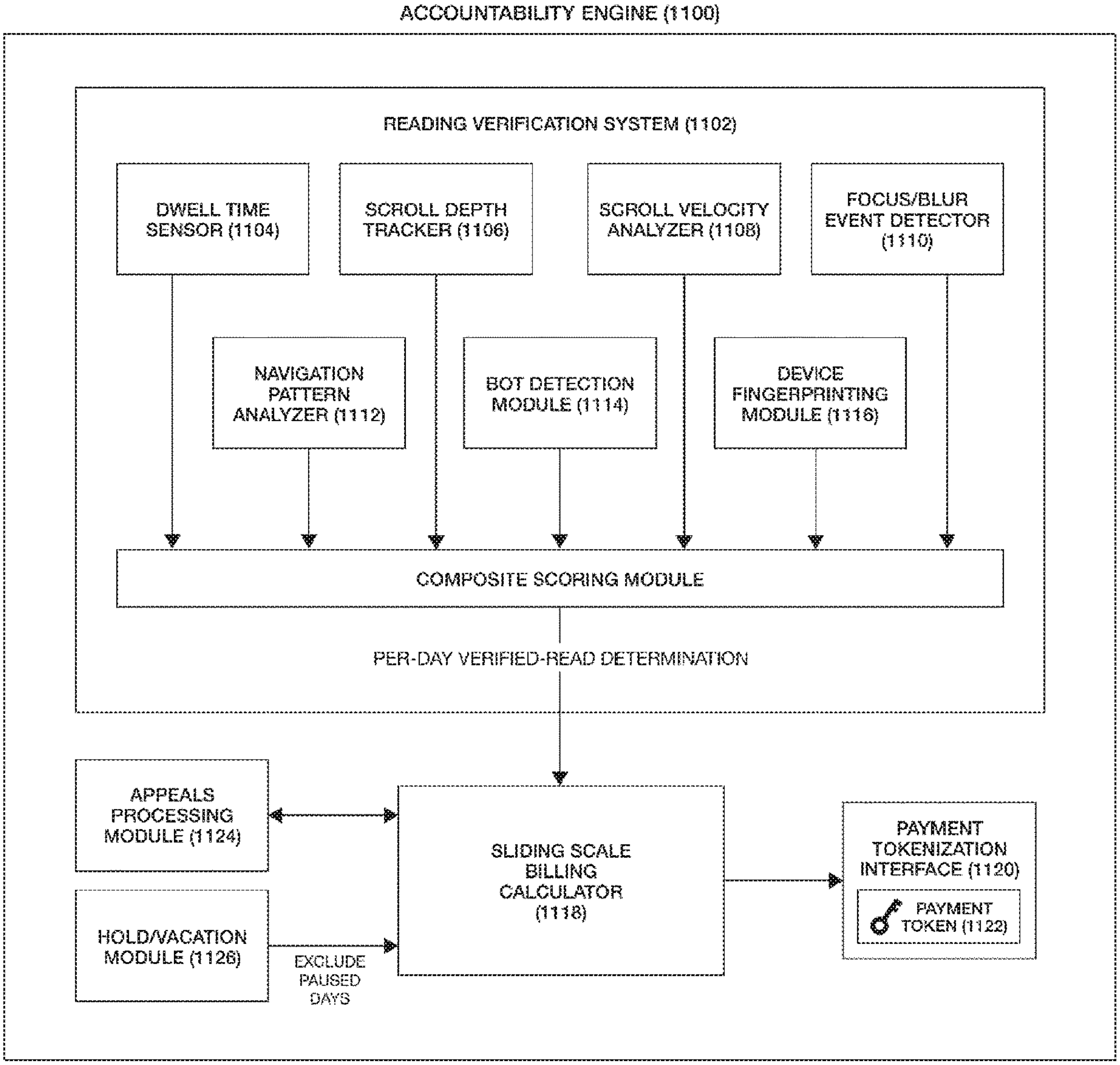
FIG. 11 is a combined flow and block diagram of an accountability engine, according to some aspects of the present disclosure.

Referring to FIG. 11, an accountability engine 1100 includes a reading verification system 1102 incorporating a dwell time sensor 1104, a scroll depth tracker 1106, a scroll velocity analyzer 1108, a focus/blur event detector 1110, a navigation pattern analyzer 1112, a bot detection module 1114, and a device fingerprinting module 1116, with outputs feeding a sliding scale billing calculator 1118 connected to a payment tokenization interface 1120 storing a payment token 1122, an appeals processing module 1124, and a hold/vacation module 1126. The accountability engine 1100 implements the engagement-conditioned monetization model in which content access is conditionally free based on demonstrated consumption, with proportional charges accruing for unconsumed content within a monthly cap tied to the subscriber's selected tier.

The reading verification system 1102 verifies content consumption through multiple passive signals combined with anomaly detection, with no single signal trusted in isolation. The reading verification system 1102 includes the dwell time sensor 1104 that measures the time a subscriber spends viewing a briefing item, the scroll depth tracker 1106 that measures the percentage of content through which the subscriber scrolls, the scroll velocity analyzer 1108 that analyzes the variance in scroll speed to distinguish genuine reading from rapid scrolling, the focus/blur event detector 1110 that detects whether the subscriber's application or browser window maintains focus during the measurement period, and the navigation pattern analyzer 1112 that evaluates the subscriber's interaction patterns within the briefing.

The reading verification system 1102 further includes the bot detection module 1114 that identifies non-human interaction patterns, and the device fingerprinting module 1116 that performs privacy-respecting device identification to detect device farms and emulators. All signals from the reading verification system 1102 are combined and weighted by a composite scoring algorithm that produces a per-day verified-read determination with an associated confidence level. Email opens are explicitly not treated as proof of reading, as email clients may prefetch content and privacy tools may mask open events.

The sliding scale billing calculator 1118 receives per-day verified-read determinations from the reading verification system 1102 and computes the subscriber's monthly charge according to the following logic: each day the subscriber reads their briefing, as verified by the reading verification system 1102, the charge for that day equals zero. Each unread active day is charged at the per-day rate computed as the subscriber's monthly tier maximum divided by the number of active days in the billing period. The hold/vacation module 1126 enables subscribers to pause delivery at any time, with no content delivered and no charges accruing during the pause period. Paused days are excluded from the active-day denominator used by the sliding scale billing calculator 1118, preserving engagement metric validity.

According to one embodiment, the tiered access structure includes approximately four tiers with escalating content allocations: a first tier providing approximately one content vertical and approximately 500 words per day at a maximum monthly charge of approximately $4.99, a second tier providing approximately two verticals and approximately 1,500 words per day at approximately $9.99 per month, a third tier providing approximately three verticals and approximately 3,000 words per day at approximately $19.99 per month, and a fourth tier providing approximately five verticals and approximately 5,000 words per day at approximately $49.99 per month. The number of tiers, word budgets, and pricing may be adjusted as applicable.

The payment tokenization interface 1120 connects to an external payment processor to enable card-on-file billing without storing raw cardholder data on platform servers. Upon subscriber enrollment, the payment processor issues a payment token 1122 representing the subscriber's stored payment method. The intelligence platform system 100 stores only the payment token 1122, last four digits, expiration month and year, and processor event identifiers. The platform never stores primary account numbers, card verification values, or sensitive authentication data, minimizing payment card industry compliance scope and breach risk.

The appeals processing module 1124 enables subscribers to dispute any day marked as unread. The appeals processing module 1124 presents an explanation of the determination to the subscriber without exposing verification thresholds. If the confidence level of the unread determination is below a defined threshold, the appeals processing module 1124 automatically issues a credit. For repeated disputes, the appeals processing module 1124 routes the case to manual review. Every monthly charge and every appeal outcome is stored with a billing evidence bundle comprising inputs, timestamps, risk scores, decision paths, payment token references, and processor event identifiers, and anchored through the tamper-evident audit anchoring system 400.

The accountability engine 1100 further enforces subscriber onboarding in an exemplary sequence. During an initial period of approximately 30 days, new subscribers experience the full system with no credit card requirement. Following the initial period, subscribers are invited to continue under the accountability model by providing a valid credit card. The credit card requirement functions simultaneously as a friction barrier filtering automated bot signups, a frictionless billing enablement requiring no invoices or payment prompts, and a psychological commitment signal indicating genuine intent to engage. The credit card is one layer in a multi-layer fraud defense stack that also includes the behavioral analytics, anomaly detection, and device fingerprinting provided by the reading verification system 1102.

Figure 12:
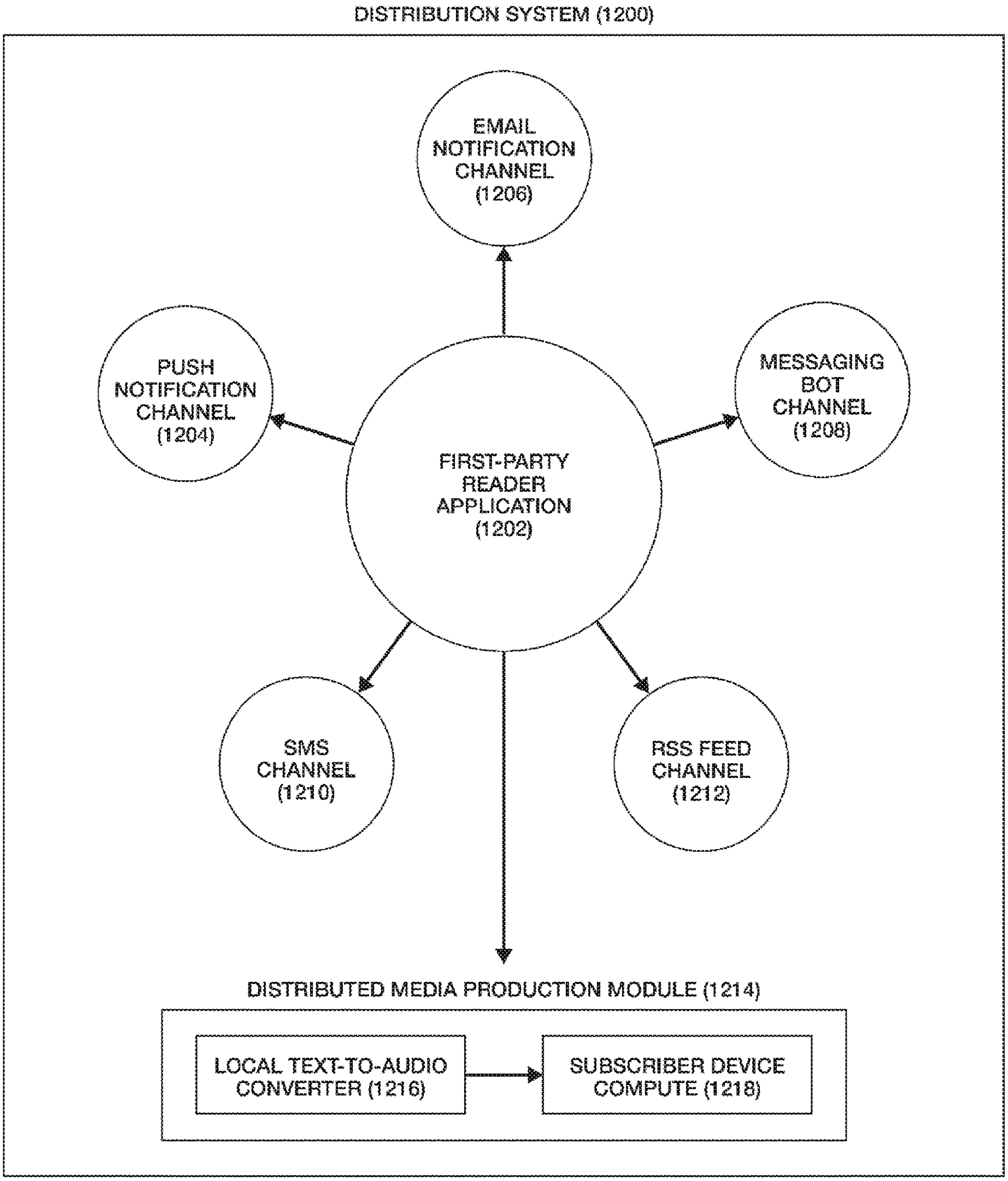
FIG. 12 is a distribution architecture diagram of a distribution system, according to some aspects of the present disclosure.

Referring to FIG. 12, a distribution system 1200 includes a first-party reader application 1202, a push notification channel 1204, an email notification channel 1206, a messaging bot channel 1208, an SMS channel 1210, an RSS feed channel 1212, and a distributed media production module 1214 incorporating a local text-to-audio converter 1216 executing on subscriber device compute 1218. The distribution system 1200 delivers assembled briefings through a multi-channel notification architecture designed to be resilient against single-platform suppression. The full briefing always resides in a first-party reader application 1202, which may be implemented as a native mobile application, a progressive web application, or both. The first-party reader application 1202 serves as the primary engagement measurement surface, preference feedback collection point, evidence archive, citation explorer, and permanent searchable knowledge repository.

Subscribers select one or more notification channels through which they are notified that their daily briefing is ready. Available notification channels include the push notification channel 1204 from the native app or progressive web application, the email notification channel 1206 delivering a short notification with the first few lines of the lead story and a link to the first-party reader application 1202, the messaging bot channel 1208 delivering notifications through messaging platforms, the SMS channel 1210 delivering short notifications with a link, and the RSS feed channel 1212 delivering a private authenticated feed URL. Each notification channel is independently sufficient for delivery. If any single channel is suppressed or becomes unavailable, other channels continue to function. No single point of failure exists in the distribution system 1200.

The distribution system 1200 further includes a distributed media production module 1214 for subscribers who prefer audio delivery. Rather than generating audio centrally, the distributed media production module 1214 provides the subscriber's personalized text briefing to a local text-to-audio converter 1216 executing on the subscriber's own device compute 1218. The local text-to-audio converter 1216 optionally interfaces with any suitable text-to-speech service including but not limited to cloud-based AI voice services accessed through the subscriber's own third-party accounts, or on-device text-to-speech capabilities requiring no external account. The platform bears zero marginal cost for media production. One million subscribers generating one million unique daily audio briefings consume one million devices' worth of compute without consuming any platform server resources. This architecture is format-agnostic and extensible to future media formats including video summaries, interactive dashboards, or immersive presentations using the same principle of centralized text intelligence with distributed local rendering.

Figure 13:
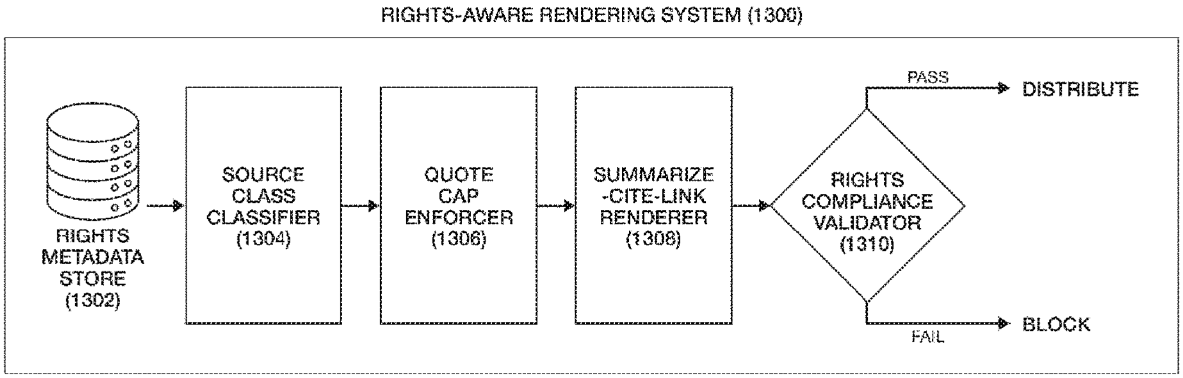
FIG. 13 is a pipeline diagram of a rights-aware rendering system, according to some aspects of the present disclosure.

Referring to FIG. 13, a rights-aware rendering system 1300 includes a rights metadata store 1302, a source class classifier 1304, a quote cap enforcer 1306, a summarize-cite-link renderer 1308, and a rights compliance validator 1310. The rights-aware rendering system 1300 enforces content rights, licensing, and terms compliance at generation time rather than through after-the-fact legal review. The rights-aware rendering system 1300 accesses the rights metadata store 1302 to retrieve per-document licensing metadata stored at ingestion time. The source class classifier 1304 classifies each source document into an access class that determines the rendering policy applied.

The quote cap enforcer 1306 applies per-source-class quotation limits at generation time, preventing the synthesis with citations module 708 from reproducing restricted content beyond permitted excerpt lengths. The summarize-cite-link renderer 1308 implements the default rendering behavior for paywalled or restricted content: summarize the relevant information in the system's own words, attach a citation to the source, and provide a link to the original. No full-text reproduction of restricted sources is permitted. The evidence graph 300 stores references and minimal necessary extracts rather than redistributable full text for restricted sources.

The rights compliance validator 1310 performs a final compliance check on each generated briefing before distribution, verifying that all output complies with source-class rendering policies, quote caps, and attribution requirements. Any output failing compliance validation is blocked from distribution and flagged for remediation.

Figure 14:
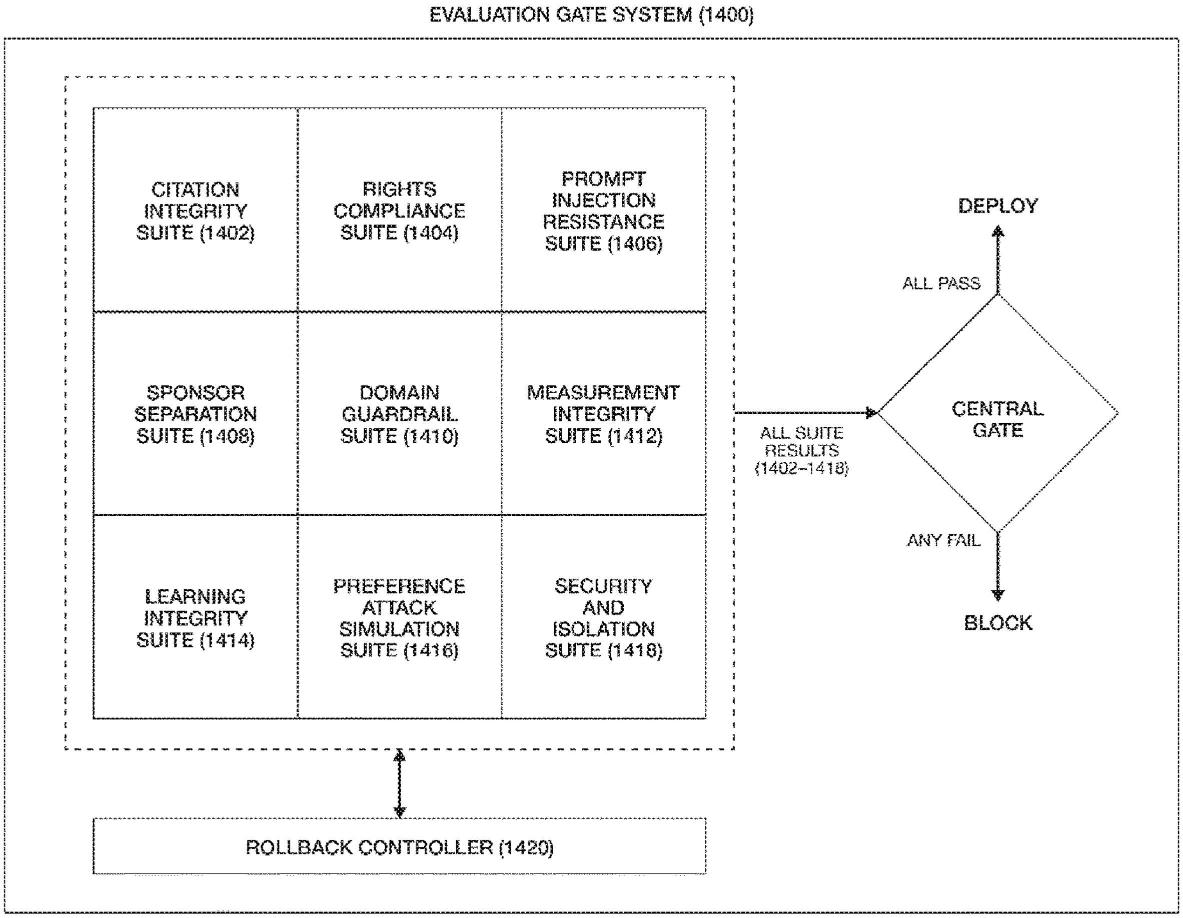
FIG. 14 is a block diagram of an evaluation gate system, according to some aspects of the present disclosure.

Referring to FIG. 14, an evaluation gate system 1400 includes a citation integrity suite 1402, a rights compliance suite 1404, a prompt injection resistance suite 1406, a sponsor separation suite 1408, a domain guardrail suite 1410, a measurement integrity suite 1412, a learning integrity suite 1414, a preference attack simulation suite 1416, a security and isolation suite 1418, and a rollback controller 1420. The evaluation gate system 1400 enforces method integrity through automated release control rather than human vigilance alone. The evaluation gate system 1400 blocks deployment of new models, prompts, policies, ranking-weight updates, or other system changes unless all applicable test suites pass.

The evaluation gate system 1400 has nine test suites. The citation integrity suite 1402 tests citation coverage, citation alignment with claims, missing citations, and hallucination rate. The rights compliance suite 1404 tests quote cap enforcement, summarize-cite-link behavior, and takedown simulation responses. The prompt injection resistance suite 1406 injects malicious strings into simulated retrieved content and verifies that the strings are ignored by the synthesis pipeline. The sponsor separation suite 1408 verifies that sponsor identifiers are excluded from ranking features, that pipeline isolation is maintained, and that editorial synthesis precedes sponsor module generation. The domain guardrail suite 1410 tests health, finance, and legal boundary enforcement. The measurement integrity suite 1412 runs bot simulations and anomaly detection tests to verify that the reading verification system 1102 correctly identifies non-genuine reading. The learning integrity suite 1414 validates weight updates against holdout datasets, verifying that preference satisfaction is stable or improved while citation coverage, corroboration requirements, guardrails, rights compliance, and diversity floors do not regress, and performing unpopular truth retention checks. The preference attack simulation suite 1416 generates synthetic brigades and rating farms to validate that the preference integrity system 1000 prevents weight manipulation. The security and isolation suite 1418 tests role-based access control enforcement, cross-tenant isolation, secrets handling, audit log completeness, API authentication, and unauthorized access prevention.

A release is blocked by the evaluation gate system 1400 if any applicable suite fails for the affected domains. Ranking-weight updates from the RLHF ranking optimization system 900 are treated as release artifacts and must pass all applicable gates. A failure of the security and isolation suite 1418 blocks any release touching high-impact domains or sponsor and auditor surfaces. The rollback controller 1420 automatically rolls back any deployment upon detection of metric regression beyond defined deltas and generates an incident bundle for review.

Figure 15:
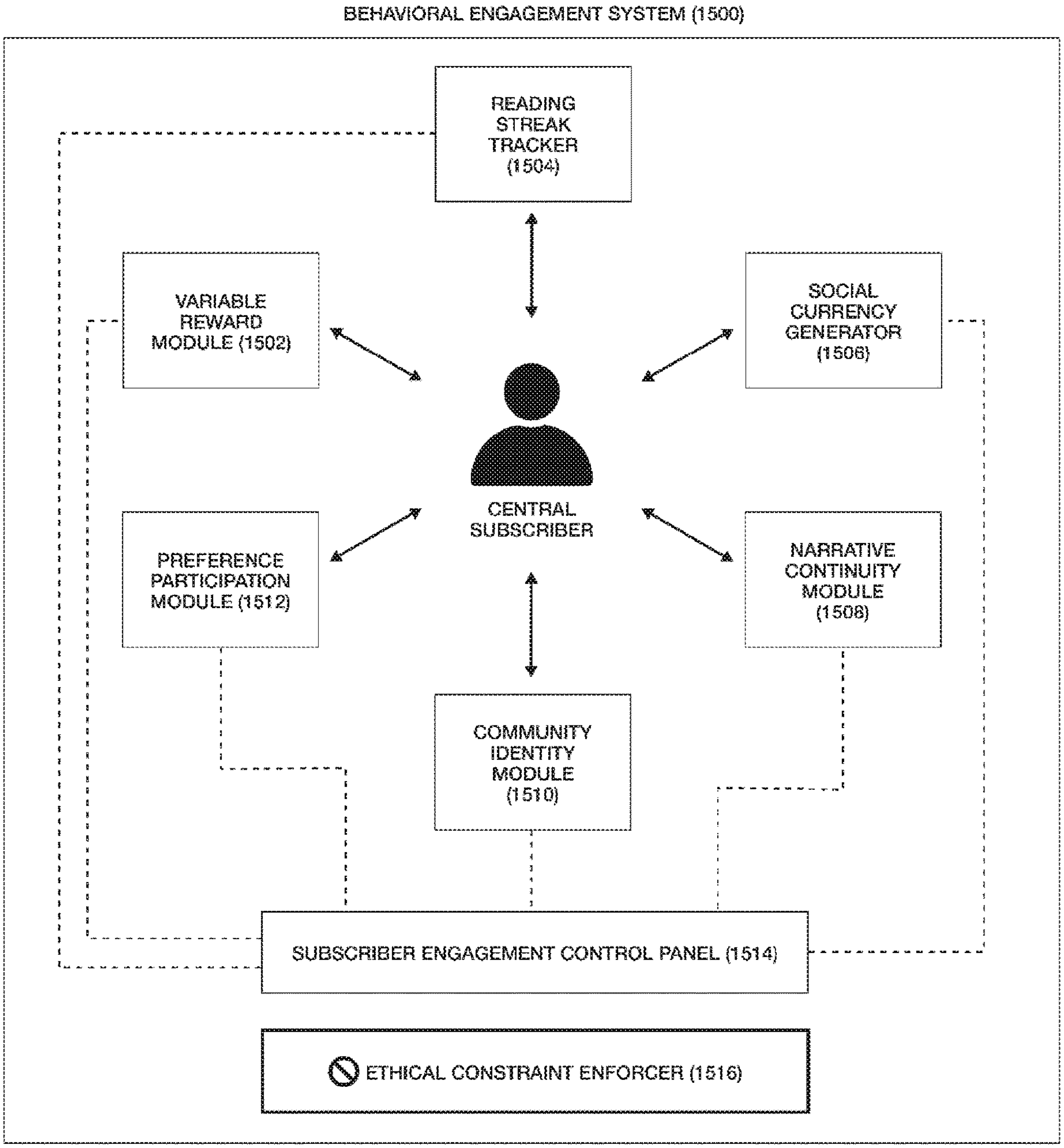
FIG. 15 is a system diagram of a behavioral engagement system, according to some aspects of the present disclosure.

Referring to FIG. 15, a behavioral engagement system 1500 includes a variable reward module 1502, a reading streak tracker 1504, a social currency generator 1506, a narrative continuity module 1508, a community identity module 1510, a preference participation module 1512, a subscriber engagement control panel 1514, and an ethical constraint enforcer 1516. The behavioral engagement system 1500 employs evidence-based behavioral design to create sustained daily engagement through genuine value rather than exploitation. The behavioral engagement system 1500 includes six functional modules operating under the ethical constraint enforcer 1516 and subject to subscriber control through the subscriber engagement control panel 1514.

The variable reward module 1502 leverages the inherent unpredictability of real-time primary-source intelligence to provide variable reward—the subscriber does not know what they will discover each day. The AI assembly layer 108 leads with the most surprising element, creating an information gap that motivates complete reading. Format variation is applied daily to prevent pattern fatigue.

The reading streak tracker 1504 displays consecutive reading days alongside the subscriber's current monthly charge, which approaches zero as reading consistency increases. Breaking the streak incurs both a financial cost and an identity cost, leveraging loss aversion in a manner that aligns with the subscriber's own stated goal of staying informed. The hold/vacation module 1126 serves as a critical counterbalance, enabling streak pause without penalty and preventing streak fatigue.

The social currency generator 1506 ensures that the briefing content-derived from primary sources and real-time expert commentary-produces insights unavailable elsewhere, creating social currency for the subscriber when they share knowledge that others have not encountered through conventional media channels. The narrative continuity module 1508 generates a monitoring preview at the conclusion of each briefing, previewing a developing story for the following day and creating an open cognitive loop that motivates return. The community identity module 1510 tracks reading milestones and enables status within the platform, evolving subscriber identity from passive consumer to community member. The preference participation module 1512 transforms subscribers from passive consumers into active participants shaping the platform's editorial intelligence through the preference feedback mechanisms of the RLHF ranking optimization system 900.

The subscriber engagement control panel 1514 enables subscribers to disable any engagement feature independently, including streak displays, monitoring previews, push notifications, preference feedback prompts, and milestone notifications. The ethical constraint enforcer 1516 imposes limits on all engagement mechanisms, prohibiting deceptive techniques, manipulative scarcity, countdown timers, dark-pattern billing, or any other mechanism designed to compel behavior rather than enhance genuine value. The behavioral engagement system 1500 optimizes for daily usefulness to the subscriber rather than compulsion.

Figure 16:
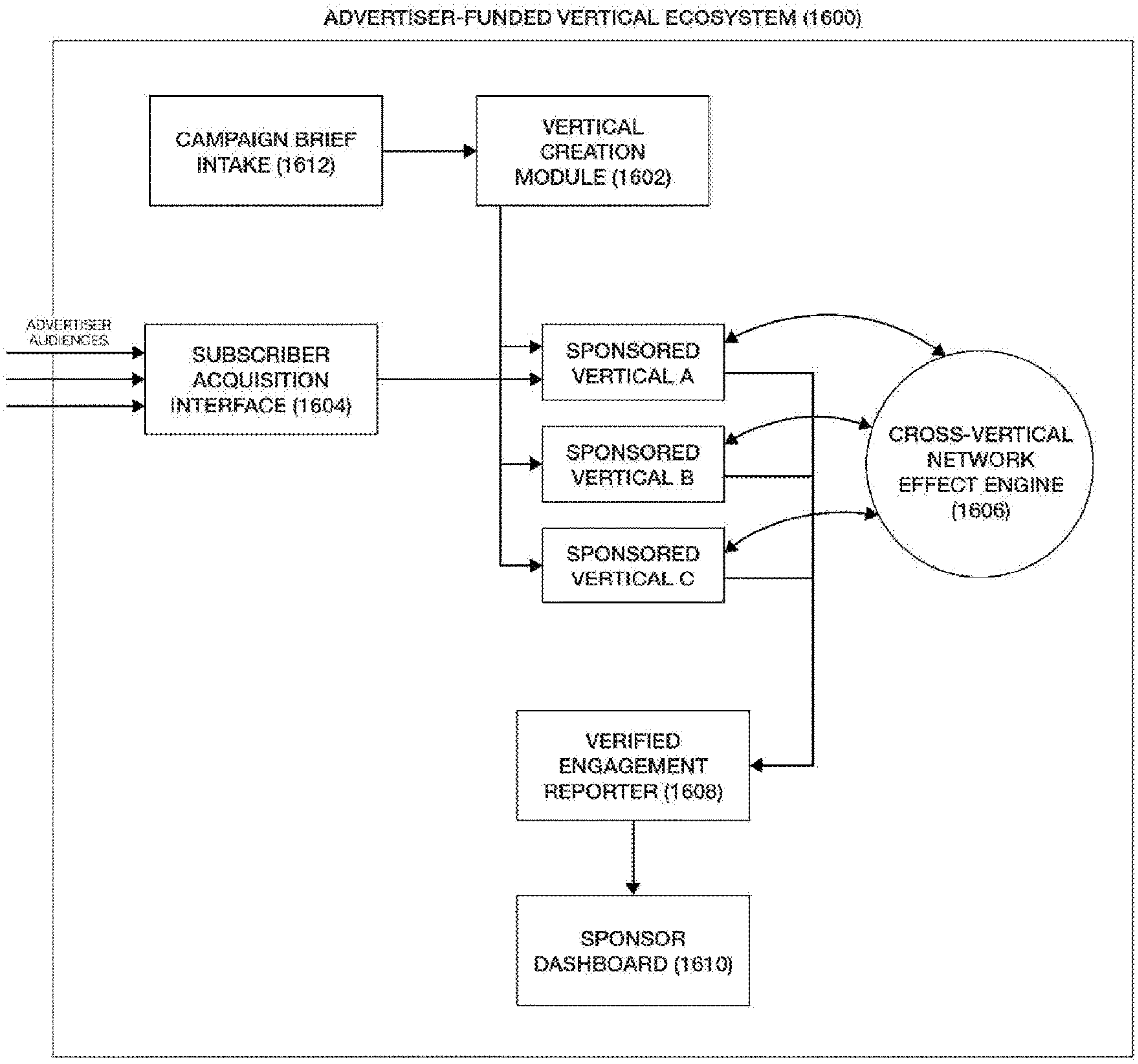
FIG. 16 is an ecosystem diagram of an advertiser-funded vertical ecosystem, according to some aspects of the present disclosure.

Referring to FIG. 16, an advertiser-funded vertical ecosystem 1600 includes a vertical creation module 1602, a subscriber acquisition interface 1604, a cross-vertical network effect engine 1606, a verified engagement reporter 1608, a sponsor dashboard 1610, and a campaign brief intake 1612. The advertiser-funded vertical ecosystem 1600 implements the business model through which advertisers fund content domains, drive subscriber acquisition through their own existing marketing infrastructure, and benefit from cross-vertical network effects. The vertical creation module 1602 enables the creation of new content verticals funded by advertiser sponsors. Each new vertical requires a source plan mapping specific arm modules 200 to the vertical, a ranking policy defining per-vertical ranking factor configurations, disclosure rules, and domain guardrails appropriate to the vertical's subject matter.

The subscriber acquisition interface 1604 enables advertisers to direct their existing audiences—social followers, email lists, retail customers, professional networks—to free intelligence briefings in their sponsored domain. Rather than sending traffic to landing pages where a high percentage may bounce and leave, advertisers send traffic to genuinely valuable, AI-powered intelligence content that creates daily return behavior. The platform's subscriber acquisition cost is expected to be approximately zero for advertiser-funded verticals because each advertiser uses their own existing marketing infrastructure.

The cross-vertical network effect engine 1606 exposes subscribers who enter through one sponsored vertical to other available verticals, which may be sponsored by different advertisers. A subscriber entering through an athletic performance vertical sponsored by one advertiser may discover nutrition and longevity verticals sponsored by other advertisers. Every advertiser's audience feeds every other advertiser's verticals, creating compounding network effects.

The verified engagement reporter 1608 provides sponsors with engagement metrics derived from the accountability engine 1100. Metrics comprise verified readership reported as a range with confidence bounds, editorial and sponsor module consumption metrics separated and never conflated, and aggregated analytics with individual subscriber privacy protected. The sponsor dashboard 1610 provides sponsors with access to verified engagement reports, campaign performance data, and Integrity Reports confirming sponsor-blind editorial behavior. The campaign brief intake 1612 receives and processes campaign brief objects 602 from sponsors.

Figure 17:
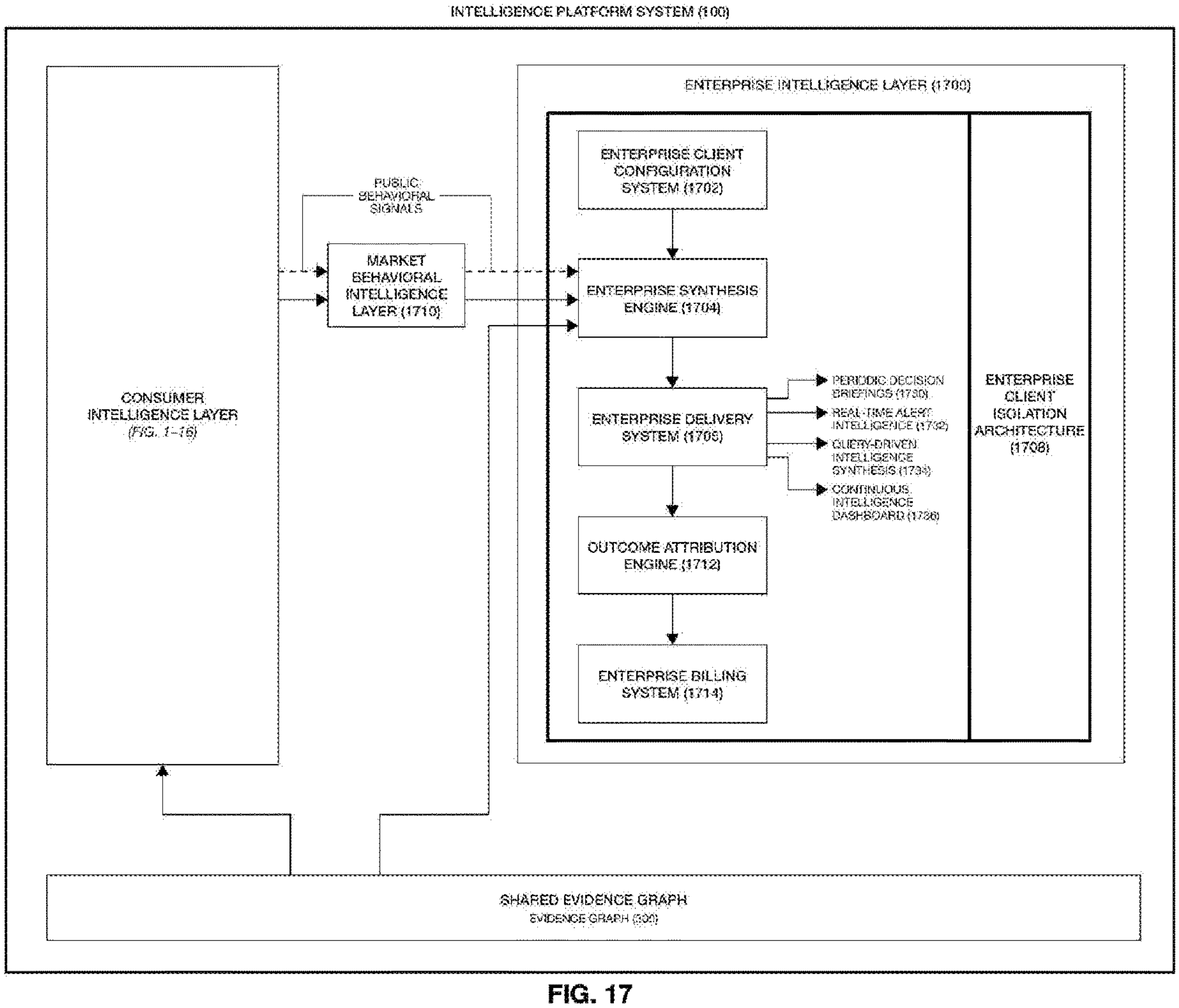
FIG. 17 is a system-level block diagram of an enterprise intelligence layer, according to some aspects of the present disclosure.

Referring to FIG. 17, is an enterprise intelligence layer 1700 includes an enterprise intelligence layer as a parallel output pathway from the intelligence platform system 100, with an enterprise client configuration system 1702, an enterprise synthesis engine 1704, an enterprise delivery system 1706 with four output pathways for periodic decision briefings, real-time alert intelligence, query-driven intelligence synthesis, and a continuous intelligence dashboard, an enterprise client isolation architecture 1708, a market behavioral intelligence layer 1710 bridging the consumer intelligence layer and the enterprise intelligence layer, an outcome attribution engine 1712, an enterprise billing system 1714, and the shared evidence graph 300 feeding both the consumer intelligence layer and the enterprise synthesis engine 1704. The enterprise intelligence layer 1700 operates as a second major output pathway from the intelligence platform system 100, consuming evidence from the same evidence index and provenance graph layer 106 and AI assembly layer 108 that serve the consumer intelligence layer. The enterprise intelligence layer 1700 does not ingest enterprise client proprietary data. The enterprise intelligence layer 1700 synthesizes intelligence exclusively from publicly available sources ingested through the data ingestion layer 104 and processed through the evidence index and provenance graph layer 106. The competitive advantage of the enterprise intelligence layer 1700 derives not from access to private data but from the platform's ability to synthesize the full spectrum of publicly available behavioral signals, expert discourse, regulatory developments, financial data, and market indicators at population scale through a unified evidence graph-intelligence that enterprise clients cannot independently assemble from any combination of existing commercial intelligence providers.

Figure 18:
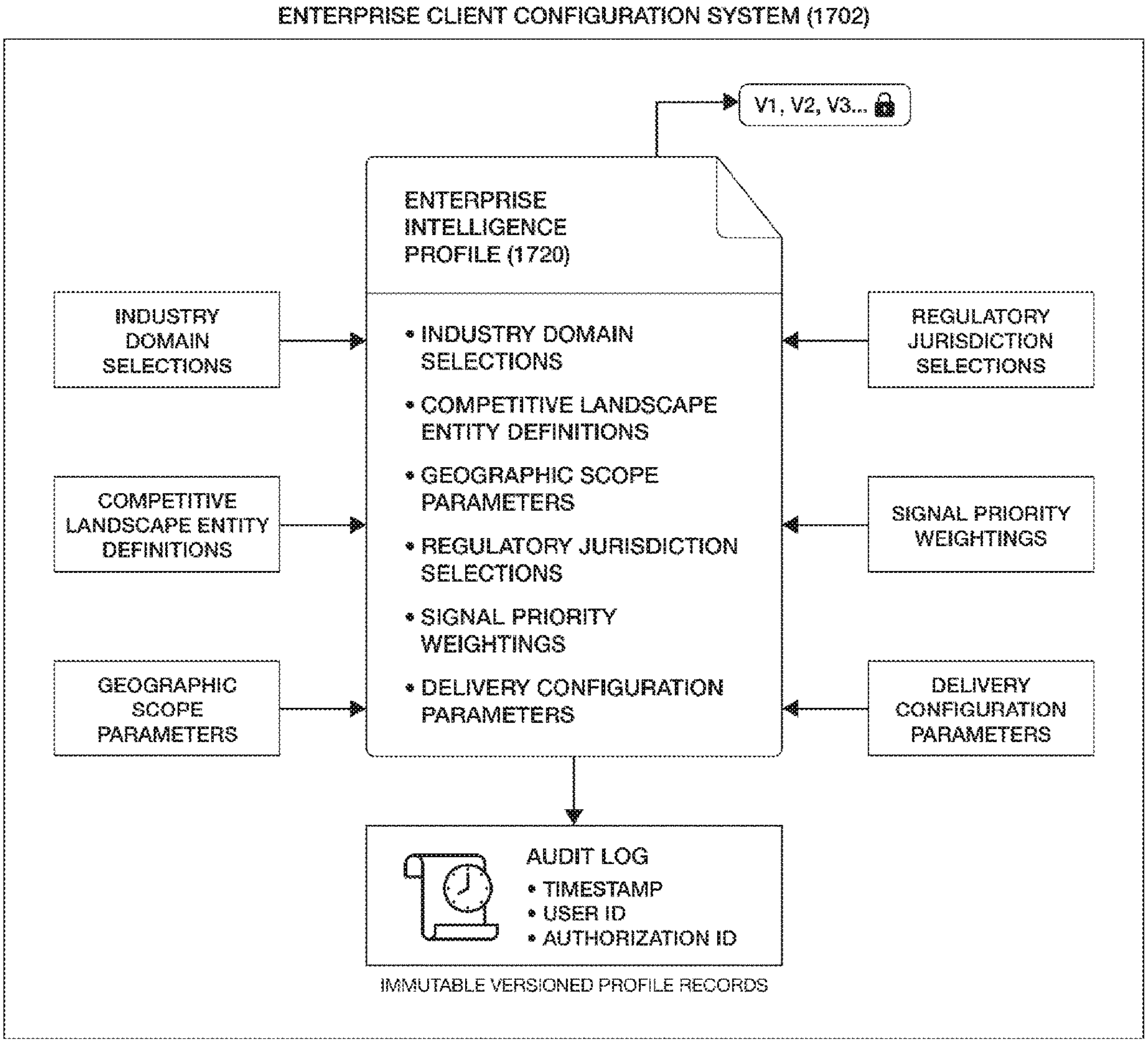
FIG. 18 is a block diagram of an enterprise client configuration system, according to some aspects of the present disclosure.

Referring to FIG. 18, the enterprise client configuration system 1702 further includes an enterprise intelligence profile 1720 that has industry domain selections, competitive landscape entity definitions, geographic scope parameters, regulatory jurisdiction selections, signal priority weightings, and delivery configuration parameters, with version control and audit logging for the immutable versioned profile records. The enterprise client configuration system 1702 enables each enterprise client to define the enterprise intelligence profile 1720 specifying the parameters within which the enterprise intelligence layer 1700 synthesizes and delivers intelligence for that client. The enterprise intelligence profile 1720 has industry domain selections identifying one or more intelligence verticals relevant to the enterprise client's operations, competitive landscape entity definitions identifying competitors, partners, regulators, and other entities the client requires monitoring of. The intelligence verticals are further relevant to geographic scope parameters defining regions and jurisdictions of interest, regulatory jurisdiction selections identifying governmental and regulatory bodies relevant to the client's operations. The intelligence verticals are also relevant to signal priority weightings defining the relative importance of behavioral signals, expert discourse, regulatory developments, financial data, and other evidence categories to the client's decision-making context, and delivery configuration parameters specifying which of the four enterprise delivery formats the client has activated and the triggering conditions for each.

The enterprise intelligence profile 1720 is stored as a versioned immutable record. Changes to the profile are logged with timestamps, authorization identifiers, and the prior profile version, enabling audit of the client's intelligence configuration over time. The enterprise intelligence profile 1720 determines which segments of the evidence graph 300 are relevant to the client and how retrieved evidence is ranked, synthesized, and delivered—but does not and cannot influence what evidence exists in the evidence graph 300, how evidence is ingested, or how evidence quality is assessed. The evidence graph 300 is a shared resource serving all consumer and enterprise outputs. No enterprise client configuration may alter the evidence graph or the ingestion, ranking, or quality assessment processes that feed it.

The enterprise synthesis engine 1704 retrieves evidence from the evidence graph 300 according to the enterprise intelligence profile 1720 and generates intelligence outputs in one or more of four configurable delivery formats through the enterprise delivery system 1706. In a first delivery format, the enterprise synthesis engine 1704 generates periodic decision briefings 1730 comprising synthesized intelligence reports delivered on a configured schedule—daily, weekly, or at any other interval specified in the enterprise intelligence profile 1720. Each periodic decision briefing 1730 is tailored to the enterprise client's configured industry domains, competitive landscape, and geographic scope. Each material claim within a periodic decision briefing 1730 is classified by confidence level using the same three-tier claim classification system employed in consumer briefings—directly supported by a cited source, synthesized across multiple identified sources, or inference with stated uncertainty. Each periodic decision briefing 1730 is accompanied by an evidence bundle 402 and anchored through the tamper-evident audit anchoring system 400, such that the enterprise client may verify the evidentiary basis and provenance of any claim in any briefing received.

In a second delivery format, the enterprise synthesis engine 1704 generates real-time alert intelligence 1732 triggered by detected signal clusters within the enterprise client's configured domains. The enterprise synthesis engine 1704 continuously monitors the evidence graph 300 for event patterns matching alert conditions defined in the enterprise intelligence profile 1720. Alert conditions include but are not limited to regulatory filings or actions affecting the client's industry or competitive landscape, statistically significant shifts in public behavioral signals relevant to the client's markets, emerging expert discourse clusters preceding mainstream coverage as detected by the pre-news detection module 506, and competitive entity activity including product launches, leadership changes, financial filings, and public statements, and supply chain disruptions. The regulatory filings or actions further include geopolitical developments, or other material events crossing a configured significance threshold. When an alert condition is met, the enterprise synthesis engine 1704 generates a real-time alert intelligence report comprising the triggering evidence, cross-referenced supporting evidence from other arms of the evidence graph, confidence classification, and provenance chain. Real-time alert intelligence 1732 is delivered through one or more enterprise notification channels configured by the client without delay beyond synthesis and quality verification processing time.

In a third delivery format, the enterprise synthesis engine 1704 provides query-driven intelligence synthesis 1734 in which an authorized enterprise user submits an intelligence query and receives a synthesized answer drawn from the evidence graph 300 with full provenance. The enterprise synthesis engine 1704 processes each query by retrieving relevant evidence from the evidence graph across all applicable domains, ranking retrieved evidence using the multifactor ranking engine 712 configured according to the enterprise client's signal priority weightings, synthesizing a response with inline citations and confidence classifications, and returning the response with an accompanying evidence bundle enabling the enterprise user to trace any claim to its source documents. Query-driven intelligence synthesis 1734 enables enterprise clients to interrogate the evidence graph on demand for strategic, operational, or tactical decision support without waiting for scheduled briefings or alert triggers. Each query and response pair is logged, bundled, and anchored through the tamper-evident audit anchoring system 400.

In a fourth delivery format, the enterprise synthesis engine 1704 provides a continuous intelligence dashboard 1736 accessible through a secure enterprise interface. The continuous intelligence dashboard 1736 presents a persistent real-time view of the enterprise client's configured intelligence domains that include consensus and dissent mapping derived from the consensus and dissent mapper 508 showing the current state of expert agreement and disagreement on active topics within the client's domains. The client's configured intelligence domains further include trend trajectory visualizations showing the directional movement and velocity of behavioral signals, expert discourse intensity, and regulatory activity over configurable time windows. The client's configured intelligence domains also include competitive positioning maps showing the relative activity, public perception, and strategic signals associated with entities in the client's defined competitive landscape, and behavioral signal pattern displays showing population-scale behavioral indicators relevant to the client's markets as derived from the market behavioral intelligence layer 1710. The continuous intelligence dashboard 1736 updates as new evidence enters the evidence graph 300 and is not limited to scheduled refresh intervals.

An enterprise client may activate any combination of the four delivery formats simultaneously. The four formats operate on the same underlying evidence and synthesis architecture. No delivery format has access to evidence unavailable to other formats. The selection of delivery formats affects how intelligence is packaged and delivered but does not affect what evidence is retrieved or how it is ranked and synthesized.

Figure 19:
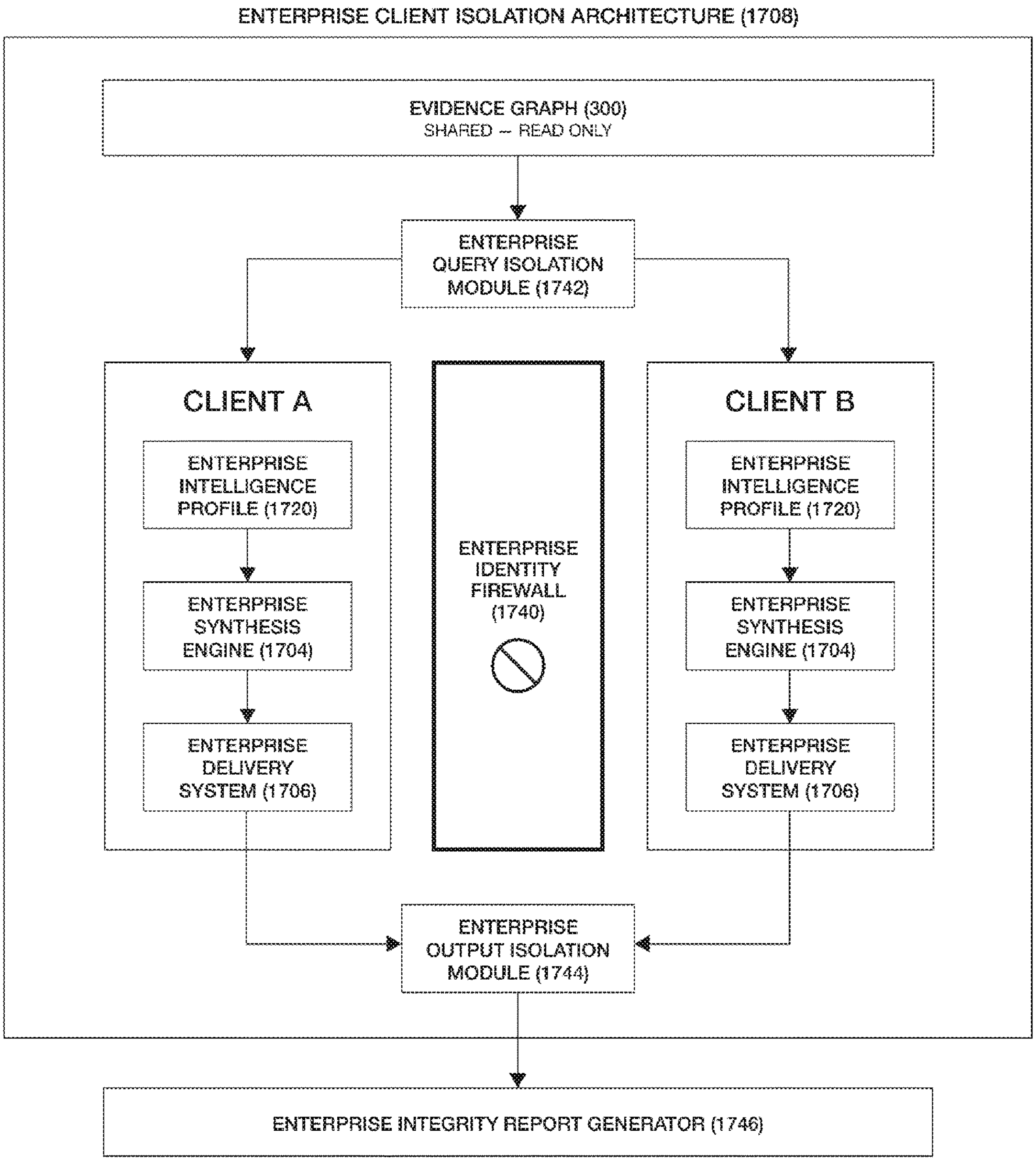
FIG. 19 is an architecture diagram of an enterprise client isolation architecture, according to some aspects of the present disclosure.

Referring to FIG. 19, the enterprise client isolation architecture 1708 has an enterprise identity firewall 1740 separating isolated client pipelines, an enterprise query isolation module 1742, an enterprise output isolation module 1744, and an enterprise integrity report generator 1746 monitoring both client pipelines, with the shared evidence graph 300 feeding each client pipeline independently. The enterprise client isolation architecture 1708 enforces separation between enterprise clients at the same architectural level and with the same rigor as the sponsor separation architecture 600 enforces separation between sponsors and editorial content on the consumer side. The enterprise client isolation architecture 1708 ensures that no enterprise client may access, infer, or influence the intelligence delivered to any other enterprise client, and that the platform can produce verifiable proof of this separation for any time window.

The enterprise identity firewall 1740 enforces at the code level that no enterprise client identifier, intelligence profile parameter, query history, alert configuration, or delivery record is accessible to any process serving a different enterprise client. The enterprise identity firewall 1740 operates as an architectural constraint analogous to the feature firewall 612 in the sponsor separation architecture 600. Enterprise client identifiers are forbidden as input features to any synthesis, ranking, or delivery process serving a different client. This constraint is enforced at the code level rather than through policy alone, such that a software defect or misconfiguration that would expose cross-client data produces a system error rather than a data leak.

The enterprise query isolation module 1742 ensures that query-driven intelligence synthesis requests submitted by one enterprise client are processed in isolation from all other enterprise client activity. Query text, retrieved evidence sets, synthesis parameters, and generated responses are tagged with the requesting client's identifier and are inaccessible to processes serving any other client. The enterprise query isolation module 1742 further ensures that the volume, timing, domain focus, or content of one client's queries cannot be inferred by any other client through any platform interface, reporting mechanism, or behavioral side channel.

The enterprise output isolation module 1744 ensures that all intelligence outputs—periodic decision briefings 1730, real-time alert intelligence 1732, query-driven intelligence synthesis responses 1734, and continuous intelligence dashboard states 1736—are stored, transmitted, and rendered within client-specific isolated environments. No enterprise client may access the outputs delivered to any other enterprise client. Output isolation extends to derived analytics, usage patterns, and engagement metrics associated with each client's interaction with the platform.

The enterprise integrity report generator 1746 continuously monitors all enterprise intelligence operations and automatically generates enterprise isolation integrity reports proving cross-client isolation for any specified time window. Each enterprise isolation integrity report includes client identity scope fields identifying the client and time window covered, synthesis isolation proof documenting that evidence retrieval, ranking, and synthesis for the covered client operated without access to any other client's intelligence profile, query history, or output records. The identity scope fields further identify output isolation proof documenting that all intelligence outputs were stored and delivered within the client's isolated environment, and firewall attestation fields documenting that the enterprise identity firewall 1740 detected no cross-client data access during the covered period. The identity scope fields also identify signature and anchor verification fields enabling cryptographic verification through the tamper-evident audit anchoring system 400. Enterprise isolation integrity reports are merklized and anchored through the same tamper-evident audit anchoring system 400 used for consumer Integrity Reports, such that their contents cannot be retroactively altered.

The enterprise client isolation architecture 1708 operates independently of and in addition to the sponsor separation architecture 600. In configurations where an enterprise client is also an advertiser sponsor on the consumer side, the enterprise client isolation architecture 1708 and the sponsor separation architecture 600 operate simultaneously, ensuring that the entity's enterprise intelligence is isolated from other enterprise clients while the entity's sponsor activity is isolated from editorial content. Neither isolation architecture depends upon or interferes with the other.

Figure 20:
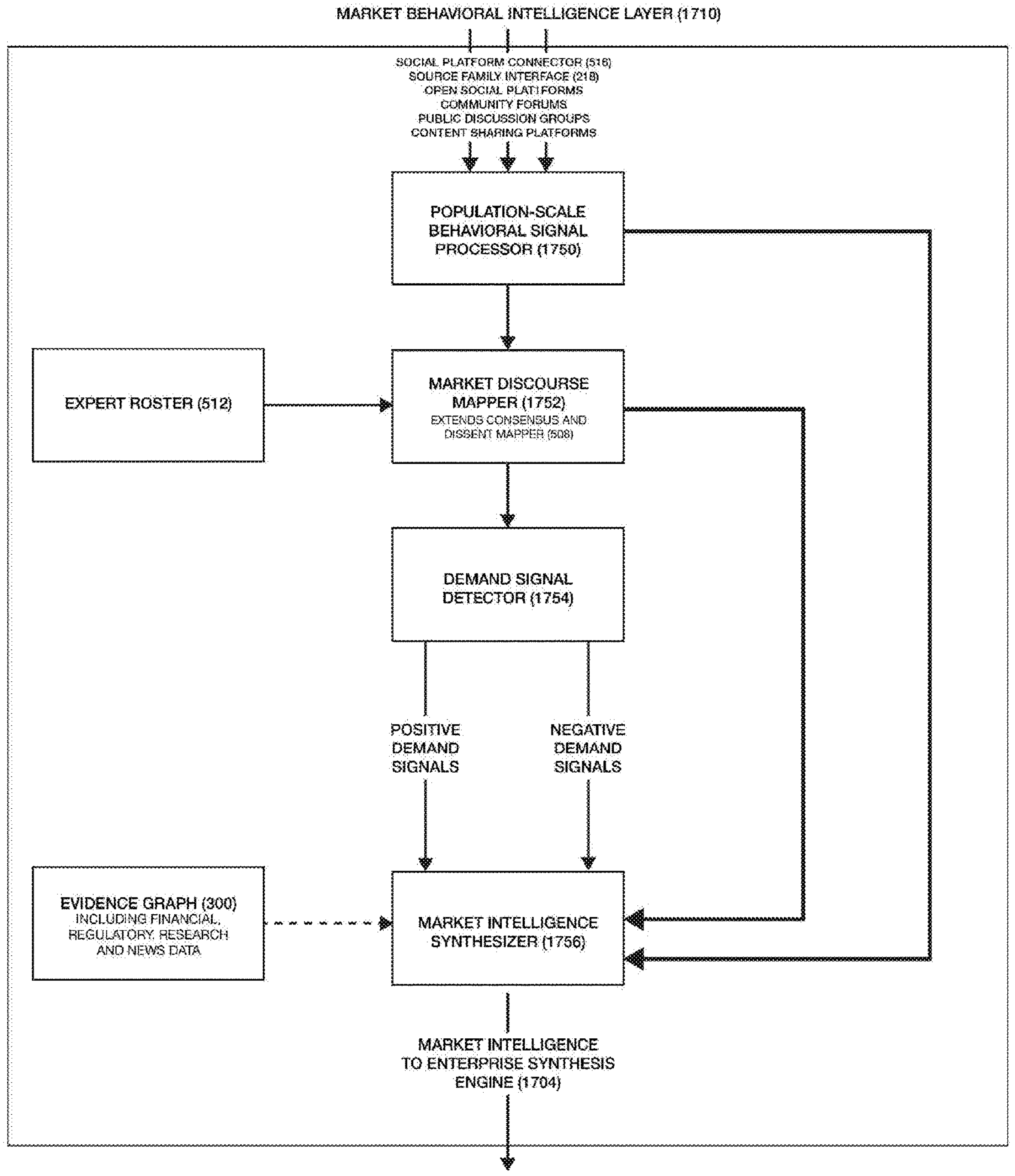
FIG. 20 is a pipeline diagram of a market behavioral intelligence layer, according to some aspects of the present disclosure.

Referring to FIG. 20, the market behavioral intelligence layer 1710 has a population-scale behavioral signal processor 1750 receiving inputs from open social platforms, community forums, public discussion groups, and content sharing platforms, a market discourse mapper 1752 weighted by credibility scores from the expert roster 512, a demand signal detector 1754 with separate output paths for positive and negative demand signals, and a market intelligence synthesizer 1756 integrating behavioral signals with evidence from the evidence graph 300 to produce market intelligence for enterprise clients. The market behavioral intelligence layer 1710 transforms publicly observable behavior generated by the consumer subscriber base and the broader population into market-grade behavioral intelligence available to the enterprise intelligence layer 1700. The market behavioral intelligence layer 1710 is the architectural component that creates the structural competitive barrier between the intelligence platform system 100 and enterprise-only intelligence providers.

The market behavioral intelligence layer 1710 does not access consumer subscriber private data, reading behavior, preference feedback, billing records, or any other data collected within the consumer intelligence layer's measurement and accountability layer 112. The market behavioral intelligence layer 1710 operates exclusively on publicly observable signals generated by individuals—including consumer subscribers and non-subscribers—through their public activity on open social platforms, community forums, public discussion groups, content sharing platforms, and other publicly accessible digital environments.

The population-scale behavioral signal processor 1750 ingests publicly observable behavioral data from the same social platform connector 516 and source family interfaces 218 used by the public discourse intelligence engine 500, but processes the ingested data for market intelligence rather than editorial intelligence. The population-scale behavioral signal processor 1750 identifies and quantifies behavioral patterns including shifts in public discussion volume, sentiment, and topic clustering around products, services, industries, brands, and market categories, changes in the velocity and geographic distribution of public discourse around specific market domains, emergence of new behavioral patterns not previously observed at statistically significant levels, and divergence between public behavioral signals and existing market research consensus as represented in structured data sources. The population-scale behavioral signal processor 1750 operates at population scale rather than through sampling. The competitive distinction between the intelligence platform system 100 and existing market research providers is that existing providers infer population behavior from structured samples while the population-scale behavioral signal processor 1750 observes actual population behavior as expressed through public discourse and interaction at scale.

The market discourse mapper 1752 extends the functionality of the consensus and dissent mapper 508 into market intelligence domains. The market discourse mapper 1752 maps public discourse patterns relevant to enterprise intelligence including consumer sentiment trajectories around product categories, brands, and emerging market segments, practitioner and professional discourse revealing operational realities, supply chain conditions, and industry-specific developments not yet reflected in structured data sources, and public regulatory discourse revealing anticipated regulatory directions, enforcement priorities, and compliance concerns before formal regulatory action occurs. The market discourse mapper 1752 weights discourse analysis by source credibility using the expert roster 512 and credibility scores 514 maintained by the public discourse intelligence engine 500, ensuring that market intelligence derived from public discourse reflects the relative authority of contributing voices rather than raw volume alone.

The demand signal detector 1754 identifies emerging market demand signals by analyzing the convergence of behavioral patterns across multiple independent public signal sources. When public discourse volume increases around a product category simultaneously across consumer discussion forums, practitioner commentary on expert platforms, and regulatory inquiry activity, the demand signal detector 1754 recognizes this convergence as a demand signal with higher confidence than any single source would support. The demand signal detector 1754 further identifies negative demand signals-declining public interest, emerging dissatisfaction patterns, practitioner warnings, and regulatory risk indicators—that may indicate market contraction, product failure risk, or capital allocation hazards. Negative demand signals are synthesized and delivered to enterprise clients with the same evidence quality, provenance, and confidence classification as positive signals. The demand signal detector 1754 does not suppress or deprioritize negative intelligence.

The market intelligence synthesizer 1756 integrates outputs from the population-scale behavioral signal processor 1750, the market discourse mapper 1752, and the demand signal detector 1754 with evidence from all other arms of the evidence graph 300—including financial regulatory filings, research publications, government data, and news sources—to produce integrated market intelligence that combines behavioral signals with structured evidentiary data. The market intelligence synthesizer 1756 produces market intelligence outputs with the same provenance chain 310 traceability, claim confidence classifications, and evidence bundle 402 documentation applied to all other outputs of the intelligence platform system 100. Every market intelligence claim delivered to an enterprise client is traceable through the evidence graph 300 to its source signals and source documents.

The market behavioral intelligence layer 1710 creates a compounding structural advantage for the enterprise intelligence layer 1700. As the consumer subscriber base grows, the volume and granularity of publicly observable behavioral signals increases. As behavioral signal volume increases, the market behavioral intelligence layer 1710 produces higher-resolution, higher-confidence market intelligence. As enterprise intelligence quality improves, enterprise adoption increases, generating revenue that funds further consumer subscriber acquisition and platform development. This compounding relationship between consumer scale and enterprise intelligence quality constitutes a data moat that no enterprise-only competitor can replicate without first building a comparable consumer intelligence ecosystem generating comparable population-scale behavioral signals.

Figure 21:
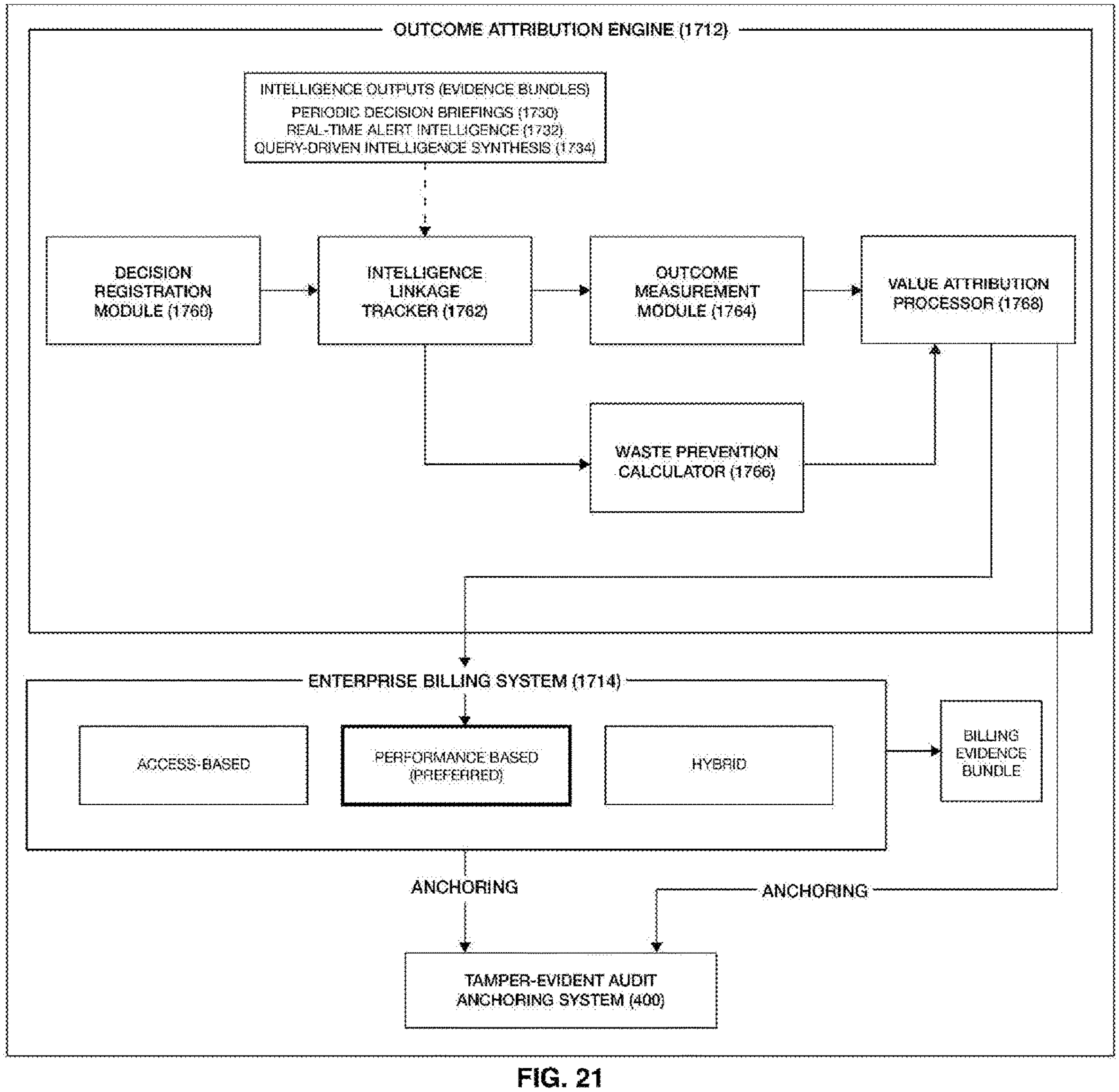
FIG. 21 is a combined flow and block diagram of an outcome attribution engine, according to some aspects of the present disclosure.

Referring to FIG. 21, the outcome attribution engine 1712 and enterprise billing system 1714 includes a decision registration module 1760, an intelligence linkage tracker 1762 connected to intelligence output evidence bundles, an outcome measurement module 1764, a waste prevention calculator 1766, and a value attribution processor 1768, with the enterprise billing system 1714 comprising access-based, performance-based, and hybrid billing model blocks, and tamper-evident audit anchoring 400 for billing evidence bundles. The outcome attribution engine 1712 tracks the relationship between intelligence delivered by the enterprise intelligence layer 1700 and measurable enterprise client outcomes, enabling the performance-based value capture model that constitutes the preferred embodiment of the enterprise billing system 1714.

The decision registration module 1760 records enterprise decisions that were informed by platform intelligence. When an enterprise client acts on intelligence received through any of the four delivery formats—committing capital to a market entry, modifying a supply chain configuration, adjusting a competitive strategy, avoiding a planned expenditure, or any other strategic, operational, or tactical decision—the decision registration module 1760 captures the decision parameters including the nature of the decision, the capital or resources committed or preserved, the date of the decision, and the enterprise user or users involved in the decision. Decision registration may be initiated by the enterprise client through the enterprise interface or captured through integration with the enterprise client's decision workflow systems. Decision registration is voluntary on the part of the enterprise client and is subject to the enterprise client isolation architecture 1708 such that registered decisions are never visible to any other enterprise client or to consumer-side processes.

The intelligence linkage tracker 1762 establishes a documented connection between each registered decision and the specific intelligence outputs that informed it. The intelligence linkage tracker 1762 references specific periodic decision briefings 1730, real-time alert intelligence reports 1732, query-driven intelligence synthesis responses 1734, or continuous intelligence dashboard states 1736 that the enterprise client accessed prior to and in connection with the registered decision. Because every intelligence output is accompanied by an evidence bundle 402 anchored through the tamper-evident audit anchoring system 400, the intelligence linkage tracker 1762 can establish a cryptographically verifiable chain from the enterprise client's decision backward through the intelligence output, through the evidence graph 300, to the original source documents and behavioral signals that informed the intelligence. This chain constitutes verifiable proof that the platform's intelligence contributed to the decision.

The outcome measurement module 1764 tracks the measurable results of registered decisions over configured time horizons. Outcome measurements include but are not limited to revenue generated from market entries, product launches, or strategic repositioning informed by platform intelligence, return on capital allocated based on platform intelligence relative to historical or benchmark returns, cost reductions achieved through operational decisions informed by platform intelligence, and market share changes attributable to competitive decisions informed by platform intelligence. Outcome measurements are computed from data provided by the enterprise client or from publicly available performance indicators depending on the engagement structure. The outcome measurement module 1764 does not require access to enterprise client proprietary financial systems-outcome data may be provided by the enterprise client at whatever granularity the engagement structure specifies.

The waste prevention calculator 1766 computes the value of capital preserved through decisions avoided or modified based on platform intelligence. When platform intelligence identifies negative demand signals, regulatory risks, competitive threats, or other hazards that cause an enterprise client to avoid or modify a planned expenditure, the waste prevention calculator 1766 records the planned expenditure amount, the intelligence that informed the avoidance or modification decision, and the subsequent market outcome that validates the intelligence. Waste prevention is a distinct value category from outcome generation. An enterprise client that avoids a $2 billion market entry based on platform intelligence showing adverse behavioral signals has preserved $2 billion in capital—a measurable outcome even though no revenue was generated. The waste prevention calculator 1766 computes the validated waste prevention value using the difference between the planned expenditure and the actual expenditure, adjusted for the subsequent market outcome as observed through the evidence graph 300.

The value attribution processor 1768 computes the platform's attributed value contribution for each registered decision based on the intelligence linkage, outcome measurement, and waste prevention data. The value attribution processor 1768 applies a configurable attribution methodology specified in the enterprise engagement agreement. Attribution methodologies optionally include full attribution in which the platform's intelligence is credited with the total measured outcome, and partial attribution in which the platform's intelligence contribution is credited as a defined percentage of the measured outcome. The measure outcome reflects the enterprise client's independent contribution. The attribution methodologies further include marginal attribution in which the platform's intelligence contribution is measured as the difference between the actual outcome and a baseline outcome the enterprise client would have expected without platform intelligence, or any other attribution methodology agreed upon in the engagement structure. The value attribution processor 1768 produces value attribution reports for each registered decision and each billing period, accompanied by evidence bundles documenting the complete chain from source intelligence through decision through outcome. Value attribution reports are anchored through the tamper-evident audit anchoring system 400.

The enterprise billing system 1714 computes enterprise client charges based on the engagement model configured for each client. The enterprise billing system 1714 supports a plurality of engagement models.

According to one embodiment, the enterprise billing system 1714 computes charges on an access basis, wherein the enterprise client pays a periodic fee determined by the number of intelligence verticals activated, the delivery formats enabled, the number of authorized users, and the depth of historical evidence graph access. Access-based charges are not contingent upon outcomes.

According to another embodiment, the enterprise billing system 1714 computes charges on a performance basis using value attribution reports produced by the value attribution processor 1768. Under the performance-based model, the platform's compensation is computed as a configured percentage of the attributed value of outcomes generated and capital waste prevented through platform intelligence. The enterprise client incurs no charge for intelligence that does not produce measurable attributed value. This performance-based model constitutes a structural risk reversal—the platform bears the risk of intelligence quality failure and captures value only when the enterprise client succeeds. The performance-based percentage, attribution methodology, outcome measurement time horizons, and minimum thresholds are specified in the enterprise engagement agreement and recorded in the enterprise client's intelligence profile 1720.

According to yet another embodiment, the enterprise billing system 1714 computes charges on a hybrid basis combining a reduced access-based periodic fee with performance-based compensation computed from value attribution reports. The hybrid model provides the platform with baseline revenue while preserving outcome alignment.

The enterprise billing system 1714 produces billing evidence bundles for each billing period comprising the engagement model parameters, intelligence outputs delivered, registered decisions, outcome measurements, waste prevention calculations, value attribution computations, and the complete provenance chain from source evidence through intelligence through decision through outcome. Billing evidence bundles are anchored through the tamper-evident audit anchoring system 400 such that billing computations are cryptographically verifiable by both the platform and the enterprise client.

The intelligence platform system 100 operates exclusively as a centralized multi-tenant platform. All data ingestion, evidence graph maintenance, AI synthesis, provenance anchoring, consumer briefing assembly, enterprise intelligence generation, and output delivery occur within platform-controlled infrastructure. The intelligence platform system 100 is not licensed, sublicensed, franchised, or made available for independent deployment by any consumer subscriber, enterprise client, advertiser sponsor, or third party.

Consumer subscribers access personalized intelligence briefings through the platform's distribution system 1200 including the first-party reader application 1202 and notification channels. Enterprise clients access intelligence through the enterprise delivery system 1706 including periodic decision briefings 1730, real-time alert intelligence 1732, query-driven intelligence synthesis 1734, and continuous intelligence dashboards 1736. In all cases, the intelligence is generated, synthesized, anchored, and delivered by the centralized platform. No consumer subscriber or enterprise client receives, hosts, or operates any component of the ingestion, synthesis, or provenance infrastructure.

This centralized architecture is not merely an implementation preference but a structural requirement for three architectural reasons. First, the evidence graph 300 derives its value from the unified aggregation of evidence across all sources, domains, and time. A fragmented evidence graph distributed across licensed deployments would contain only partial evidence, producing inferior intelligence in each fragment. Second, the market behavioral intelligence layer 1710 derives its value from population-scale behavioral signal aggregation. Licensed deployments serving isolated client populations would observe only fractional behavioral signals, destroying the population-scale advantage that constitutes the platform's primary competitive barrier. Third, the enterprise client isolation architecture 1708 and the sponsor separation architecture 600 depend upon centralized control of all data flows, access controls, and audit processes. Licensed deployments operating outside platform-controlled infrastructure could not be architecturally guaranteed to enforce isolation and separation constraints, undermining the integrity assurances upon which consumer trust and enterprise client confidence depend.

The enterprise intelligence layer 1700 is designed to serve enterprise clients across the full spectrum of organizational scale. According to an initial implementation, the enterprise intelligence layer 1700 serves global enterprise clients including multinational corporations, financial institutions, governmental organizations, and other large-scale entities whose strategic decisions involve substantial capital allocation and who currently rely upon incumbent intelligence providers including market research firms, financial data terminal providers, analyst-driven research firms, and data integration platforms. Global enterprise clients represent the highest immediate revenue opportunity due to the scale of capital decisions informed by the platform's intelligence and the corresponding magnitude of outcome attribution and waste prevention value capture.

In subsequent implementations, the enterprise intelligence layer 1700 extends to mid-market enterprises, small businesses, and individual entrepreneurs. The same ingestion, evidence graph, synthesis, and provenance architecture that serves global enterprise clients serves smaller entities without architectural modification. The enterprise client configuration system 1702 accommodates intelligence profiles of any scope—from a multinational corporation monitoring eight industry verticals across forty jurisdictions to an individual entrepreneur monitoring a single product category in a single geographic market. The four delivery formats scale accordingly-a global enterprise client may activate all four formats simultaneously while an individual entrepreneur may activate only periodic decision briefings or query-driven intelligence synthesis at a scope and frequency appropriate to their needs.

The performance-based value capture model applies across the full scale spectrum. A global enterprise client whose $500 million market entry succeeds based on platform intelligence generates performance-based revenue proportional to that outcome. An individual entrepreneur whose $50,000 product launch succeeds based on platform intelligence generates performance-based revenue proportional to that outcome. The economic model scales with the value of the decisions it informs regardless of the size of the entity making them.

The extension of enterprise intelligence across the full scale spectrum creates a further compounding effect on the market behavioral intelligence layer 1710. As individual entrepreneurs and small businesses adopt the platform, their subsequent public behavior-product launches, market entry activity, competitive responses, public discourse-becomes part of the population-scale behavioral signal observed by the platform, enriching the intelligence available to all enterprise clients at every scale.

Figure 22:
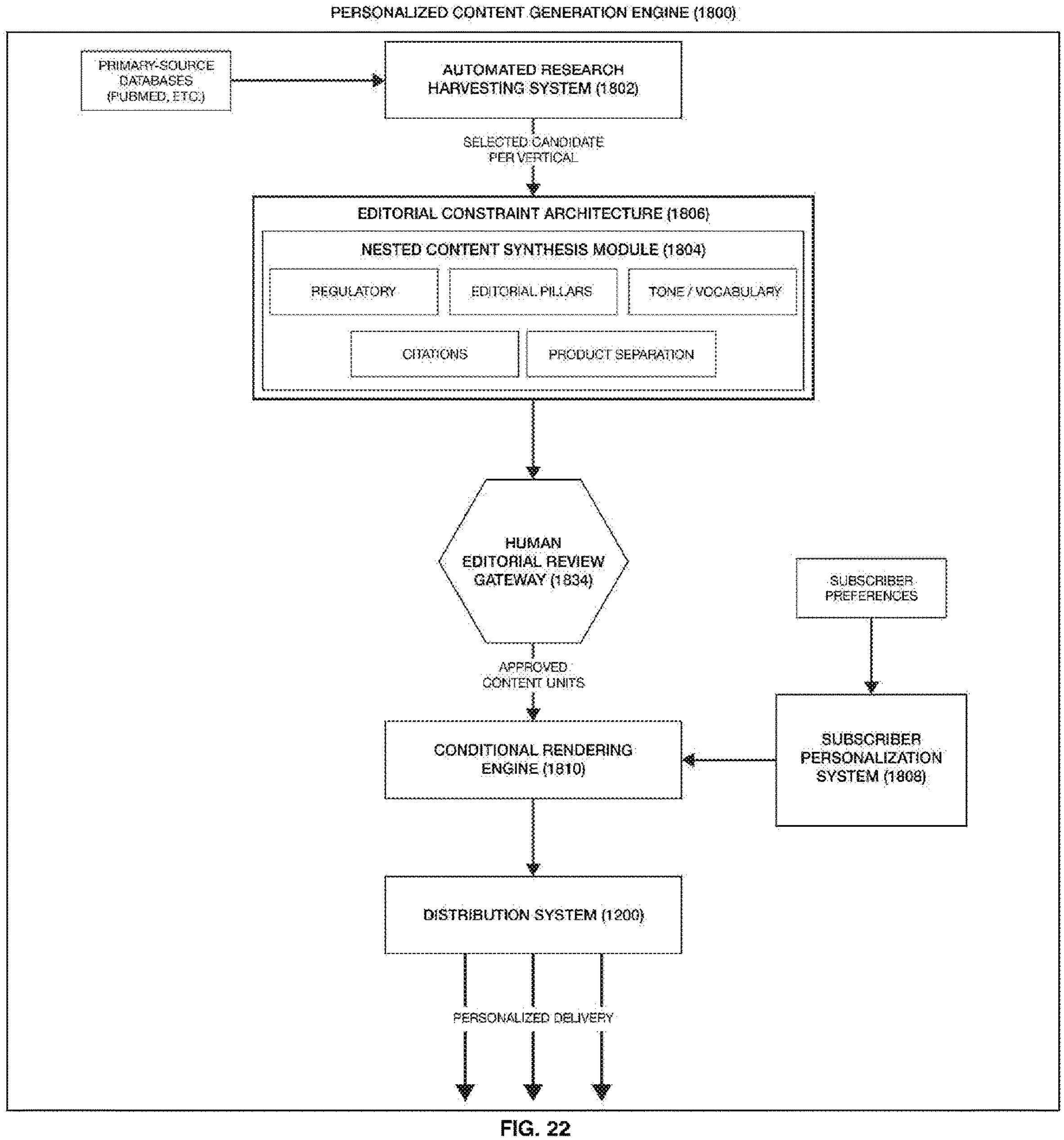
FIG. 22 is a system-level block diagram of a personalized content generation engine, according to some aspects of the present disclosure.

Referring to FIG. 22, a personalized content generation engine 1800 has an automated research harvesting system 1802 receiving input from primary-source databases, a nested content synthesis module 1804 operating within an editorial constraint architecture 1806, a human editorial review gateway 1834, a subscriber personalization system 1808, a conditional rendering engine 1810, and the distribution system 1200 for personalized delivery. The personalized content generation engine 1800 operates as a specialized implementation of the consumer intelligence layer within the intelligence platform system 100.

Figure 23:
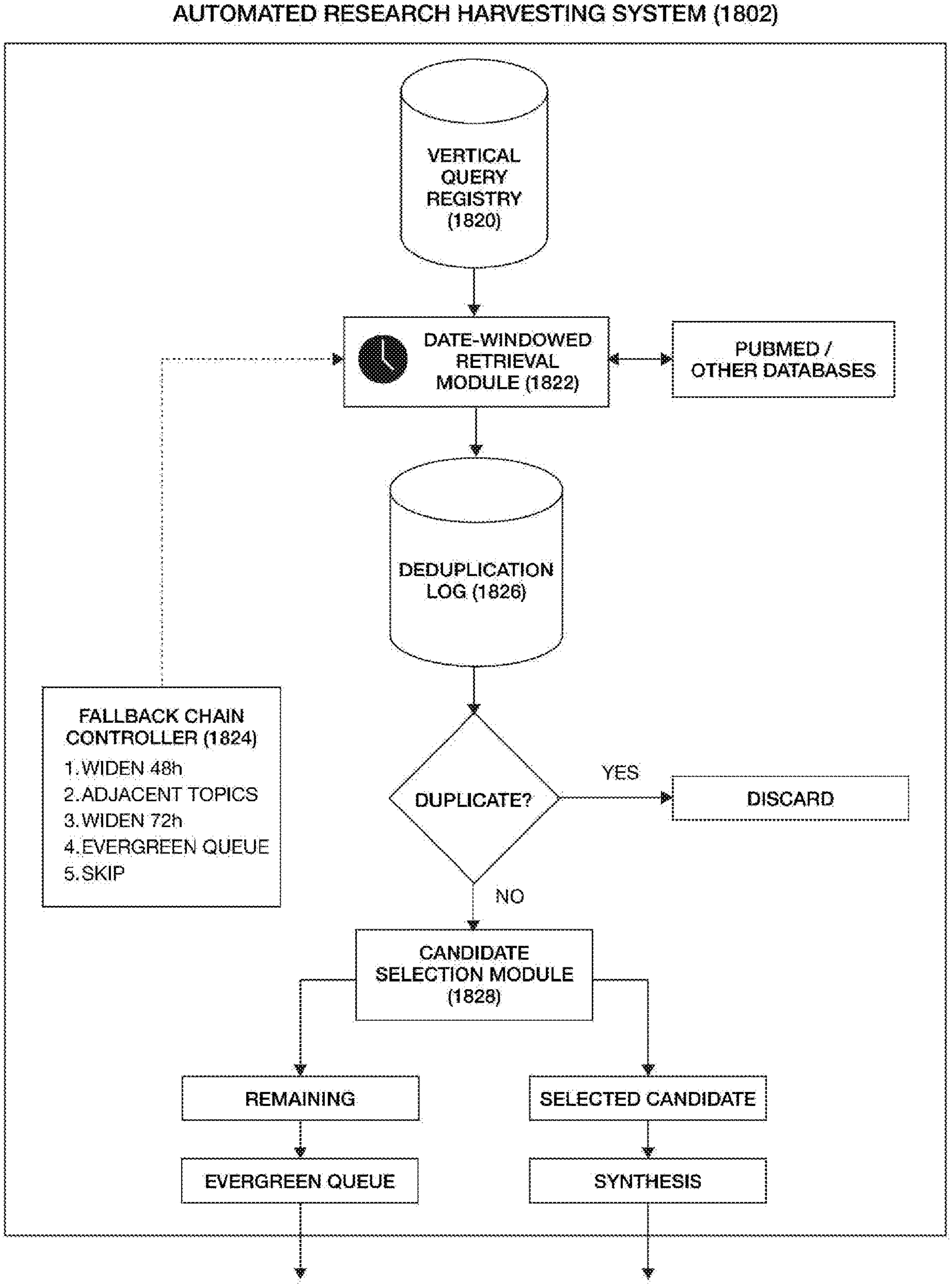
FIG. 23 is a pipeline diagram of an automated research harvesting system, according to some aspects of the present disclosure.

Referring to FIG. 23, the automated research harvesting system 1802 has a vertical query registry 1820, a date-windowed retrieval module 1822 interfacing with primary-source databases, a fallback chain controller 1824 implementing a five-stage fallback sequence, a deduplication log 1826, and a candidate selection module 1828 with output paths for selected candidates and an evergreen queue. The automated research harvesting system 1802 executes systematic primary-source research retrieval across a configurable plurality of content verticals on a recurring schedule.

The vertical query registry 1820 stores a configurable set of content verticals, each vertical associated with a plurality of precision search queries designed to retrieve current primary-source research relevant to that vertical from one or more primary-source research databases. In a preferred embodiment, the primary-source research database is PubMed accessed through NCBI E-utilities, though the architecture supports any primary-source database accessible through a programmatic interface including but not limited to clinical trial registries, preprint servers, regulatory filing databases, financial disclosure databases, or any combination thereof. Each content vertical is associated with approximately two to approximately five precision queries, each query targeting a distinct research angle within the vertical to ensure that the harvesting system is not dependent on any single research angle producing results on any given day. The number of content verticals is configurable and may range from fewer than ten to more than one thousand without architectural modification. In one embodiment, the system operates across approximately 38 content verticals with approximately 95 total queries, though these numbers are illustrative and not limiting.

Each precision query within the vertical query registry 1820 has Boolean search terms combining condition-specific vocabulary, mechanism-specific vocabulary, and intervention-specific vocabulary designed to retrieve research consistent with the publisher's editorial framework while maintaining scientific rigor. Precision queries may further incorporate controlled vocabulary terms specific to the target research database, such as Medical Subject Heading terms for PubMed queries, to improve retrieval precision. The queries stored in the vertical query registry 1820 define the search terms and Boolean logic for each retrieval operation. Date filtering is not embedded in the query strings but is applied programmatically at the retrieval API call level by the date-windowed retrieval module 1822.

The date-windowed retrieval module 1822 applies dynamic date filtering to each query execution to ensure that each retrieval cycle captures only newly indexed research. In one embodiment, the date-windowed retrieval module 1822 filters by entry date rather than publication date, where entry date is the date the primary-source database indexed the article, ensuring that articles are captured at the moment they become available regardless of the lag between publication and indexing. The default retrieval window is approximately 24 hours. The date-windowed retrieval module 1822 computes the retrieval window dynamically for each execution cycle such that the window spans from the prior cycle's execution timestamp to the current cycle's execution timestamp, eliminating gaps and overlaps between successive retrieval cycles.

The fallback chain controller 1824 manages content availability for verticals in which the default 24-hour retrieval window produces insufficient results on a given day. The fallback chain controller 1824 implements a multi-stage fallback sequence comprising in order: widening the retrieval window to approximately 48 hours for the specific underperforming vertical only, checking adjacent content verticals for cross-postable research from the current cycle's results, widening the retrieval window to approximately 72 hours for the specific vertical, pulling a pre-generated evergreen content unit from a curated queue for that vertical, and as a last resort skipping the vertical for that delivery cycle. The fallback chain controller 1824 proceeds through each stage only if the prior stage fails to produce a usable candidate. The fallback chain controller 1824 never widens the retrieval window globally—window widening is applied only to the specific underperforming vertical to preserve freshness guarantees for all other verticals.

The deduplication log 1826 maintains a persistent rolling record of every primary-source document identifier processed by the automated research harvesting system 1802. Even though date-windowed filtering handles most overlap between retrieval cycles, the deduplication log 1826 provides a secondary verification to ensure that no primary-source document is ever presented to any subscriber more than once, even in cases where the primary-source database re-indexes an article or the fallback chain controller 1824 widens the retrieval window to overlap with a prior cycle. The deduplication log 1826 is checked before any candidate is passed to the candidate selection module 1828.

The candidate selection module 1828 evaluates retrieved candidates for each content vertical and selects the strongest single candidate per vertical per delivery cycle. Selection criteria include recency, relevance to the vertical's editorial framework, study quality indicators including sample size and methodology, and novelty relative to recently published content units in the same vertical. In one embodiment, when a retrieval cycle produces multiple strong candidates for a single vertical, the candidate selection module 1828 selects the strongest candidate for immediate use and routes the remaining candidates to the evergreen queue for future use. The candidate selection module 1828 does not combine multiple primary-source documents into a single content unit—each content unit is generated from a single selected primary-source document to maintain citation clarity and editorial focus.

Figure 24:
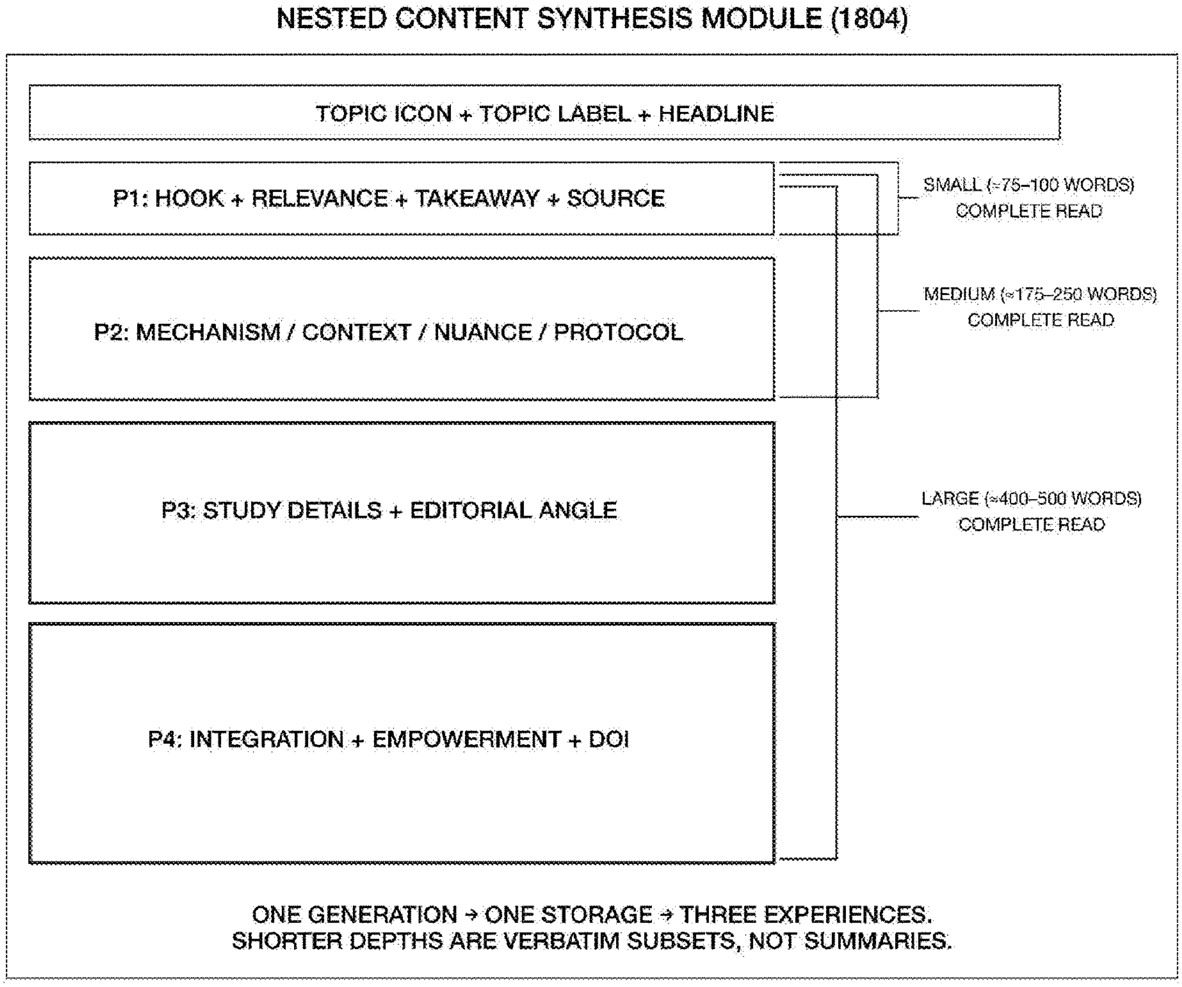
FIG. 24 is a layered architecture diagram of a nested content synthesis module, according to some aspects of the present disclosure.

Referring to FIG. 24, the nested content synthesis module 1804 has a single content unit comprising four paragraph blocks with three rendering depth brackets—a small rendering depth comprising the first paragraph only, a medium rendering depth that includes the first and second paragraphs, and a large rendering depth comprising all four paragraphs—illustrating that shorter rendering depths are verbatim subsets of longer rendering depths produced from a single generation and storage operation. The nested content synthesis module 1804 generates a single content unit per content vertical per delivery cycle, each content unit structured in a layered architecture that renders at multiple depths from a single generation and a single stored text.

The nested content synthesis module 1804 receives a selected primary-source document from the candidate selection module 1828 and generates a content unit comprising a configured number of sequential layers, each layer consisting of one or more paragraphs. In a preferred embodiment, each content unit comprises four paragraphs organized into three rendering depths. A first rendering depth comprises the first paragraph only. A second rendering depth comprises the first and second paragraphs. A third rendering depth comprises all four paragraphs. The number of rendering depths and the number of paragraphs per depth are configurable and are not limited to the preferred embodiment described herein.

The nested content synthesis module 1804 enforces a structural nesting constraint that is the foundational architectural requirement of the content unit design. The content rendered at any shorter depth is not a summary, abridgment, condensation, or rewriting of the content rendered at any longer depth. The content rendered at the first rendering depth is the verbatim first paragraph of the content rendered at the second and third rendering depths. The content rendered at the second rendering depth is the verbatim first and second paragraphs of the content rendered at the third rendering depth. One text is generated. Shorter renderings are produced by truncating the single text at structurally defined boundary points, not by generating separate versions.

This structural nesting constraint imposes a specific writing discipline on the AI synthesis process. Each layer must satisfy two simultaneous requirements: it must function as a complete and satisfying standalone read when it is the terminal layer for a given rendering depth, and it must function as a natural and coherent introduction to the subsequent layer when the subscriber's preferred depth includes additional layers.

In one embodiment, the four paragraphs satisfy the following architectural specifications. The first paragraph comprises approximately 75 to approximately 100 words and contains four mandatory elements: a hook establishing what was found or what is new, a relevance statement establishing why the finding matters to the subscriber personally, a takeaway establishing one specific actionable or informational conclusion, and a source attribution identifying the publishing journal and date. The first paragraph must deliver a complete and satisfying read on its own such that a subscriber receiving only this paragraph walks away with one useful piece of intelligence. The first paragraph is written at approximately an eighth-grade reading level.

The second paragraph has approximately 100 to approximately 150 words and adds one of the following to the first paragraph: mechanistic explanation describing how the finding works at a biological, chemical, or systemic level, contextual framing connecting the finding to a broader pattern or existing body of evidence, nuance or limitation addressing who the finding applies to most or what caveats exist, or practical guidance providing specific actionable information using structure and function language only. The second paragraph includes at least one reference to an underlying scientific mechanism relevant to the publisher's editorial framework where scientifically appropriate. The first and second paragraphs together must read as a complete mini-article requiring no further context. The second paragraph is written at approximately a tenth-grade reading level.

The third paragraph has approximately 100 to approximately 150 words and provides study methodology details including sample size, study design, and key data points, connection to the publisher's editorial framework where the science supports it, and any relevant contradictions or limitations. The fourth paragraph comprises approximately 75 to approximately 100 words and provides integration connecting the finding to other relevant health or wellness considerations, an empowering closing statement, and a direct object identifier link to the primary-source document.

The total word count of all four paragraphs in the preferred embodiment is approximately 400 to approximately 500 words. The structural nesting constraint is directed to shorter renderings that are verbatim subsets of longer renderings beginning from the first word, regardless of the specific word counts or paragraph counts employed. Each content unit is further accompanied by a header comprising a topic identifier, a topic label displayed to the subscriber, and a headline of approximately twelve words maximum that is specific, benefit-driven or curiosity-driven, contains at least one concrete noun, and avoids generic or sensationalized phrasing.

The editorial constraint architecture 1806 enforces a structured set of mandatory constraints on the AI synthesis process at generation time. The editorial constraint architecture 1806 operates through a system prompt that constrains the AI model's output as an architectural enforcement mechanism rather than through after-the-fact editorial review alone. The editorial constraint architecture 1806 has five constraint categories enforced simultaneously during each content generation operation.

A regulatory language constraint enforces that all generated content uses structure and function language only. The regulatory language constraint maintains a prohibited terminology set comprising terms including but not limited to treats, treatment, cure, cures, heals, reverses disease, and prevents followed by a disease name, and a required alternative terminology set comprising terms including but not limited to supports, may help support, is associated with, research suggests, and the evidence indicates. The regulatory language constraint further prohibits any language implying medical advice or recommending discontinuation of prescribed medications. The regulatory language constraint operates at generation time such that prohibited terminology does not appear in generated output and does not require post-generation removal.

An editorial pillar constraint ensures consistency with the publisher's established editorial positions where scientifically supported, without forcing editorial angles where the source research does not warrant them. Editorial pillars are configurable per publisher implementation and in a preferred embodiment comprise positions on specific dietary, metabolic, microbiome, and patient empowerment topics supported by the publisher's body of published editorial work.

A tone and vocabulary constraint prevents generic AI writing patterns and enforces accessible technical communication. The tone and vocabulary constraint maintains a forbidden vocabulary set comprising generic phrases, hyperbolic terms, and formulaic constructions commonly produced by AI language models but inconsistent with authoritative editorial voice. The tone and vocabulary constraint further enforces that technical terminology is always accompanied by an immediate plain-language translation within the same sentence or the following sentence.

A citation constraint requires that every generated content unit names at least one published primary-source study with journal name and publication date, that content units rendered at maximum depth include a direct object identifier link to the primary-source document, and that sample sizes are mentioned and statistics are contextualized. The citation constraint prohibits citation of retracted studies.

A product separation constraint enforces absolute separation between editorial content and product promotion within generated content units. The product separation constraint prohibits mention of the publisher's products by name within any editorial content unit under any circumstances. This constraint is analogous to the sponsor separation architecture 600 applied at the content unit level-editorial content is structurally prevented from functioning as product promotion.

The editorial constraint architecture 1806 is configurable per publisher implementation. The specific prohibited terms, required alternatives, editorial pillars, forbidden vocabulary, and product separation rules may be customized without modifying the underlying constraint enforcement architecture. The architectural principle—that content generation constraints are enforced at generation time through structured prompt architecture rather than through policy alone—applies regardless of the specific constraint content.

The subscriber personalization system 1808 enables each subscriber to configure a personal content profile specifying which content verticals the subscriber wishes to receive and at which rendering depth. The subscriber personalization system 1808 has a preference center interface 1830 and a subscriber tag manager 1832.

The preference center interface 1830 presents the subscriber with the full set of available content verticals and rendering depth options. The subscriber selects one or more content verticals from the available set, up to a configurable maximum number of simultaneous vertical selections. In one embodiment, a subscriber may select up to approximately ten content verticals simultaneously, though this maximum is configurable and not limiting. The subscriber further selects a preferred rendering depth applicable to all selected verticals or, in alternative embodiments, selects a per-vertical rendering depth allowing different depths for different verticals. In this embodiment, rendering depth options correspond to the three rendering depths of the nested content architecture—a small depth rendering the first paragraph only, a medium depth rendering the first and second paragraphs, and a large depth rendering all paragraphs.

The subscriber tag manager 1832 translates subscriber preference selections into subscriber tags stored in the distribution system. Each subscriber's tag set comprises one tag per selected content vertical identifying that vertical as active for that subscriber, and one rendering depth tag identifying the subscriber's preferred depth. The subscriber tag manager 1832 updates tags in real time as subscribers modify their preferences through the preference center interface 1830. Subscribers may modify their vertical selections and rendering depth at any time without restriction.

The preference center interface 1830 further presents optional premium content selections distinct from the standard content verticals. In one embodiment, a premium content selection has a curated set of advanced research categories reflecting the publisher's personal intellectual interests and editorial frontier, delivered on a separate schedule from the daily standard content and written in a first-person editorial voice distinct from the standard editorial voice. Premium content selections are configured and managed through the same subscriber tag manager 1832 and delivered through the same conditional rendering engine 1810.

Figure 25:
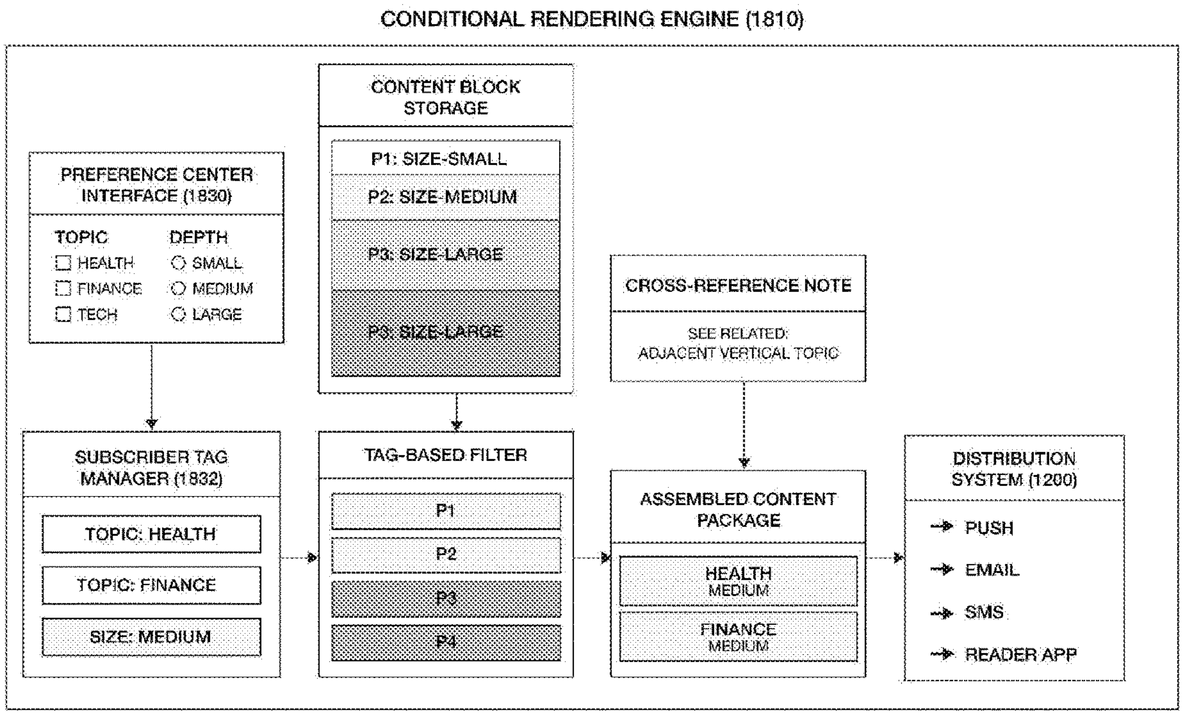
FIG. 25 is a flow and block diagram of a conditional rendering engine, according to some aspects of the present disclosure.

Referring to FIG. 25, the conditional rendering engine 1810 has a preference center interface 1830, a subscriber tag manager 1832, content block storage with CSS class markers for rendering depth levels, tag-based filtering logic, assembled personalized content packages, and delivery through the distribution system 1200. The conditional rendering engine 1810 assembles and delivers a personalized content package for each subscriber on each delivery cycle using the subscriber's tag set to determine which content units are included and at which rendering depth each content unit is displayed.

The conditional rendering engine 1810 operates on a principle of single-block storage with conditional display. Each content unit generated by the nested content synthesis module 1804 is stored as a single content block comprising all layers of the nested architecture with structural markers identifying the boundary between each rendering depth level. The conditional rendering engine 1810 does not store separate versions of the content unit for each rendering depth. One content block per content vertical per delivery cycle is stored, and the rendering depth is determined at delivery time based on the subscriber's tag set.

In one embodiment, each content block is stored as a single HTML structure with CSS class markers on each structural layer. Each layer is tagged with one or more CSS class identifiers corresponding to the rendering depths at which that layer is visible. The first layer is tagged with class identifiers for all three rendering depths such that it is visible at every depth. The second layer is tagged with class identifiers for the medium and large rendering depths such that it is visible at medium and large but not small. Subsequent layers are tagged with the class identifier for the large rendering depth only such that they are visible only at large. At delivery time, the conditional rendering engine 1810 applies a CSS rendering rule set determined by the subscriber's rendering depth tag, causing only the layers appropriate to the subscriber's selected depth to display. This architecture enables one content block, one storage operation, one generation operation, and one editorial review operation to serve all subscribers at all rendering depths.

The conditional rendering engine 1810 assembles the subscriber's personalized content package by selecting the content blocks corresponding to the subscriber's active content vertical tags and applying the rendering depth rule set corresponding to the subscriber's depth tag. The assembled content package is delivered through the subscriber's selected notification channel as managed by the distribution system 1200. In this embodiment, assembly and delivery are handled by an email service provider platform that processes subscriber tags and conditional content blocks natively, though the conditional rendering engine 1810 is optionally implemented through any distribution mechanism supporting tag-based conditional content display including but not limited to native mobile applications, progressive web applications, or any combination thereof.

The conditional rendering engine 1810 further supports cross-posting of content units across adjacent content verticals. When the candidate selection module 1828 determines that a selected primary-source document is relevant to multiple content verticals, the content unit generated for the primary vertical is optionally delivered as a cross-reference to subscribers of adjacent verticals. Cross-reference delivery comprises a shortened reference of approximately one to two sentences directing the subscriber to the primary content unit rather than a duplicate of the full content unit, preventing content redundancy across a subscriber's selected verticals.

The personalized content generation engine 1800 further has a human editorial review gateway 1834 positioned in the production workflow between the nested content synthesis module 1804 and the conditional rendering engine 1810. The human editorial review gateway 1834 requires human editorial approval of each generated content unit before the content unit is released to the conditional rendering engine 1810 for subscriber delivery. The human editorial review gateway 1834 enforces a quality gate checking nesting integrity to verify that each rendering depth cutoff produces a complete standalone read, accuracy to verify that the content unit faithfully represents the source research without overclaiming, regulatory compliance to verify that no disease treatment claims or prohibited terminology appear, editorial alignment to verify that editorial framework references are natural and scientifically supported rather than forced, tone to verify that the content is empowering rather than fear-driven, and headline quality.

The human editorial review gateway 1834 operates within a defined daily review window. In this embodiment, the review window is approximately two to approximately three hours for a full daily content batch, with each content unit requiring approximately two to approximately four minutes of review time. The human editorial review gateway 1834 ensures that AI-generated content is never delivered to subscribers without human editorial oversight while maintaining a production cadence and cost structure that would be impossible with fully human content generation across the same number of content verticals.

In a further aspect of the intelligence platform system 100, the governance and safety layer 102 implements named-entity harm and high-impact allegation policies. When content includes negative claims about identifiable individuals or specific organizations, the system applies stricter evidence thresholds including corroboration across independent high-trust sources, explicit uncertainty labels when warranted, and escalation to human review for regulated domains or high-impact accusations.

In a further aspect, the intelligence platform system 100 implements data minimization and retention enforcement through retention time-to-live policies applied to raw event logs and sensitive data. Reading-event telemetry and preference signals are retained as raw logs only for a short retention period of approximately 14 to approximately 30 days sufficient for fraud detection, appeals resolution, and RLHF batch processing. After retention period expiry, raw logs are deleted and replaced by derived aggregates needed for billing integrity, ranking optimization, product analytics, and sponsor reporting. Any retention exceptions are explicit, time-bounded, and logged. In alternative embodiments, the intelligence platform system 100 is optionally implemented using any suitable combination of hardware and software. The AI assembly layer 108 may employ any suitable large language model or ensemble of models, including but not limited to transformer-based models, retrieval-augmented generation architectures, mixture-of-experts models, or future model architectures. The evidence graph 300 is optionally implemented using any suitable graph database, relational database with graph extensions, or purpose-built knowledge graph system. The tamper-evident audit anchoring system 400 optionally employs any suitable cryptographic hash function, digital signature scheme, hardware security module, or timestamping mechanism. The HSM module 408 is optionally implemented using any suitable hardware security module conforming to FIPS 140-2 Level 3 or higher, or any equivalent or successor standard. The social platform connector 516 optionally connects to any number of open social platforms through platform-specific APIs, web scraping within terms of service, or other retrieval mechanisms.

In further alternative embodiments, the content hierarchy system 800 optionally includes more or fewer than three tiers. The word budget allocator 814 optionally measures content allocation in any suitable unit including words, characters, tokens, reading time minutes, or any other content volume metric. The tiered access structure optionally has any number of tiers at any price points with any content allocation levels. The sliding scale billing calculator 1118 optionally employs any function that reduces the subscriber's charge in proportion to verified reading, including but not limited to linear, stepped, logarithmic, or threshold-based functions.

The intelligence platform system 100 is optionally deployed across approximately 40 to approximately 50 content verticals spanning health and biomedical, finance and business, technology, politics and government, science and environment, lifestyle and culture, breaking news and general, and specialized domains. Additional verticals are optionally created on demand as sponsors fund new domains or as subscriber demand warrants.

Alternative Embodiments

Alternative Embodiment A1. A computer-implemented method for generating content with auditable provenance, the method comprising: ingesting source data from a plurality of heterogeneous external sources through modular arm pipelines; normalizing the ingested data to a unified schema and storing it in an evidence graph comprising interconnected document, claim, entity, and event nodes; generating a personalized briefing for a subscriber by retrieving evidence from the evidence graph, ranking candidates, synthesizing narratives with inline citations, and classifying each material claim by confidence level; storing an evidence bundle with the briefing comprising source documents, retrieval queries, timestamps, and model version identifiers; and maintaining a provenance chain enabling tracing from any claim in the briefing to original source documents.

Alternative Embodiment A2. The computer-implemented method of Alternative Embodiment A1, further comprising generating multiple output sizes from the same evidence set without changing the underlying facts or evidence basis.

Alternative Embodiment A3. The computer-implemented method of Alternative Embodiment A1, further comprising presenting competing interpretations when evidence conflicts and labeling known versus uncertain information.

Alternative Embodiment B1. A tamper-evident audit anchoring system for a content intelligence platform, the system comprising: a merklization module configured to receive an evidence bundle associated with a generated content briefing and compute a Merkle tree over component hashes of the evidence bundle to produce a Merkle root; an HSM module comprising a hardware security module configured to store a signing key such that private key material cannot be extracted, the HSM module configured to sign the Merkle root using the signing key; an audit anchor record comprising the Merkle root, a cryptographic signature, a Signing Key ID identifying the key version used, and an anchor timestamp; an append-only internal ledger configured to store the audit anchor record; and an external publication module configured to commit the audit anchor record to at least one external timestamping mechanism such that retroactive alteration is detectably impossible even under internal compromise, wherein only hashes and signatures are committed externally.

Alternative Embodiment B2. The tamper-evident audit anchoring system of Alternative Embodiment B1, further comprising a threshold signature module configured to require M-of-N independent key shares or approvers to produce a valid signature for high-impact domains and sponsored verticals, wherein Mis at least two and N is at least three.

Alternative Embodiment B3. The tamper-evident audit anchoring system of Alternative Embodiment B1, wherein keys managed by the HSM module rotate on a defined cadence and old public verification material is retained to enable verification of audit anchor records created under previous key versions.

Alternative Embodiment B4. The tamper-evident audit anchoring system of Alternative Embodiment B1, further comprising a key compromise runbook module configured to freeze integrity signing, rotate keys, revoke compromised Signing Key IDs, anchor a key rotation event record, re-verify anchor continuity, and generate an incident bundle upon detection of suspected key compromise.

Alternative Embodiment B5. The tamper-evident audit anchoring system of Alternative Embodiment B1, wherein the audit anchoring system further anchors Integrity Reports, correction logs, billing evidence bundles, and learning policy updates.

Alternative Embodiment C1. A computer-implemented method for providing tamper-evident provenance for content intelligence, the computer-implemented method comprising: computing a Merkle tree over component hashes of an evidence bundle associated with a generated content briefing to produce a Merkle root; signing the Merkle root using a hardware security module such that private key material is non-extractable; storing an audit anchor record comprising the signed Merkle root, a Signing Key ID, and an anchor timestamp in an append-only internal ledger; committing the audit anchor record to at least one external timestamping mechanism; and retaining public verification material across key rotations to enable verification of anchor records across the full history.

Alternative Embodiment C2. The computer-implemented method of Alternative Embodiment C1, wherein signing the Merkle root requires a threshold signature from M-of-N independent approvers for anchor records associated with sponsored verticals or high-impact domains.

Alternative Embodiment C3. The computer-implemented method of Alternative Embodiment C2, further comprising verifying that database records have not been retroactively altered by comparing stored content hashes against the Merkle tree and verifying the anchor signature using the identified Signing Key ID.

Alternative Embodiment D1. A non-transitory computer-readable medium storing instructions that, when executed by a processor, cause the processor to: merklize an evidence bundle associated with generated content to produce a Merkle root; sign the Merkle root via a hardware security module with a non-extractable signing key; store a signed audit anchor record in an append-only ledger; and commit the record to an external timestamping mechanism for independent verification.

Alternative Embodiment E1. A computer-implemented system for extracting verified intelligence from public expert discourse, the system comprising: a social platform connector configured to ingest content from one or more open social platforms through platform-agnostic modular connectors; an expert identity mapper configured to identify authoritative voices per content domain by analyzing posting patterns, peer engagement quality, and institutional affiliations; a publication database cross-reference configured to cross-reference identified experts against one or more verified publication databases to verify domain credentials, and to compute a confidence-in-identity-match score for each identified expert; an expert roster maintained per content domain, each expert associated with a credibility score derived from multi-signal identity verification; a pre-news detection module configured to identify emerging clusters of expert discussion preceding mainstream media coverage; and a consensus and dissent mapper configured to perform real-time analysis of expert convergence and divergence on topics, weighted by credibility scores.

Alternative Embodiment E2. The computer-implemented system of Alternative Embodiment E1, further comprising a real-time source triangulator configured to automatically cross-reference expert social commentary against primary data from research databases, regulatory filings, financial disclosures, and other primary-source arms.

Alternative Embodiment E3. The computer-implemented system of Alternative Embodiment E1, wherein the expert identity mapper performs longitudinal posting consistency analysis and peer network validation in addition to publication database verification.

Alternative Embodiment E4. The computer-implemented system of Alternative Embodiment E1, wherein the publication database cross-reference interfaces with one or more of PubMed, ORCID, institutional affiliation databases, or any combination thereof.

Alternative Embodiment E5. The computer-implemented system of Alternative Embodiment E1, wherein the expert roster comprises approximately 50 to approximately 200 credentialed experts per content domain and is continuously updated.

Alternative Embodiment E6. The computer-implemented system of Alternative Embodiment E1, wherein the system surfaces credentialed expert dissent that contradicts prevailing narratives based on evidence quality and source credibility established through the expert identity mapper, without suppression based on advertiser relationships.

Alternative Embodiment E7. The computer-implemented system of Alternative Embodiment E1, wherein the social platform connector is configured such that if any platform changes API terms or availability, the system continues operating through alternative platform connectors.

Alternative Embodiment F1. A computer-implemented method for generating intelligence from public expert discourse, the method comprising: ingesting content from one or more open social platforms through modular connectors; identifying authoritative voices per content domain by analyzing posting patterns, peer engagement quality, and institutional affiliations; cross-referencing identified experts against verified publication databases to verify credentials and computing confidence-in-identity-match scores; maintaining credibility-scored expert rosters per content domain; detecting emerging clusters of expert discussion preceding mainstream coverage; and mapping real-time consensus and divergence on topics weighted by expert credibility scores.

Alternative Embodiment F2. The computer-implemented method of Alternative Embodiment F1, further comprising automatically cross-referencing expert commentary against primary data from research databases, regulatory filings, and financial disclosures to produce triangulated evidence sets.

Alternative Embodiment G1. A non-transitory computer-readable medium storing instructions that, when executed by a processor, cause the processor to: ingest expert content from open social platforms; identify domain-authoritative voices through multi-signal analysis including posting pattern analysis, peer engagement analysis, and publication database cross-referencing; maintain credibility-scored expert rosters; detect pre-news discussion clusters; and map expert consensus and dissent weighted by verified credibility.

Alternative Embodiment H1. A computer-implemented system for sponsor-separated content generation, the system comprising: a campaign brief object configured to receive structured sponsor input comprising funded verticals, audience segment intent, scope expansion targets, compliance constraints, and sponsor module parameters; a schema validator comprising a non-field rejection module configured to detect and reject at schema validation time any sponsor input referencing editorial ranking, editorial inclusion, suppression, or tone; an editorial synthesis pipeline configured to perform editorial candidate retrieval, ranking, selection, synthesis, and citation attachment; a sponsor module pipeline configured to generate labeled sponsor content units using separate retrieval queries, separate prompts, a separate renderer, and separate logging from the editorial synthesis pipeline; a feature firewall configured to enforce at the code level that sponsor identifiers are forbidden as ranking features accessible to the editorial synthesis pipeline; an isolation boundary configured to prevent data flow from the sponsor module pipeline to the editorial synthesis pipeline; and an integrity report generator configured to automatically generate Integrity Reports proving sponsor-blind editorial behavior for any specified time window.

Alternative Embodiment H2. The computer-implemented system of Alternative Embodiment H1, wherein the campaign brief object is stored as an immutable versioned record.

Alternative Embodiment H3. The computer-implemented system of Alternative Embodiment H1, wherein the sponsor module pipeline produces sponsor modules in one or more of three labeled formats: a sponsor context card providing factual product or service context, an offer card providing labeled calls to action, and a resource library providing sponsor-funded links, each format visually and structurally separated from editorial content.

Alternative Embodiment H4. The computer-implemented system of Alternative Embodiment H1, wherein negative or contradictory evidence about a sponsor is never suppressed by the editorial synthesis pipeline.

Alternative Embodiment H5. The computer-implemented system of Alternative Embodiment H1, wherein the Integrity Report comprises editorial synthesis proof including retrieval query documentation and evidence bundle hashes, sponsor isolation proof including separate retrieval documentation and evidence that sponsor identifiers were excluded from ranking features, learning and experimentation proof confirming sponsor-module interactions were excluded from training data, and signature and anchor verification fields.

Alternative Embodiment H6. The computer-implemented system of Alternative Embodiment H1, further comprising triple activation triggers comprising an event trigger, an advertiser scope trigger, and a campaign brief trigger, wherein the triggers adjust ingestion intensity and domain breadth without altering editorial selection or ranking.

Alternative Embodiment H7. The computer-implemented system of Alternative Embodiment H1, wherein the campaign brief object further comprises an allowed claims whitelist, a prohibited claims blacklist, and required disclosure specifications that constrain sponsor module content without affecting editorial content.

Alternative Embodiment I1. A computer-implemented method for generating content with architecturally enforced sponsor separation, the method comprising: receiving a structured campaign brief from a sponsor; validating the campaign brief against a schema that rejects at validation time any input referencing editorial ranking, inclusion, suppression, or tone; generating editorial content through an editorial synthesis pipeline isolated from sponsor inputs by a feature firewall preventing sponsor identifiers from serving as ranking features; generating sponsor module content through a separate sponsor module pipeline using separate retrieval, prompts, rendering, and logging; assembling a briefing in which editorial content and sponsor modules are structurally and visually separated; and automatically generating an Integrity Report proving sponsor-blind editorial behavior.

Alternative Embodiment I2. The computer-implemented method of Alternative Embodiment I1, further comprising adjusting ingestion intensity based on the campaign brief without altering editorial ranking or selection rules.

Alternative Embodiment I3. The computer-implemented method of Alternative Embodiment I1, further comprising anchoring the Integrity Report through a tamper-evident audit anchoring system using cryptographically signed Merkle roots.

Alternative Embodiment J1. A non-transitory computer-readable medium storing instructions that, when executed by a processor, cause the processor to: validate a sponsor campaign brief against a schema enforcing non-fields that reject editorial influence inputs; generate editorial content through a first pipeline isolated from sponsor data; generate sponsor content through a second pipeline with separate retrieval, prompts, and rendering; produce an Integrity Report documenting sponsor-blind editorial behavior; and anchor the Integrity Report via a signed Merkle root.

Alternative Embodiment K1. A computer-implemented system for advertiser-funded content vertical creation and verified engagement reporting, the system comprising: a vertical creation module configured to create content verticals funded by advertiser sponsors, each vertical associated with a source plan mapping data ingestion pipelines to the vertical, a ranking policy, disclosure rules, and domain guardrails; a subscriber acquisition interface configured to enable advertisers to direct their existing audiences to intelligence briefings in their sponsored domain, wherein subscriber acquisition cost to the platform is approximately zero for advertiser-funded verticals; a cross-vertical network effect engine configured to expose subscribers entering through one sponsored vertical to other available verticals sponsored by different advertisers; a verified engagement reporter configured to provide sponsors with engagement metrics comprising verified readership reported as ranges with confidence bounds, editorial and sponsor module consumption metrics separated and never conflated, and aggregated analytics with individual subscriber privacy protected; and a sponsor dashboard providing access to verified engagement reports, campaign performance data, and Integrity Reports.

Alternative Embodiment K2. The computer-implemented system of Alternative Embodiment K1, wherein the verified engagement metric is derived from an accountability engine in which content access is conditionally free based on verified consumption, such that the metric represents financially-verified attention.

Alternative Embodiment K3. The computer-implemented system of Alternative Embodiment K1, wherein sponsors never receive individual subscriber billing, payment, browsing, or preference data.

Alternative Embodiment K4. The computer-implemented system of Alternative Embodiment K1, wherein new verticals may be created on demand as sponsors fund new domains.

Alternative Embodiment L1. A computer-implemented method for advertiser-funded content delivery with verified engagement, the method comprising: creating a content vertical funded by an advertiser sponsor with an associated source plan, ranking policy, and domain guardrails; enabling the advertiser to direct existing audiences to intelligence briefings in the sponsored domain; exposing subscribers entering through the sponsored vertical to other available verticals sponsored by different advertisers; verifying content consumption through passive behavioral analytics tied to a financial accountability model; and reporting verified engagement metrics to the sponsor with editorial and sponsor module metrics separated, individual privacy protected, and readership expressed as ranges with confidence bounds.

Alternative Embodiment L2. The computer-implemented method of Alternative Embodiment L1, wherein the platform's subscriber acquisition cost for the advertiser-funded vertical is approximately zero.

Alternative Embodiment L3. The computer-implemented method of Alternative Embodiment L1, further comprising generating Integrity Reports for the sponsored vertical confirming sponsor-blind editorial behavior and providing the reports through a sponsor dashboard.

Alternative Embodiment M1. A computer-implemented system for personalized intelligence briefing assembly, the system comprising: an evidence graph storing ingested source data from heterogeneous sources as interconnected document, claim, entity, and event nodes; a candidate generation module configured to retrieve candidates from the evidence graph for each content vertical and time window, apply freshness windows, deduplicate, and cluster into events; a ranking and selection module incorporating a multi-factor ranking engine configured to score candidates across source authority, corroboration, novelty, discourse velocity, and subscriber relevance; a slot objective selector configured to assign distinct optimization objectives to different story positions within a briefing, comprising at least a lead slot optimized for significance, a surprise slot optimized for novelty, and an expert brief slot optimized for credible discourse; a synthesis with citations module configured to generate narrative content from selected evidence with inline citations and claim confidence classifications; and a word budget allocator configured to distribute a subscriber's daily content allocation across stories in any combination of depths, the synthesis module generating content at any requested depth from the same evidence set.

Alternative Embodiment M2. The computer-implemented system of Alternative Embodiment M1, further comprising a tier A freebie module configured to generate one to approximately three universally relevant stories for distribution to all users regardless of subscription status, with no paywall or credit card requirement.

Alternative Embodiment M3. The computer-implemented system of Alternative Embodiment M1, wherein the surprise story selector selects the most unexpected or counterintuitive finding across the subscriber's verticals, distinct from the most important finding selected by the lead story selector.

Alternative Embodiment M4. The computer-implemented system of Alternative Embodiment M1, wherein the expert brief selector curates expert commentary from a public discourse intelligence engine comprising verified credentialed experts.

Alternative Embodiment M5. The computer-implemented system of Alternative Embodiment M1, wherein the word budget is measured in words and a budget of a given number of words may be consumed as any combination of brief and deep-dive formats.

Alternative Embodiment M6. The computer-implemented system of Alternative Embodiment M1, further comprising a depth controller configured to instruct the synthesis with citations module to generate content at a requested depth without additional computational or billing cost.

Alternative Embodiment N1. A computer-implemented method for assembling personalized intelligence briefings, the method comprising: retrieving content candidates from an evidence graph for subscriber-selected content verticals; ranking candidates using a multi-factor ranking engine scoring source authority, corroboration, novelty, discourse velocity, and relevance; selecting stories according to slot-specific objectives comprising at least significance for a lead position, novelty for a surprise position, and credible discourse for an expert brief position; synthesizing narrative content with inline citations and claim confidence classifications; distributing a subscriber's word budget across selected stories at subscriber-chosen depths; and delivering the assembled briefing through one or more subscriber-selected notification channels.

Alternative Embodiment N2. The computer-implemented method of Alternative Embodiment N1, further comprising generating and distributing universally relevant stories to all users regardless of subscription status.

Alternative Embodiment N3. The computer-implemented method of Alternative Embodiment N1, further comprising varying the briefing format daily and leading each story with the most surprising or consequential element.

Alternative Embodiment O1. A non-transitory computer-readable medium storing instructions that, when executed by a processor, cause the processor to: retrieve candidates from an evidence graph for subscriber-selected verticals; rank candidates across multiple factors including source authority, corroboration, and novelty; select stories according to slot-specific objectives; synthesize cited narratives at subscriber-selected depths within a word budget; and distribute the briefing through subscriber-selected channels.

Alternative Embodiment P1. A computer-implemented system for truth-constrained reinforcement learning content ranking optimization, the system comprising: a preference signal collector configured to collect binary preference feedback from verified subscribers on editorially selected stories in personalized content briefings; an A/B variant tester configured to identify the two highest-ranked candidate stories for a briefing slot and randomly assign one to each subscriber in a test cohort, both candidates drawn from a top tier of candidates; a feedback data aggregator configured to aggregate preference data including the story served, the alternative available, the ranking factor weights that selected the story, the subscriber's explicit rating, passive engagement signals, and A/B test assignment; a ranking weight updater configured to adjust multi-factor ranking weights at the vertical level based on aggregated preference data; a truth constraint enforcer configured to enforce hard constraints that weight updates cannot violate, the constraints comprising citation coverage floors, corroboration requirements, domain guardrails, rights compliance, sponsor separation, and diversity floors; and an obligation rule engine configured to ensure that items crossing a defined evidence-significance threshold remain eligible for selection regardless of predicted preference.

Alternative Embodiment P2. The computer-implemented system of Alternative Embodiment P1, further comprising a learning policy registry maintaining versioned records of ranking weight vectors, reward definitions, slot objectives, and constraint policies, wherein each briefing references the specific registry identifiers used for its generation.

Alternative Embodiment P3. The computer-implemented system of Alternative Embodiment P1, wherein the A/B variant tester operates on approximately 10 to approximately 20 percent of subscribers on any given day.

Alternative Embodiment P4. The computer-implemented system of Alternative Embodiment P1, wherein the ranking weight updater optimizes weights at the content vertical level rather than at the individual subscriber level.

Alternative Embodiment P5. The computer-implemented system of Alternative Embodiment P1, wherein sponsor-module clicks, conversions, and dwell time are explicitly excluded from the preference data aggregated by the feedback data aggregator.

Alternative Embodiment P6. The computer-implemented system of Alternative Embodiment P1, wherein the truth constraint enforcer blocks weight updates that would reduce citation coverage below a defined floor, eliminate corroboration requirements for high-impact claims, or violate domain guardrails.

Alternative Embodiment P7. The computer-implemented system of Alternative Embodiment P1, wherein the obligation rule engine maintains a novelty floor for a surprise story slot that cannot be trained away.

Alternative Embodiment P8. The computer-implemented system of Alternative Embodiment P1, wherein weight updates are treated as deployable artifacts subject to evaluation gates that block deployment unless all applicable test suites pass.

Alternative Embodiment Q1. A computer-implemented method for truth-constrained reinforcement learning content ranking, the method comprising: collecting binary preference feedback from verified subscribers on stories in personalized briefings; conducting A/B variant testing by randomly assigning each test-cohort subscriber one of the two highest-ranked candidates for a briefing slot; aggregating preference data including ratings, passive engagement signals, and ranking factor weights; computing ranking weight updates at the vertical level from the aggregated data; enforcing hard constraints preventing weight updates from violating citation floors, corroboration requirements, domain guardrails, rights compliance, sponsor separation, or diversity floors; ensuring items exceeding evidence-significance thresholds remain eligible regardless of preference prediction; and deploying weight updates only upon passing evaluation gates.

Alternative Embodiment Q2. The computer-implemented method of Alternative Embodiment Q1, further comprising versioning all weight vectors, slot objectives, and constraint policies in a learning policy registry and referencing registry identifiers in each generated briefing.

Alternative Embodiment Q3. The computer-implemented method of Alternative Embodiment Q1, further comprising excluding all sponsor-module interaction data from the aggregated preference dataset.

Alternative Embodiment R1. A non-transitory computer-readable medium storing instructions that, when executed by a processor, cause the processor to: collect preference feedback from verified subscribers on briefing stories; conduct A/B testing between top-ranked candidates; compute ranking weight updates at the vertical level; enforce truth constraints preventing weight updates from degrading citation coverage, corroboration, guardrails, or diversity; and deploy weight updates only upon passing evaluation gates.

Alternative Embodiment S1. A computer-implemented system for brigade-resistant preference aggregation in a content ranking system, the system comprising: a rater trust score calculator configured to compute a credibility weight for each subscriber's preference signals; a verified-read confidence analyzer configured to assess whether a subscriber likely read a story before rating it; a longitudinal behavior analyzer configured to evaluate a subscriber's rating behavior over time for variance, coherence, and absence of mechanical patterns; an anomaly detector configured to identify bursts, coordinated timing, and device-farm signatures in rating activity; a sybil resistance module configured to evaluate account uniqueness signals; a preference attack quarantine configured to exclude low-trust or anomalous ratings from weight updates and log them as potential preference attacks; and a ranking receipt auditor configured to verify story-selection decisions against declared constraint policies and weight vectors without exposing exploitable thresholds.

Alternative Embodiment S2. The computer-implemented system of Alternative Embodiment S1, wherein the rater trust score is a composite score derived from outputs of the verified-read confidence analyzer, the longitudinal behavior analyzer, the anomaly detector, and the sybil resistance module.

Alternative Embodiment S3. The computer-implemented system of Alternative Embodiment S1, wherein suspicious preference patterns trigger step-up verification, reduced weighting, temporary exclusion from experimentation cohorts, or manual review.

Alternative Embodiment S4. The computer-implemented system of Alternative Embodiment S1, wherein preference integrity outcomes are logged and included in anchored audit artifacts through a tamper-evident anchoring system.

Alternative Embodiment S5. The computer-implemented system of Alternative Embodiment S1, further comprising a ranking receipt for each story selection capturing a candidate set hash, chosen item identifier, slot objective identifier, weight vector hash, constraint check attestations, and reason codes.

Alternative Embodiment S6. The computer-implemented system of Alternative Embodiment S5, wherein the ranking receipt enables auditing and debugging of editorial decisions without exposing full ranking feature weights or exploitable scoring thresholds.

Alternative Embodiment T1. A computer-implemented method for brigade-resistant preference aggregation, the method comprising: computing a rater trust score for each subscriber based on verified-read confidence, longitudinal behavior analysis, anomaly detection, and sybil resistance evaluation; weighting or excluding preference signals based on the rater trust score before the signals influence ranking weight updates; quarantining low-trust or anomalous ratings and logging them as potential preference attacks; generating ranking receipts capturing selection decision artifacts without exposing exploitable thresholds; and anchoring preference integrity outcomes through a tamper-evident audit system.

Alternative Embodiment T2. The computer-implemented method of Alternative Embodiment T1, further comprising simulating synthetic rating brigades and preference farms to validate defense effectiveness.

Alternative Embodiment U1. A computer-implemented system for multi-channel resilient content distribution with distributed media production, the system comprising: a first-party reader application serving as the primary content consumption, engagement measurement, and preference feedback environment, storing the full content briefing; a plurality of independently operable notification channels each configured to notify a subscriber that a briefing is available, comprising at least two of a push notification channel, an email notification channel, a messaging bot channel, an SMS channel, and an RSS feed channel, wherein no single notification channel is a single point of failure and each channel is independently sufficient for notification delivery; and a distributed media production module configured to provide personalized text content generated centrally by the platform to a local text-to-audio converter executing on subscriber device compute such that the platform bears zero marginal media production cost regardless of subscriber count.

Alternative Embodiment U2. The computer-implemented system of Alternative Embodiment U1, wherein the local text-to-audio converter interfaces with any of a cloud-based AI voice service accessed through the subscriber's own third-party account, or an on-device text-to-speech capability.

Alternative Embodiment U3. The computer-implemented system of Alternative Embodiment U1, wherein the email notification channel delivers a short notification with the first lines of a lead story and a link to the first-party reader application, and the full briefing never resides in email.

Alternative Embodiment U4. The computer-implemented system of Alternative Embodiment U1, wherein the RSS feed channel delivers a private authenticated feed URL operating on an open protocol not controlled by any single company.

Alternative Embodiment U5. The computer-implemented system of Alternative Embodiment U1, wherein the distributed media production module is format-agnostic and extensible to future media formats including video summaries, interactive dashboards, or immersive presentations using centralized text intelligence with distributed local rendering.

Alternative Embodiment V1. A computer-implemented method for resilient content distribution with distributed media production, the method comprising: generating a personalized text content briefing centrally; storing the full briefing in a first-party reader application; notifying the subscriber through one or more independently operable notification channels; providing the personalized text to a local converter executing on the subscriber's own device compute for conversion to audio or other media formats, the platform bearing zero marginal media production cost; and measuring engagement exclusively within the first-party reader application.

Alternative Embodiment V2. The computer-implemented method of Alternative Embodiment V1, wherein if any single notification channel becomes unavailable, remaining channels continue to function independently.

Alternative Embodiment W1. A computer-implemented system for ethically-constrained behavioral engagement in a content platform, the system comprising: a variable reward module configured to leverage inherent unpredictability of primary-source intelligence content to provide variable reward through daily novelty; a reading streak tracker configured to display consecutive content consumption days alongside a current billing charge that approaches zero as reading consistency increases; a social currency generator configured to deliver content comprising primary-source insights unavailable through conventional media channels; a narrative continuity module configured to generate a monitoring preview of a developing story at the conclusion of each briefing; a preference participation module configured to enable subscribers to provide feedback shaping the platform's editorial ranking; a subscriber engagement control panel enabling each subscriber to independently disable any engagement feature including streak displays, monitoring previews, notifications, and preference prompts; and an ethical constraint enforcer configured to prohibit deceptive techniques, manipulative scarcity, countdown timers, and dark-pattern billing.

Alternative Embodiment W2. The computer-implemented system of Alternative Embodiment W1, further comprising a community identity module configured to track reading milestones and enable platform status based on engagement consistency.

Alternative Embodiment W3. The computer-implemented system of Alternative Embodiment W1, wherein the reading streak tracker operates in conjunction with a hold/vacation module enabling streak pause without financial or status penalty.

Alternative Embodiment W4. The computer-implemented system of Alternative Embodiment W1, wherein the variable reward module instructs an engagement-optimized formatter to lead each story with the most surprising or consequential element and to vary format daily.

Alternative Embodiment W5. The computer-implemented system of Alternative Embodiment W1, wherein the ethical constraint enforcer ensures the system optimizes for daily usefulness to the subscriber rather than compulsive engagement.

Alternative Embodiment X1. A computer-implemented method for ethically-constrained behavioral engagement, the method comprising: providing variable reward through daily novelty in primary-source content; displaying reading streaks alongside billing charges that decrease with reading consistency; delivering primary-source insights creating social currency for subscribers; generating narrative continuity through developing-story previews; enabling subscriber participation in editorial ranking through preference feedback; enabling each subscriber to independently disable any engagement feature; and enforcing ethical constraints prohibiting deceptive techniques, manipulative scarcity, and dark-pattern billing.

Alternative Embodiment Y1. A computer-implemented system for rights-aware content rendering with evaluation-gated release control, the system comprising: a rights metadata store storing per-document licensing metadata assigned at ingestion time; a source class classifier configured to classify each source document into an access class determining rendering policy; a quote cap enforcer configured to apply per-source-class quotation limits at content generation time; a summarize-cite-link renderer configured to implement a default rendering policy for restricted content comprising summarization in the system's own words, citation attachment, and linking to the original source; a rights compliance validator configured to verify that all generated output complies with source-class rendering policies before distribution; and an evaluation gate system configured to block deployment of new models, prompts, policies, or ranking weight updates unless all applicable test suites pass.

Alternative Embodiment Y2. The computer-implemented system of Alternative Embodiment Y1, wherein the access class categories comprise public domain or government, permissive license, permissioned, paywalled or restricted, and unknown.

Alternative Embodiment Y3. The computer-implemented system of Alternative Embodiment Y1, wherein no full-text reproduction of restricted sources is permitted, and the evidence graph stores references and minimal necessary extracts rather than redistributable full text for restricted sources.

Alternative Embodiment Y4. The computer-implemented system of Alternative Embodiment Y1, wherein the evaluation gate system comprises a citation integrity suite testing citation coverage and alignment, a rights compliance suite testing quote cap enforcement, a prompt injection resistance suite testing resistance to malicious retrieved content, a sponsor separation suite testing pipeline isolation, a domain guardrail suite testing health, finance, and legal boundary enforcement, a measurement integrity suite testing reading verification accuracy, a learning integrity suite testing weight update quality, a preference attack simulation suite testing preference defense effectiveness, and a security and isolation suite testing access controls and audit completeness.

Alternative Embodiment Y5. The computer-implemented system of Alternative Embodiment Y4, wherein ranking weight updates from a reinforcement learning loop are treated as release artifacts and must pass all applicable evaluation gates before deployment.

Alternative Embodiment Y6. The computer-implemented system of Alternative Embodiment Y4, further comprising a rollback controller configured to automatically roll back any deployment upon detection of metric regression beyond defined deltas.

Alternative Embodiment Y7. The computer-implemented system of Alternative Embodiment Y1, wherein the evaluation gate system blocks any release touching high-impact domains or sponsor and auditor surfaces upon failure of the security and isolation suite.

Alternative Embodiment Z1. A computer-implemented method for rights-aware content rendering with evaluation-gated release control, the method comprising: storing per-document licensing metadata at ingestion time; classifying source documents into access classes determining rendering policies; enforcing per-source-class quotation limits at content generation time; rendering restricted content as summaries with citations and links rather than full-text reproductions; validating all generated output for rights compliance before distribution; maintaining a plurality of test suites covering citation integrity, rights compliance, prompt injection resistance, sponsor separation, domain guardrails, measurement integrity, learning integrity, preference attack resistance, and security isolation; and blocking deployment of system updates unless all applicable test suites pass.

Alternative Embodiment Z2. The computer-implemented method of Alternative Embodiment Z1, further comprising automatically rolling back deployments upon metric regression.

Alternative Embodiment Z3. The computer-implemented method of Alternative Embodiment Z1, further comprising treating reinforcement learning weight updates as release artifacts subject to evaluation gates.

Alternative Embodiment AA1. A non-transitory computer-readable medium storing instructions that, when executed by a processor, cause the processor to: retrieve per-document licensing metadata from a rights metadata store; enforce quotation limits and rendering policies based on source access class; validate generated output for rights compliance before distribution; test system updates against a plurality of integrity, compliance, and security test suites; and block deployment unless all applicable test suites pass.

Alternative Embodiment AB1. A computer-implemented system for enterprise decision intelligence, the system comprising: an evidence graph storing ingested source data from heterogeneous public sources as interconnected document, claim, entity, and event nodes with immutable provenance chains; an enterprise client configuration system configured to receive and store an enterprise intelligence profile for each enterprise client, each profile specifying industry domain selections, competitive landscape entity definitions, geographic scope parameters, regulatory jurisdiction selections, signal priority weightings, and delivery configuration parameters; an enterprise synthesis engine configured to retrieve evidence from the evidence graph according to the enterprise intelligence profile and generate intelligence outputs with inline citations and per-claim confidence classifications using the same claim classification system applied to consumer intelligence outputs; and an enterprise delivery system configured to deliver intelligence outputs in one or more of four configurable delivery formats comprising periodic decision briefings delivered on a configured schedule, real-time alert intelligence triggered by detected signal clusters within the enterprise client's configured domains, query-driven intelligence synthesis providing on-demand answers from the evidence graph with full provenance in response to enterprise client inquiries, and a continuous intelligence dashboard providing a persistent real-time view of consensus and dissent mapping, trend trajectories, competitive positioning, and behavioral signal patterns; wherein the enterprise intelligence layer synthesizes intelligence exclusively from publicly available sources and does not ingest enterprise client proprietary data.

Alternative Embodiment AB2. The computer-implemented system of Alternative Embodiment AB1, wherein the enterprise intelligence profile is stored as a versioned immutable record and wherein changes to the profile are logged with timestamps, authorization identifiers, and prior profile versions.

Alternative Embodiment AB3. The computer-implemented system of Alternative Embodiment AB1, wherein each intelligence output delivered through any of the four delivery formats is accompanied by an evidence bundle anchored through a tamper-evident audit anchoring system using cryptographically signed Merkle roots such that the enterprise client may verify the evidentiary basis and provenance of any claim in any intelligence output received.

Alternative Embodiment AB4. The computer-implemented system of Alternative Embodiment AB1, wherein the real-time alert intelligence is triggered by alert conditions including regulatory filings or actions, statistically significant shifts in public behavioral signals, emerging expert discourse clusters preceding mainstream coverage, competitive entity activity, and supply chain disruptions or geopolitical developments crossing a configured significance threshold.

Alternative Embodiment AB5. The computer-implemented system of Alternative Embodiment AB1, wherein query-driven intelligence synthesis processes each query by retrieving relevant evidence from the evidence graph across all applicable domains, ranking retrieved evidence according to the enterprise client's signal priority weightings, synthesizing a response with inline citations and confidence classifications, and storing each query and response pair with an evidence bundle anchored through the tamper-evident audit anchoring system.

Alternative Embodiment AB6. The computer-implemented system of Alternative Embodiment AB1, wherein the continuous intelligence dashboard updates as new evidence enters the evidence graph and is not limited to scheduled refresh intervals.

Alternative Embodiment AB7. The computer-implemented system of Alternative Embodiment AB1, wherein the enterprise client may activate any combination of the four delivery formats simultaneously and wherein all four formats operate on the same underlying evidence and synthesis architecture.

Alternative Embodiment AB8. The computer-implemented system of Alternative Embodiment AB1, wherein the enterprise synthesis engine 1704 operates on the same evidence index and provenance graph layer 106 and AI assembly layer 108 that serve a consumer intelligence layer, such that consumer intelligence and enterprise intelligence are parallel output pathways from a unified domain-agnostic intelligence synthesis architecture.

Alternative Embodiment AC1. A computer-implemented method for generating enterprise decision intelligence, the method comprising: receiving and storing an enterprise intelligence profile specifying industry domains, competitive landscape entities, geographic scope, regulatory jurisdictions, signal priority weightings, and delivery format configuration; retrieving evidence from a shared evidence graph storing data from heterogeneous public sources as interconnected document, claim, entity, and event nodes with immutable provenance chains; synthesizing intelligence outputs with inline citations and per-claim confidence classifications according to the enterprise intelligence profile; and delivering intelligence outputs through one or more of four configurable formats comprising periodic decision briefings, real-time alert intelligence triggered by signal clusters, query-driven intelligence synthesis with full provenance, and a continuous intelligence dashboard; wherein intelligence is synthesized exclusively from publicly available sources.

Alternative Embodiment AD1. A non-transitory computer-readable medium storing instructions that, when executed by a processor, cause the processor to: receive an enterprise intelligence profile specifying domain, competitive, geographic, regulatory, and delivery parameters; retrieve evidence from a shared evidence graph containing provenance-linked document, claim, entity, and event nodes; synthesize intelligence with citations and confidence classifications according to the profile; and deliver intelligence through one or more of periodic briefings, real-time alerts, query-driven synthesis, and a continuous dashboard.

Alternative Embodiment AE1. A computer-implemented system for enterprise client isolation in a multi-tenant intelligence platform, the system comprising: an enterprise identity firewall configured to enforce at the code level that no enterprise client identifier, intelligence profile parameter, query history, alert configuration, or delivery record is accessible to any process serving a different enterprise client; an enterprise query isolation module configured to process query-driven intelligence synthesis requests in isolation such that query text, retrieved evidence sets, synthesis parameters, and generated responses for one enterprise client are inaccessible to processes serving any other enterprise client; an enterprise output isolation module configured to store, transmit, and render all intelligence outputs within client-specific isolated environments such that no enterprise client may access intelligence outputs delivered to any other enterprise client; and an enterprise integrity report generator configured to automatically generate enterprise isolation integrity reports proving cross-client isolation for any specified time window, each integrity report comprising synthesis isolation proof, output isolation proof, firewall attestation fields, and signature and anchor verification fields enabling cryptographic verification through a tamper-evident audit anchoring system.

Alternative Embodiment AE2. The computer-implemented system of Alternative Embodiment AE1, wherein the enterprise query isolation module further ensures that the volume, timing, domain focus, and content of one enterprise client's queries cannot be inferred by any other enterprise client through any platform interface, reporting mechanism, or behavioral side channel.

Alternative Embodiment AE3. The computer-implemented system of Alternative Embodiment AE1, wherein enterprise isolation integrity reports are merklized and anchored through the tamper-evident audit anchoring system such that their contents cannot be retroactively altered.

Alternative Embodiment AE4. The computer-implemented system of Alternative Embodiment AE1, wherein in configurations where an enterprise client is also an advertiser sponsor on a consumer intelligence layer, the enterprise client isolation architecture 1708 and a sponsor separation architecture 600 operate simultaneously and independently.

Alternative Embodiment AF1. A computer-implemented method for enforcing enterprise client isolation in a multi-tenant intelligence platform, the method comprising: enforcing at the code level that no enterprise client identifier or intelligence profile parameter is accessible to processes serving a different enterprise client; processing intelligence queries in client-specific isolation such that query content and results are inaccessible across clients; storing and delivering all intelligence outputs within client-specific isolated environments; and automatically generating integrity reports proving cross-client isolation with cryptographic verification through tamper-evident audit anchoring.

Alternative Embodiment AG1. A computer-implemented system for generating market behavioral intelligence from population-scale public signals, the system comprising: a population-scale behavioral signal processor configured to ingest publicly observable behavioral data from open social platforms, community forums, public discussion groups, and content sharing platforms through platform-agnostic modular connectors, and to identify and quantify behavioral patterns including shifts in public discussion volume, sentiment, and topic clustering around products, services, industries, brands, and market categories; a market discourse mapper configured to map public discourse patterns relevant to enterprise intelligence including consumer sentiment trajectories, practitioner and professional discourse revealing operational realities not yet reflected in structured data sources, and public regulatory discourse revealing anticipated regulatory directions, the market discourse mapper weighting discourse analysis by source credibility using expert credibility scores derived from multi-signal identity verification; a demand signal detector configured to identify emerging market demand signals by analyzing the convergence of behavioral patterns across multiple independent public signal sources and further configured to identify negative demand signals indicating market contraction, product failure risk, or capital allocation hazards, wherein negative demand signals are not suppressed or deprioritized; and a market intelligence synthesizer configured to integrate outputs from the population-scale behavioral signal processor, the market discourse mapper, and the demand signal detector with evidence from an evidence graph comprising financial regulatory filings, research publications, government data, and news sources, producing integrated market intelligence with provenance chain traceability, claim confidence classifications, and evidence bundle documentation.

Alternative Embodiment AG2. The computer-implemented system of Alternative Embodiment AG1, wherein the market behavioral intelligence layer operates exclusively on publicly observable signals and does not access consumer subscriber private data, reading behavior, preference feedback, or billing records.

Alternative Embodiment AG3. The computer-implemented system of Alternative Embodiment AG1, wherein the population-scale behavioral signal processor observes actual population behavior as expressed through public discourse and interaction at scale rather than inferring population behavior from structured samples.

Alternative Embodiment AG4. The computer-implemented system of Alternative Embodiment AG1, wherein the demand signal detector recognizes convergence of behavioral patterns across multiple independent public signal sources as a demand signal with higher confidence than any single source would support.

Alternative Embodiment AG5. The computer-implemented system of Alternative Embodiment AG1, wherein growth in a consumer subscriber base served by a consumer intelligence layer of the same platform continuously improves the volume, granularity, and predictive value of market behavioral intelligence, constituting a structural competitive barrier that no enterprise-only intelligence provider can replicate without first building a comparable consumer intelligence ecosystem.

Alternative Embodiment AH1. A computer-implemented method for generating market behavioral intelligence, the method comprising: ingesting publicly observable behavioral data from open social platforms and public forums through platform-agnostic connectors; identifying and quantifying behavioral patterns including shifts in discussion volume, sentiment, and topic clustering around market categories; mapping public discourse patterns weighted by verified expert credibility scores; detecting emerging demand signals through convergence analysis across multiple independent signal sources; detecting negative demand signals indicating market risks without suppression; and integrating behavioral intelligence with evidence from financial, regulatory, research, and news sources to produce market intelligence with full provenance traceability and confidence classifications.

Alternative Embodiment AI1. A non-transitory computer-readable medium storing instructions that, when executed by a processor, cause the processor to: ingest publicly observable behavioral signals from open platforms; quantify behavioral patterns around market categories; map discourse weighted by expert credibility; detect demand signals through multi-source convergence; detect negative demand signals without suppression; and synthesize market intelligence with provenance and confidence classifications.

Alternative Embodiment AJ1. A computer-implemented system for performance-based enterprise intelligence billing, the system comprising: a decision registration module configured to record enterprise decisions informed by platform intelligence including the nature of the decision, capital or resources committed or preserved, and the date of the decision; an intelligence linkage tracker configured to establish a documented and cryptographically verifiable connection between each registered decision and specific intelligence outputs that informed it, the connection traceable through evidence bundles anchored via a tamper-evident audit anchoring system from the enterprise client's decision through the intelligence output through an evidence graph to original source documents and behavioral signals; an outcome measurement module configured to track measurable results of registered decisions over configured time horizons including revenue generated, return on capital, cost reductions, and market share changes; a waste prevention calculator configured to compute the value of capital preserved through decisions avoided or modified based on platform intelligence by recording planned expenditure amounts, the intelligence that informed the avoidance or modification, and subsequent market outcomes that validate the intelligence; a value attribution processor configured to compute the platform's attributed value contribution for each registered decision based on a configurable attribution methodology and to produce value attribution reports accompanied by evidence bundles documenting the complete chain from source intelligence through decision through outcome; and an enterprise billing system configured to compute enterprise client charges as a configured percentage of attributed value of outcomes generated and capital waste prevented, wherein the enterprise client incurs no charge for intelligence that does not produce measurable attributed value.

Alternative Embodiment AJ2. The computer-implemented system of Alternative Embodiment AJ1, wherein the configurable attribution methodology comprises one or more of full attribution, partial attribution applying a defined percentage reflecting the enterprise client's independent contribution, and marginal attribution measuring the difference between actual outcomes and baseline outcomes expected without platform intelligence.

Alternative Embodiment AJ2. The computer-implemented system of Alternative Embodiment AJ1, wherein value attribution reports are anchored through the tamper-evident audit anchoring system such that billing computations are cryptographically verifiable by both the platform and the enterprise client.

Alternative Embodiment AJ3. The computer-implemented system of Alternative Embodiment AJ1, wherein the enterprise billing system further supports an access-based embodiment in which charges are determined by the number of intelligence verticals activated, delivery formats enabled, authorized users, and historical evidence graph depth, the charges not contingent upon outcomes.

Alternative Embodiment AJ4. The computer-implemented system of Alternative Embodiment AJ1, wherein the enterprise billing system further supports a hybrid embodiment combining a reduced access-based periodic fee with performance-based compensation computed from value attribution reports.

Alternative Embodiment AJ5. The computer-implemented system of Alternative Embodiment AJ1, wherein the enterprise billing system produces billing evidence bundles for each billing period comprising engagement model parameters, intelligence outputs delivered, registered decisions, outcome measurements, waste prevention calculations, and value attribution computations, the billing evidence bundles anchored through the tamper-evident audit anchoring system.

Alternative Embodiment AJ6. The computer-implemented system of Alternative Embodiment AJ1, wherein the performance-based model applies across the full spectrum of enterprise client scale from global corporations to individual entrepreneurs, with compensation scaling proportionally to the value of decisions informed regardless of entity size.

Alternative Embodiment AK1. A computer-implemented method for performance-based enterprise intelligence billing, the method comprising: recording enterprise decisions informed by platform intelligence including capital committed or preserved; establishing cryptographically verifiable connections between registered decisions and specific intelligence outputs traceable through an evidence graph to original source documents; tracking measurable outcomes of registered decisions over configured time horizons; computing the value of capital preserved through decisions avoided or modified based on platform intelligence; computing platform value attribution using a configurable attribution methodology; and computing enterprise client charges as a percentage of attributed outcome value and waste prevention value, wherein the enterprise client incurs no charge for intelligence that does not produce measurable attributed value.

Alternative Embodiment AK2. The computer-implemented method of Alternative Embodiment AK1, further comprising anchoring value attribution reports and billing evidence bundles through a tamper-evident audit anchoring system using cryptographically signed Merkle roots.

Alternative Embodiment AL1. A non-transitory computer-readable medium storing instructions that, when executed by a processor, cause the processor to: record enterprise decisions informed by platform intelligence; establish verifiable linkage between decisions and intelligence outputs; track measurable decision outcomes; compute capital waste prevention value; compute attributed value using a configurable methodology; and compute charges as a percentage of attributed value wherein no charge accrues for intelligence producing no measurable value.

Alternative Embodiment AM1. A computer-implemented intelligence platform system operating as a centralized multi-tenant platform, the system comprising: a data ingestion layer comprising modular arm pipelines ingesting source data from heterogeneous public sources; an evidence graph storing ingested data as interconnected nodes with immutable provenance chains; an AI assembly layer synthesizing evidence into intelligence outputs with inline citations and confidence classifications; a consumer intelligence layer generating personalized intelligence briefings for individual subscribers; an enterprise intelligence layer generating decision intelligence for enterprise clients through configurable delivery formats; a market behavioral intelligence layer transforming publicly observable population-scale behavioral signals into market-grade intelligence; wherein all data ingestion, evidence graph maintenance, AI synthesis, provenance anchoring, and intelligence delivery occur within platform-controlled infrastructure; wherein the platform is not licensed, sublicensed, franchised, or made available for independent deployment by any subscriber, enterprise client, or third party; and wherein the centralized architecture preserves network effects arising from unified evidence graph growth, population-scale behavioral signal aggregation, and cross-domain intelligence synthesis.

Alternative Embodiment AM2. The computer-implemented system of Alternative Embodiment AM1, wherein the evidence graph is a shared resource serving both consumer and enterprise intelligence outputs and wherein no enterprise client configuration may alter the evidence graph or the ingestion, ranking, or quality assessment processes that feed it.

Alternative Embodiment AM3. The computer-implemented system of Alternative Embodiment AM1, wherein the consumer intelligence layer and the enterprise intelligence layer are parallel output pathways from a unified domain-agnostic intelligence synthesis architecture.

Alternative Embodiment AM4. The computer-implemented system of Alternative Embodiment AM1, wherein fragmentation of the platform through licensing would destroy population-scale behavioral signal aggregation, produce inferior intelligence in each fragment, and prevent architectural enforcement of client isolation and sponsor separation constraints.

Alternative Embodiment AN1. A computer-implemented system for generating personalized content at multiple rendering depths from a single content generation operation, the system comprising: a nested content synthesis module configured to receive a selected primary-source document and generate a single content unit comprising a plurality of sequential layers, each layer consisting of one or more paragraphs, the content unit structured such that a first rendering depth comprising a first subset of layers constitutes a complete standalone read, a second rendering depth comprising a larger subset of layers constitutes a complete standalone read, and a third rendering depth comprising all layers constitutes a complete standalone read; wherein the content rendered at any shorter rendering depth is a verbatim subset of the content rendered at any longer rendering depth beginning from the first word, and wherein shorter renderings are produced by truncation at structurally defined boundary points rather than by summarization, abridgment, or separate generation; a subscriber personalization system configured to receive and store a subscriber preference specifying one or more content verticals and a preferred rendering depth; and a conditional rendering engine configured to store each content unit as a single content block with structural markers identifying boundaries between rendering depth levels and to display at delivery time only the layers corresponding to the subscriber's preferred rendering depth.

Alternative Embodiment AN2. The computer-implemented system of Alternative Embodiment AN1, wherein the nested content synthesis module enforces a structural nesting constraint requiring that each layer simultaneously functions as a complete and satisfying standalone terminal read for subscribers at that rendering depth and as a natural and coherent introduction to subsequent layers for subscribers at deeper rendering depths.

Alternative Embodiment AN3. The computer-implemented system of Alternative Embodiment AN1, wherein in a preferred embodiment the content unit comprises four paragraphs, a first rendering depth comprises the first paragraph at approximately 75 to approximately 100 words, a second rendering depth comprises the first and second paragraphs at approximately 200 to approximately 250 words, and a third rendering depth comprises all four paragraphs at approximately 400 to approximately 500 words, and wherein the number of paragraphs, rendering depths, and word counts are configurable.

Alternative Embodiment AN4. The computer-implemented system of Alternative Embodiment AN1, wherein the first layer of each content unit contains a hook establishing a finding, a relevance statement, an actionable takeaway, and a source attribution, such that a subscriber receiving only the first layer receives a complete unit of intelligence.

Alternative Embodiment AN5. The computer-implemented system of Alternative Embodiment AN1, wherein the conditional rendering engine stores each content unit as a single HTML structure with CSS class markers on each structural layer, applies a CSS rendering rule set determined by the subscriber's rendering depth tag at delivery time, and serves all subscribers at all rendering depths from one stored content block, one generation operation, and one editorial review operation.

Alternative Embodiment AN6. The computer-implemented system of Alternative Embodiment AN1, wherein one content generation operation produces all rendering depths for a content unit and no additional computational or editorial cost is incurred for serving additional rendering depths.

Alternative Embodiment AO1. A computer-implemented method for generating multi-depth personalized content from a single generation operation, the method comprising: receiving a selected primary-source document for a content vertical; generating a single content unit comprising a plurality of sequential layers structured such that each progressively larger subset of layers constitutes a complete standalone read; enforcing a structural nesting constraint wherein any shorter rendering is a verbatim subset of any longer rendering beginning from the first word; storing the content unit as a single content block with structural markers at rendering depth boundaries; receiving a subscriber preference specifying a rendering depth; and displaying at delivery time only the layers corresponding to the subscriber's preferred depth from the single stored content block.

Alternative Embodiment AO2. The computer-implemented method of Alternative Embodiment AO1, further comprising generating a header for the content unit comprising a topic identifier, a subscriber-facing topic label, and a headline of approximately twelve words maximum containing at least one concrete noun.

Alternative Embodiment AP1. A non-transitory computer-readable medium storing instructions that, when executed by a processor, cause the processor to: generate a single content unit from a primary-source document comprising sequential layers where each subset constitutes a complete standalone read; enforce that shorter renderings are verbatim subsets of longer renderings; store the unit as a single block with depth markers; and render at delivery time only layers matching a subscriber's preferred depth.

Alternative Embodiment AQ1. A computer-implemented system for automated primary-source research harvesting across a configurable plurality of content verticals, the system comprising: a vertical query registry storing a configurable set of content verticals, each vertical associated with a plurality of precision search queries targeting distinct research angles within the vertical, the number of content verticals being configurable from fewer than ten to more than one thousand without architectural modification; a date-windowed retrieval module configured to apply dynamic date filtering to each query execution based on the entry date of records in the target primary-source database such that each retrieval cycle captures only newly indexed research, the retrieval window computed dynamically from the prior cycle's execution timestamp to the current cycle's execution timestamp; a fallback chain controller configured to implement a multi-stage fallback sequence for verticals in which the default retrieval window produces insufficient results, the sequence comprising in order widening the retrieval window for the specific underperforming vertical only, checking adjacent content verticals for cross-postable research, further widening the retrieval window for the specific vertical, pulling a pre-generated evergreen content unit from a curated queue, and skipping the vertical for the delivery cycle, the fallback chain controller proceeding through each stage only if the prior stage fails; a deduplication log maintaining a persistent rolling record of every primary-source document identifier processed such that no document is ever presented to a subscriber more than once; and a candidate selection module configured to evaluate retrieved candidates and select the strongest single candidate per vertical per delivery cycle based on recency, relevance, study quality, and novelty.

Alternative Embodiment AQ2. The computer-implemented system of Alternative Embodiment AQ1, wherein each precision query comprises Boolean search terms combining condition-specific, mechanism-specific, and intervention-specific vocabulary and wherein date filtering is applied programmatically at the retrieval API level rather than embedded in query strings.

Alternative Embodiment AQ3. The computer-implemented system of Alternative Embodiment AQ1, wherein the date-windowed retrieval module filters by entry date rather than publication date to capture articles at the moment they become available in the primary-source database regardless of publication-to-indexing lag.

Alternative Embodiment AQ4. The computer-implemented system of Alternative Embodiment AQ1, wherein the fallback chain controller never widens the retrieval window globally and applies window widening only to the specific underperforming vertical to preserve freshness guarantees for all other verticals.

Alternative Embodiment AQ5. The computer-implemented system of Alternative Embodiment AQ1, wherein the candidate selection module routes unused strong candidates to an evergreen queue for future use and does not combine multiple primary-source documents into a single content unit.

Alternative Embodiment AQ6. The computer-implemented system of Alternative Embodiment AQ1, wherein the precision queries further incorporate controlled vocabulary terms specific to the target research database including Medical Subject Heading terms for PubMed queries.

Alternative Embodiment AR1. A computer-implemented method for automated primary-source research harvesting, the method comprising: maintaining a configurable set of content verticals each associated with a plurality of precision search queries; executing queries against a primary-source database with dynamic date-windowed filtering capturing only newly indexed research; implementing a multi-stage fallback sequence for underperforming verticals including window widening limited to the specific vertical, cross-posting from adjacent verticals, pulling from an evergreen queue, and skipping as a last resort; checking each retrieved candidate against a persistent deduplication log; and selecting the strongest single candidate per vertical per delivery cycle.

Alternative Embodiment AS1. A non-transitory computer-readable medium storing instructions that, when executed by a processor, cause the processor to: execute precision queries per content vertical with dynamic date-windowed filtering on entry date; implement a multi-stage fallback chain for low-yield verticals without global window widening; verify candidates against a deduplication log; and select one candidate per vertical per cycle.

Alternative Embodiment AT1. A computer-implemented system for editorially constrained AI content generation, the system comprising: a nested content synthesis module configured to generate content units from primary-source research documents using an AI language model; and an editorial constraint architecture enforcing mandatory constraints on the AI synthesis process at generation time through a structured system prompt, the editorial constraint architecture comprising: a regulatory language constraint maintaining a prohibited terminology set and a required alternative terminology set and enforcing that generated content uses structure and function language only, with prohibited terminology prevented from appearing in generated output at generation time; an editorial pillar constraint ensuring consistency with configurable publisher editorial positions where scientifically supported without forcing editorial angles where source research does not warrant them; a tone and vocabulary constraint maintaining a forbidden vocabulary set comprising generic phrases, hyperbolic terms, and formulaic constructions commonly produced by AI language models, and enforcing that technical terminology is accompanied by immediate plain-language translation; a citation constraint requiring named primary-source attribution with journal and date in every content unit, direct object identifier links in maximum-depth renderings, sample size disclosure, and contextualized statistics, and prohibiting citation of retracted studies; and a product separation constraint prohibiting mention of the publisher's products by name within any editorial content unit; wherein all constraints are enforced at generation time through the system prompt architecture such that non-compliant content is prevented from being generated rather than being generated and subsequently filtered.

Alternative Embodiment AT2. The computer-implemented system of Alternative Embodiment AT1, wherein the editorial constraint architecture is configurable per publisher implementation such that the specific prohibited terms, required alternatives, editorial pillars, forbidden vocabulary, and product separation rules may be customized without modifying the underlying constraint enforcement architecture.

Alternative Embodiment AT3. The computer-implemented system of Alternative Embodiment AT1, further comprising a human editorial review gateway positioned between the nested content synthesis module and a conditional rendering engine, the gateway requiring human editorial approval of each generated content unit before subscriber delivery and checking nesting integrity, accuracy, regulatory compliance, editorial alignment, tone, and headline quality.

Alternative Embodiment AT4. The computer-implemented system of Alternative Embodiment AT1, wherein the product separation constraint operates analogously to a sponsor separation architecture applied at the content unit level, structurally preventing editorial content from functioning as product promotion.

Alternative Embodiment AU1. A computer-implemented method for editorially constrained AI content generation, the method comprising: receiving a primary-source research document; generating a content unit using an AI language model operating under a structured system prompt enforcing simultaneous constraints comprising regulatory language boundaries restricting output to structure and function language, editorial pillar alignment where scientifically supported, tone and vocabulary constraints preventing generic AI writing patterns, mandatory primary-source citation with journal identification and date, and absolute separation between editorial content and product promotion; wherein all constraints are enforced at generation time through the system prompt architecture; and submitting the generated content unit for human editorial review before subscriber delivery.

Alternative Embodiment AV1. A non-transitory computer-readable medium storing instructions that, when executed by a processor, cause the processor to: generate content from primary-source research under simultaneous generation-time constraints comprising regulatory language boundaries, editorial pillar alignment, tone and vocabulary enforcement, mandatory citation, and product separation; and route generated content through a human editorial review gateway before delivery.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A computer-implemented system for engagement-conditioned content billing, the computer-implemented system comprising:

a content delivery module configured to deliver personalized content to a subscriber through a first-party reader application;

a reading verification system configured to determine whether the subscriber consumed delivered content on each day of a billing period by analyzing a plurality of passive behavioral signals collected from the first-party reader application, wherein no single passive behavioral signal is trusted in isolation;

a sliding scale billing calculator configured to compute a charge for the billing period, wherein the charge for each day on which the reading verification system determines the subscriber consumed the delivered content is zero, and the charge for each day on which the reading verification system determines the subscriber did not consume the delivered content is computed as a fraction of a monthly maximum charge divided by a number of active days in the billing period;

a payment tokenization interface configured to process billing through a payment token issued by an external payment processor, wherein the payment token is stored but the primary account numbers or card verification values are not stored; and a hold-vacation module configured to pause content delivery and exclude paused days from an active-day denominator used by the sliding scale billing calculator.

2. The computer-implemented system of claim 1, wherein the reading verification system comprises a dwell time sensor configured to measure time spent viewing content, a scroll depth tracker configured to measure percentage of content scrolled, a scroll velocity analyzer configured to analyze variance in scroll speed, a focus/blur event detector configured to detect application focus state, and a navigation pattern analyzer configured to evaluate interaction patterns within the content.

3. The computer-implemented system of claim 2, wherein the reading verification system further comprises a bot detection module configured to identify non-human interaction patterns and a device fingerprinting module configured to perform privacy-respecting device identification.

4. The computer-implemented system of claim 1, wherein email open events are explicitly excluded as proof of reading by the reading verification system.

5. The computer-implemented system of claim 1, further comprising an appeals processing module configured to:

receive subscriber disputes of unread-day determinations;

present determination explanations to the subscriber without exposing verification thresholds;

automatically issue credits when a confidence level of an unread determination is below a defined threshold; and route repeated disputes to manual review.

6. The computer-implemented system of claim 1, wherein every monthly charge and every appeal outcome is:

stored with a billing evidence bundle that includes inputs, timestamps, risk scores, decision paths, and payment token references; and anchored through a tamper-evident audit anchoring system using cryptographically signed Merkle roots.

7. The computer-implemented system of claim 1, further comprising a tiered access structure providing a plurality of subscription tiers, each tier defining a maximum monthly charge, a number of content verticals, and a daily word budget, wherein the subscriber may move between tiers freely.

8. The computer-implemented system of claim 7, wherein the daily word budget is distributable across variable output depths generated from a shared evidence set such that a word budget of a given number of words is consumed as any combination of brief and deep-dive formats at no additional cost.

9. The computer-implemented system of claim 1, further comprising an onboarding sequence in which new subscribers receive content for an initial period of approximately 30 days without providing a credit card, followed by an invitation to provide a credit card to continue under an engagement-conditioned billing model.

10. The computer-implemented system of claim 1, wherein the payment tokenization interface uses processor-hosted or tokenization-first collection flows such that raw card data never touches platform servers.

11. A computer-implemented method for engagement-conditioned content billing, the computer-implemented method comprising:

delivering personalized content to a subscriber through a first-party reader application;

analyzing a plurality of passive behavioral signals from the first-party reader application to determine, for each day of a billing period, whether the subscriber consumed delivered content, wherein no single signal is determinative;

computing a charge for the billing period wherein each verified-read day is charged zero and each unread active day is charged proportionally against a monthly maximum;

processing the charge through a payment token issued by an external payment processor without storing primary account numbers; and excluding from an active-day denominator any days during which the subscriber activated a hold mode pausing delivery and billing.

12. The computer-implemented method of claim 11, further comprising:

receiving a dispute from the subscriber regarding a day marked as unread;

presenting a determination explanation without exposing verification thresholds; and automatically issuing a credit when determination confidence is below a defined threshold.

13. The computer-implemented method of claim 11, further comprising anchoring a billing outcome with a cryptographically signed Merkle root stored in an append-only ledger.

14. A non-transitory computer-readable medium storing instructions that, when executed by a processor, cause the processor to:

receive a plurality of passive behavioral signals from a first-party reader application in which personalized content is displayed to a subscriber;

determine for each day of a billing period whether the subscriber consumed the content by combining the plurality of passive behavioral signals with anomaly detection, no single signal being determinative;

compute a billing charge wherein verified-read days are charged zero and unread active days are charged proportionally against a monthly maximum;

process the charge via a stored payment token without retaining primary account numbers; and exclude hold-mode days from an active-day denominator.

15. The non-transitory computer-readable medium of claim 14, wherein the instructions further cause the processor to generate a billing evidence bundle for each billing period and anchor a bundle via a signed Merkle root.

16. A computer-implemented system for evidence-based content synthesis with auditable provenance, the computer-implemented system comprising:

a data ingestion layer comprising a plurality of arm modules, each arm module configured to ingest source data from an external source and normalize the source data to a unified internal schema comprising content type, entities, timestamps, authorship, and rights metadata;

an evidence graph having a plurality of interconnected nodes including document nodes representing canonical content items, claim nodes representing atomic statements linked to supporting document nodes, entity nodes representing persons, organizations, products, or topics linked across document nodes, and event nodes representing time-bounded clusters of related developments;

a provenance chain providing a traceable path from any claim node in a subscriber-facing briefing backward through the evidence graph to original source document nodes;

an AI assembly layer configured to generate briefings only from evidence retrieved from the evidence graph and to attach inline citations to every material claim, each material claim classified as directly supported by a cited source, synthesized across multiple identified sources, or inference with stated uncertainty; and an evidence bundle stored with each generated briefing comprising source documents, retrieval queries, timestamps, model version identifiers, and claim confidence classifications.

17. The computer-implemented system of claim 16, wherein each document node stores a content hash computed over a node content, and wherein the evidence bundle is merklized over component hashes to produce a Merkle root enabling tamper detection.

18. The computer-implemented system of claim 16, wherein the rights metadata comprises an access class categorized as public domain or government, permissive license, permissioned, paywalled or restricted, or unknown, and wherein the AI assembly layer enforces source-class-specific rendering constraints at generation time based on the access class.

19. The computer-implemented system of claim 16, wherein the AI assembly layer generates a subscriber-facing explanation for each briefing item describing why the subscriber is seeing the item, tied to vertical selections and relevance signals.

20. The computer-implemented system of claim 16, wherein the evidence graph stores references and minimal necessary extracts for restricted sources rather than redistributable full text, preserving citation and provenance chain integrity without rights infringement.

* * * * *